US012579030B2

(12) United States Patent (10) Patent No.: US 12,579,030 B2
Li et al. (45) Date of Patent: Mar. 17, 2026

(54) COMPUTE-IN-MEMORY USING NEURAL NETWORKS STORED IN A NON-VOLATILE MEMORY FOR PREDICTIVE BLOCK HEALTH ASSESSMENT OF THE NON-VOLATILE MEMORY

(71) Applicant: Sandisk Technologies, Inc., Milpitas, CA (US)

(72) Inventors: Liang Li, Shanghai (CN); Xuan Tian, Shanghai (CN); Ming Wang, Shanghai (CN); Yan Li, Milpitas, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 161 days.

(21) Appl. No.: 18/761,586

(22) Filed: Jul. 2, 2024

(65) Prior Publication Data

US 2025/0383960 A1 Dec. 18, 2025

Related U.S. Application Data

(60) Provisional application No. 63/659,126, filed on Jun. 12, 2024.

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
CPC .......................... G06F 11/1068; G06F 11/1016
USPC .......................... 714/764, 768, 773, 774, 799
See application file for complete search history.

(56) References Cited

U.S. PATENT DOCUMENTS

| | | | | |
|---|---|---|---|---|
| 10,691,537 B2 * | 6/2020 | Sun | ......................... | G06N 3/065 |
| 11,183,266 B2 * | 11/2021 | Hulton | ................... | G11C 29/76 |
| 11,615,003 B2 * | 3/2023 | Sun | ......................... | G06N 3/08 |
| | | | | 714/763 |
| 11,687,252 B2 * | 6/2023 | Li | ........................... | G06N 20/10 |
| | | | | 711/154 |
| 12,061,542 B2 * | 8/2024 | Linnen | .................. | G06F 3/0658 |
| 12,307,354 B2 * | 5/2025 | Zhang | .................... | G06N 3/063 |
| 12,456,040 B2 * | 10/2025 | Zhang | .................... | G06N 3/063 |
| 2019/0073259 A1 * | 3/2019 | Qin | ......................... | G06F 11/08 |
| 2020/0117539 A1 * | 4/2020 | Sun | ......................... | G11C 29/52 |
| 2020/0411132 A1 * | 12/2020 | Hulton | .................. | G06F 3/0679 |
| 2022/0398438 A1 * | 12/2022 | Zhang | .................... | G06N 3/063 |
| 2022/0398439 A1 * | 12/2022 | Zhang | .................... | G06N 3/063 |
| 2023/0078569 A1 * | 3/2023 | Wang | ....................... | G06N 3/08 |
| | | | | 706/15 |
| 2023/0317149 A1 * | 10/2023 | Joshi | ....................... | G11C 11/54 |
| | | | | 365/154 |

(Continued)

OTHER PUBLICATIONS

Ansari et al., Selective Data Transfer from DRAMs for CNNs, 2018, IEEE, pp. 7-12. (Year: 2018).*
U.S. Appl. No. 18/617,918, filed Mar. 27, 2024.

*Primary Examiner* — John J Tabone, Jr.
(74) *Attorney, Agent, or Firm* — Pearl Cohen Zedek Latzer Baratz LLP

(57) ABSTRACT

Predictive block health assessment of a non-volatile memory can be performed by storing a pre-trained neural network for this purpose on the memory device itself. As operational errors occur during operation of the memory device, this defect data is saved by the non-volatile memory and used as input data for the neural network to identify and retire potential bad blocks before data loss occurs.

20 Claims, 57 Drawing Sheets

(56) References Cited

U.S. PATENT DOCUMENTS

2023/0418738 A1* 12/2023 Linnen ................... G06F 3/0688
2025/0013716 A1*  1/2025 Filipiak ................... G06F 17/16
2025/0238202 A1*  7/2025 Mateescu ................. G06F 7/50
2025/0307344 A1* 10/2025 Qin ........................ G06F 7/5443
2025/0307601 A1* 10/2025 Qin ........................ G06N 3/063
2025/0370976 A1* 12/2025 Sun ..................... G06F 16/2237
2025/0383960 A1* 12/2025 Li ....................... G06F 11/1068

* cited by examiner

Figure 6D
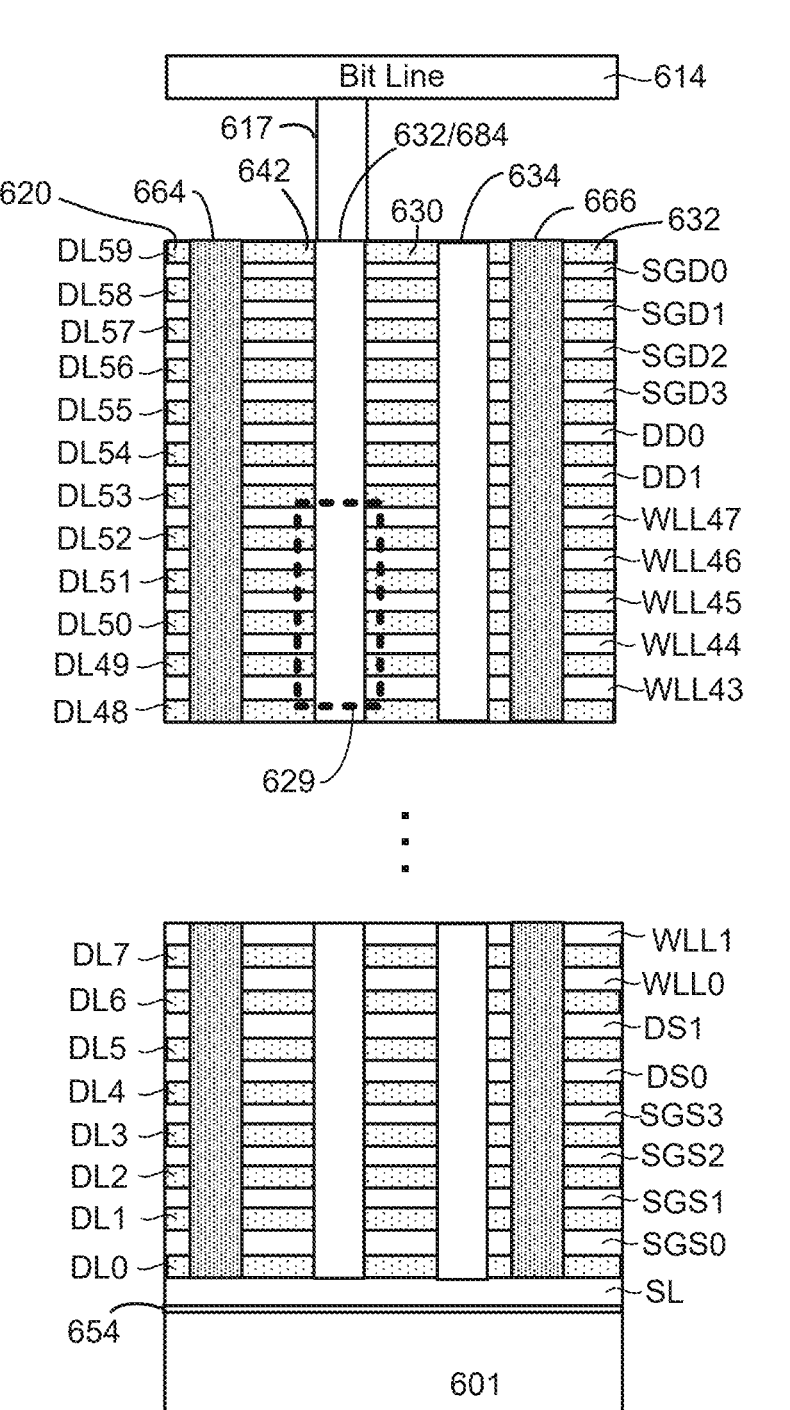

Figure 7A
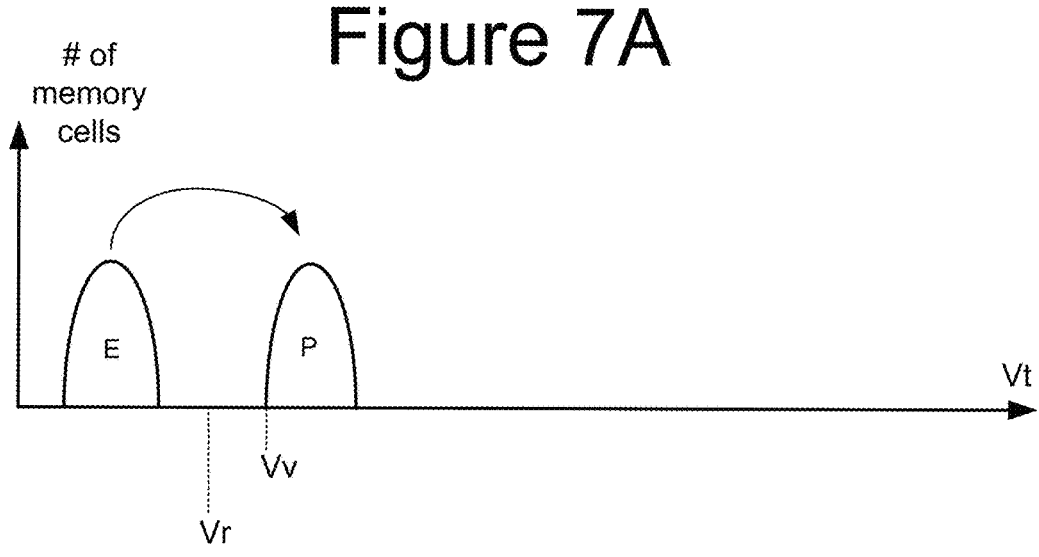
Figure 7B
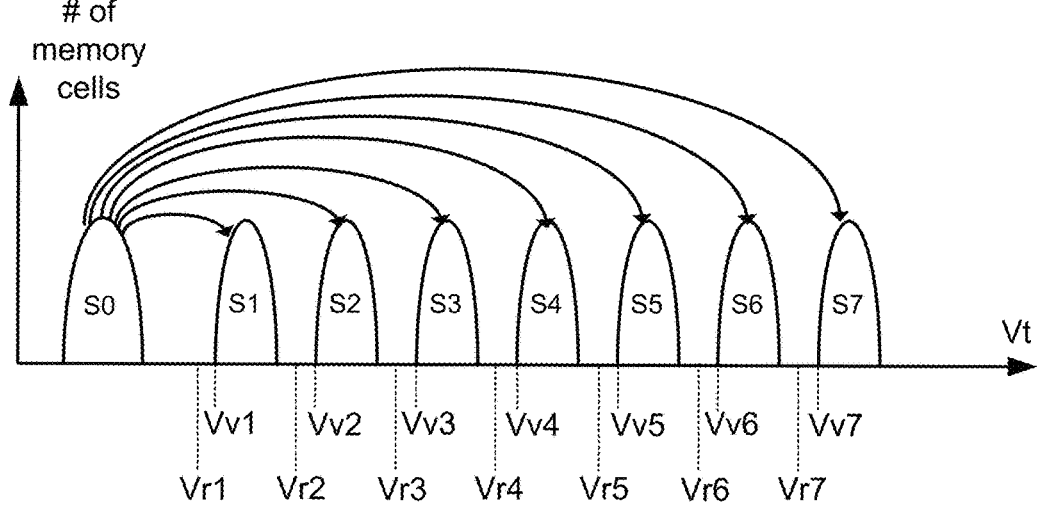
Figure 7C
|            | S0 | S1 | S2 | S3 | S4 | S5 | S6 | S7 |
|------------|----|----|----|----|----|----|----|----|
| Upper Page | 1  | 1  | 1  | 0  | 0  | 0  | 0  | 1  |
| Middle Page| 1  | 1  | 0  | 0  | 1  | 1  | 0  | 0  |
| Lower Page | 1  | 0  | 0  | 0  | 0  | 1  | 1  | 1  |

| Input (IN) | Weight (W) | Output (IN×W) |
|:---:|:---:|:---:|
| -1 | -1 | +1 |
| -1 | +1 | -1 |
| +1 | -1 | -1 |
| +1 | +1 | +1 |
Figure 18
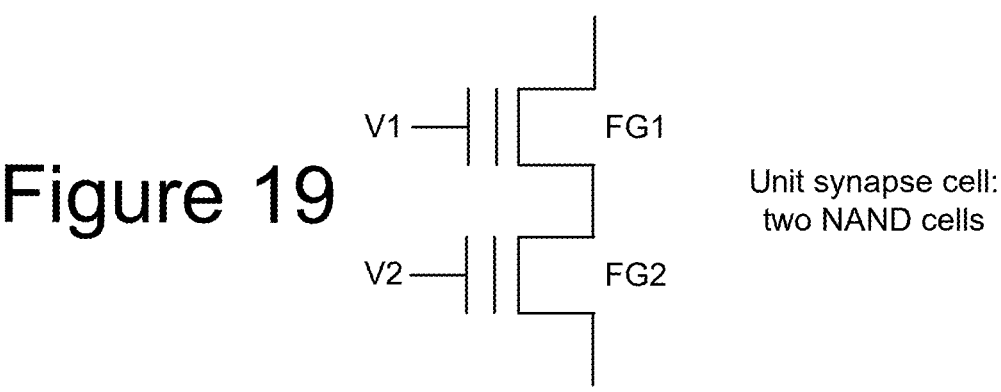
Figure 19
Figure 19
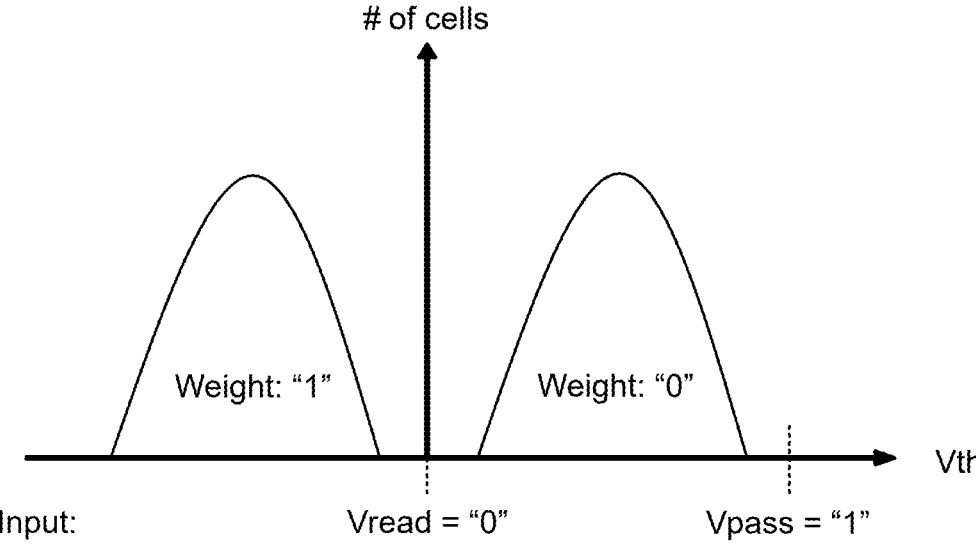
Figure 20

| Case | Input logic | Input voltage | | Weight logic | Weight Vth | | Output logic | Discharged current | Output voltage |
|---|---|---|---|---|---|---|---|---|---|
| | | V1 | V2 | | FG1 | FG2 | | | |
| | | "1" = Vpass | "0" = Vread | | | | | | |
| 1 | -1 | 0 | 0 | -1 | 0 | 1 | +1 | Icell | ΔV drop |
| 2 | +1 | 0 | 1 | -1 | 0 | 1 | -1 | x | No drop |
| 3 | -1 | 1 | 0 | +1 | 1 | 0 | -1 | x | No drop |
| 4 | +1 | 0 | 1 | +1 | 1 | 0 | +1 | Icell | ΔV drop |

Figure 22

| BNN algebra | | | | | | | | | |
|---|---|---|---|---|---|---|---|---|---|
| Binary $I^{bnn}$ | | 1 | -1 | 1 | 1 | -1 | -1 | 1 | -1 |
| Binary $W^{bnn}$ | | -1 | 1 | 1 | -1 | -1 | -1 | 1 | -1 |
| Accumulate add | sum( | -1 | -1 | 1 | -1 | 1 | 1 | 1 | 1 ) |
| Dot-product $P^{bnn\_dec}$ | 2 | | | | | | | | |
| Derived $P^{bnn\_dec}$ | $2 * CNT^{bnn\_out} - S$  (Eq. 1) | | | | | | | | |

Figure 24

| SLC NAND-based BNN | | | | | | | | | |
|---|---|---|---|---|---|---|---|---|---|
| $I^{bnn}$ | | 1 | 0 | 1 | 1 | 0 | 0 | 1 | 0 |
| $W^{bnn}$ | | 0 | 1 | 1 | 0 | 0 | 0 | 1 | 0 |
| SA output | XNOR( | 0 | 0 | 1 | 0 | 1 | 1 | 1 | 1 ) |
| $CNT^{bnn\_out}$ | popcount | 5 (count number of 1 bits) | | | | | | | |

Figure 25

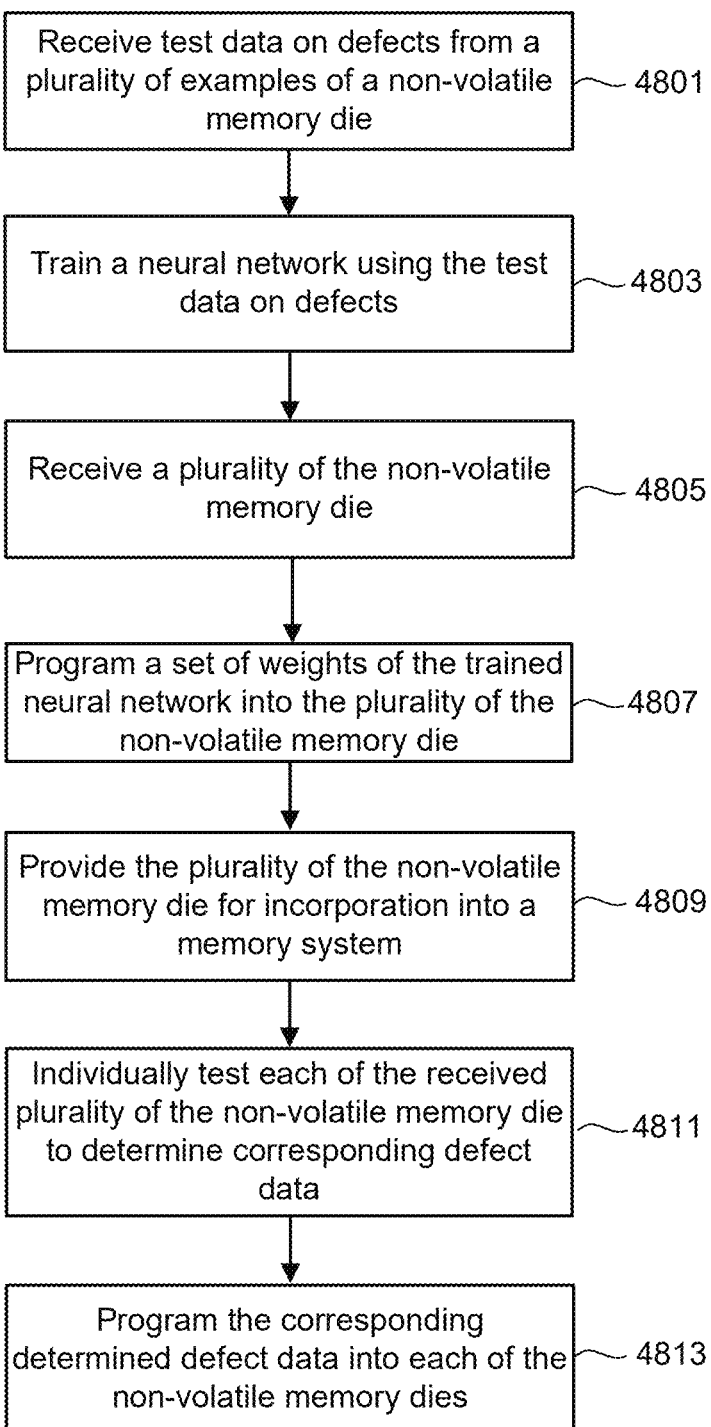

Receive test data on defects from a plurality of examples of a non-volatile memory die — 4801

Train a neural network using the test data on defects — 4803

Receive a plurality of the non-volatile memory die — 4805

Program a set of weights of the trained neural network into the plurality of the non-volatile memory die — 4807

Provide the plurality of the non-volatile memory die for incorporation into a memory system — 4809

Individually test each of the received plurality of the non-volatile memory die to determine corresponding defect data — 4811

Program the corresponding determined defect data into each of the non-volatile memory dies — 4813

Figure 48

COMPUTE-IN-MEMORY USING NEURAL NETWORKS STORED IN A NON-VOLATILE MEMORY FOR PREDICTIVE BLOCK HEALTH ASSESSMENT OF THE NON-VOLATILE MEMORY

CLAIM OF PRIORITY

This application claims priority from U.S. Provisional Patent Application No. 63/659,126, entitled "COMPUTE-IN-MEMORY USING NEURAL NETWORKS STORED IN A NON-VOLATILE MEMORY FOR PREDICTIVE BLOCK HEALTH ASSESSMENT OF THE NON-VOLATILE MEMORY," by Li et al., filed Jun. 12, 2024, incorporated by reference herein in its entirety.

BACKGROUND

The present disclosure relates to technology for non-volatile storage.

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a set of inputs. Although such neural networks can provide highly accurate results, they are extremely computationally intensive, and the data transfers involved in reading the weights connecting the different layers out of memory and transferring these weights into the processing units of a processing unit can be quite intensive.

BRIEF DESCRIPTION OF THE DRAWINGS

Like-numbered elements refer to common components in the different figures.

FIG. 6D depicts a portion of an embodiment of three dimensional memory structure showing a cross-sectional view along line AA of FIG. 6C.

FIG. 7A depicts threshold voltage distributions of memory cells in a binary embodiment.

FIG. 7B depicts threshold voltage distributions of memory cells in a multi-level cell (MLC) embodiment.

FIG. 7C is a table describing one example of an assignment of data values to data states.

FIG. 18 is a table illustrating the output of a binary neural network in response to the different input-weight combinations.

FIG. 19 illustrates an embodiment for a unit synapse cell for storing a binary weight in a pair of series connected memory cells.

FIG. 20 illustrates the distribution of threshold voltages for the storage of data states on a binary, or single level cell (SLC), memory.

FIGS. 21 and 22 illustrate an embodiment for implementing a binary neural network using a pair of series connected SLC memory cells as unit synapse.

FIGS. 24 and 25 consider an example of the computation of a dot-product for the binary neural network algebra and how to implement this using a counter based summation digital circuit for an SLC NAND binary neural network (BNN) embodiment.

FIG. 40 is an outline of embodiments for intelligent NAND with compute-in-memory to enable predictive block health assessment.

FIG. 48 is a flowchart of an embodiment for preparing memory dies for compute-in-memory for predictive block health assessment using neural networks.

DETAILED DESCRIPTION

Non-volatile memory devices, such as NAND memory, acquire defects over the course of their operation. A number of error management techniques are know to identify and retire bad blocks of the memory device. However, these error management techniques are time consuming and frequently inaccurate, often prone to overkill or underkill, either retiring blocks that still have a quite a bit of life left or not retiring blocks before data loss occurs. Neural networks are a powerful technique for making complex determinations. The following presents embodiments for predictive block health assessment of a non-volatile memory that can be performed by storing a pre-trained neural network for this purpose on the memory device itself. As operational errors occur during operation of the memory device, this defect data is saved by the non-volatile memory and can be used as input data for the neural network to identify and retire potential bad blocks before data loss occurs.

FIGS. 1A-6F describe one example of a storage system that can be used to implement the technology disclosed herein.

Figure 1A:
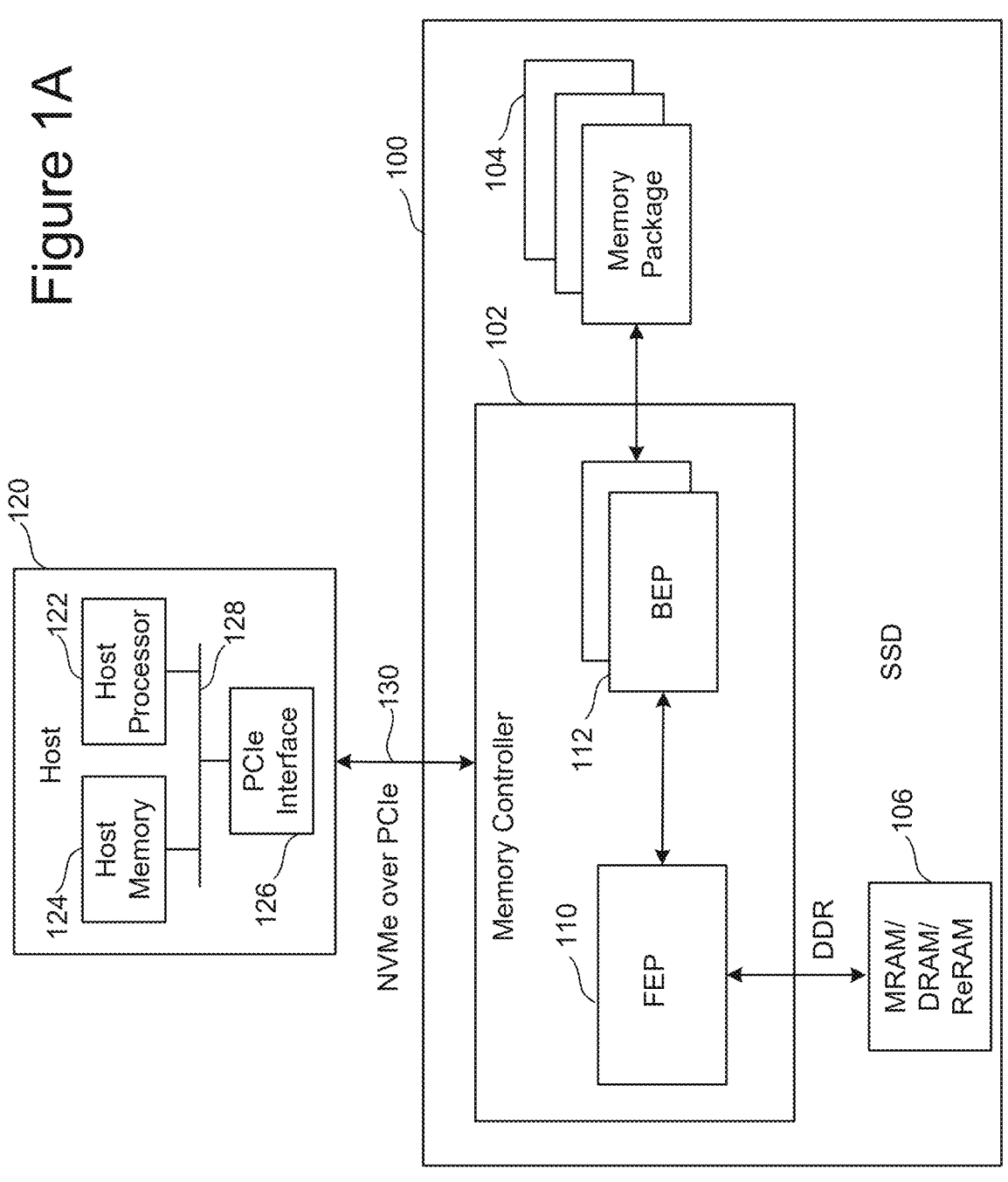
FIG. 1A is a block diagram of one embodiment of a storage system connected to a host.

FIG. 1A is a block diagram of one embodiment of a storage system 100 connected to a host system 120. Storage system 100 can implement the technology disclosed herein. Many different types of storage systems can be used with the technology disclosed herein. One example storage system is a solid state drive ("SSD"); however, other types of storage systems can also be used. Storage system 100 comprises a memory controller 102, memory package 104 for storing data, and local memory (e.g., MRAM/DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two dimensional NAND flash memory and/or three dimensional NAND flash memory). In other embodiments, the memory package 104 can include other types of memory; for example, the memory package can include Phase Change Memory (PCM) memory.

In one embodiment, memory controller 102 communicates with host system 120 using an interface 130 that implements NVM Express (NVMe) over PCI Express (PCIe). For working with storage system 100, host system 120 includes a host processor 122, host memory 124, and a PCIe interface 126, which communicate over bus 128. Host memory 124 is the host's physical memory, and can be DRAM, SRAM, non-volatile memory or another type of storage. Host system 120 is external to and separate from storage system 100. In one embodiment, storage system 100 is embedded in host system 120. In other embodiments, the controller 102 may communicate with host 120 via other types of communication buses and/or links, including for example, over an NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like. For simplicity, the example embodiments below will be described with respect to a PCIe example.

Figure 1B:
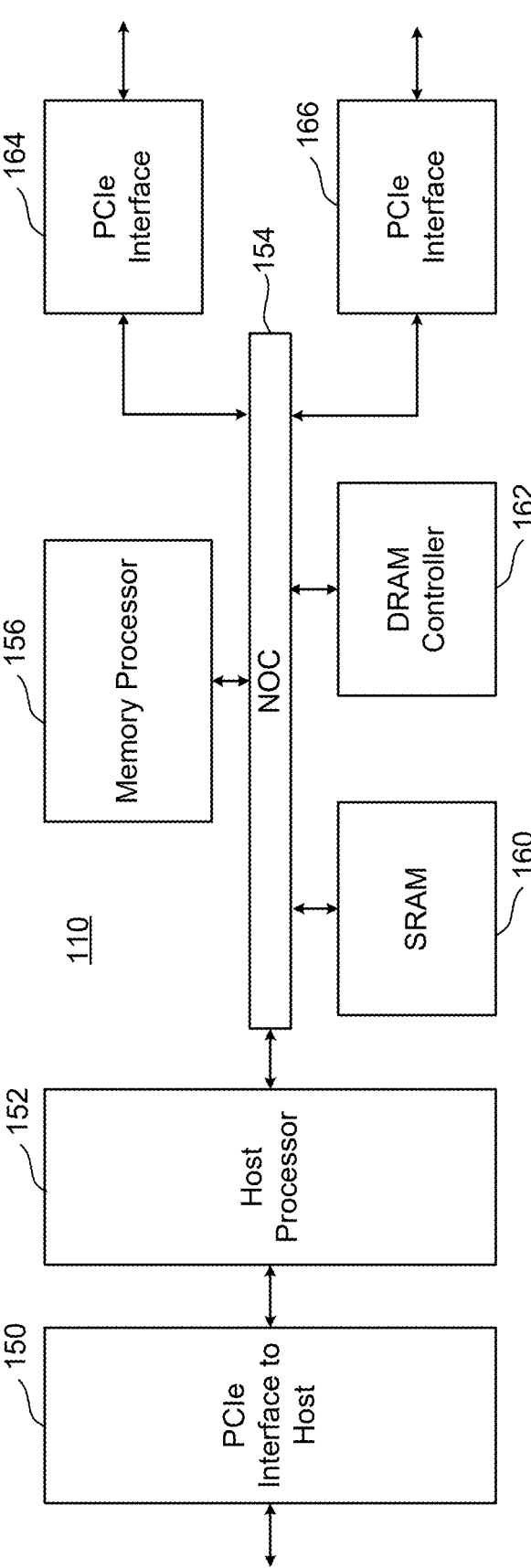
FIG. 1B is a block diagram of one embodiment of a Front End Processor Circuit.

FIG. 1B is a block diagram of one embodiment of FEP circuit 110. FIG. 1B shows a PCIe interface 150 to communicate with host system 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keeps growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the local memory 106 (e.g., DRAM/MRAM/ReRAM). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or fewer than two BEP circuits 112; therefore, there can be more than two PCIe Interfaces.

Figure 2A:
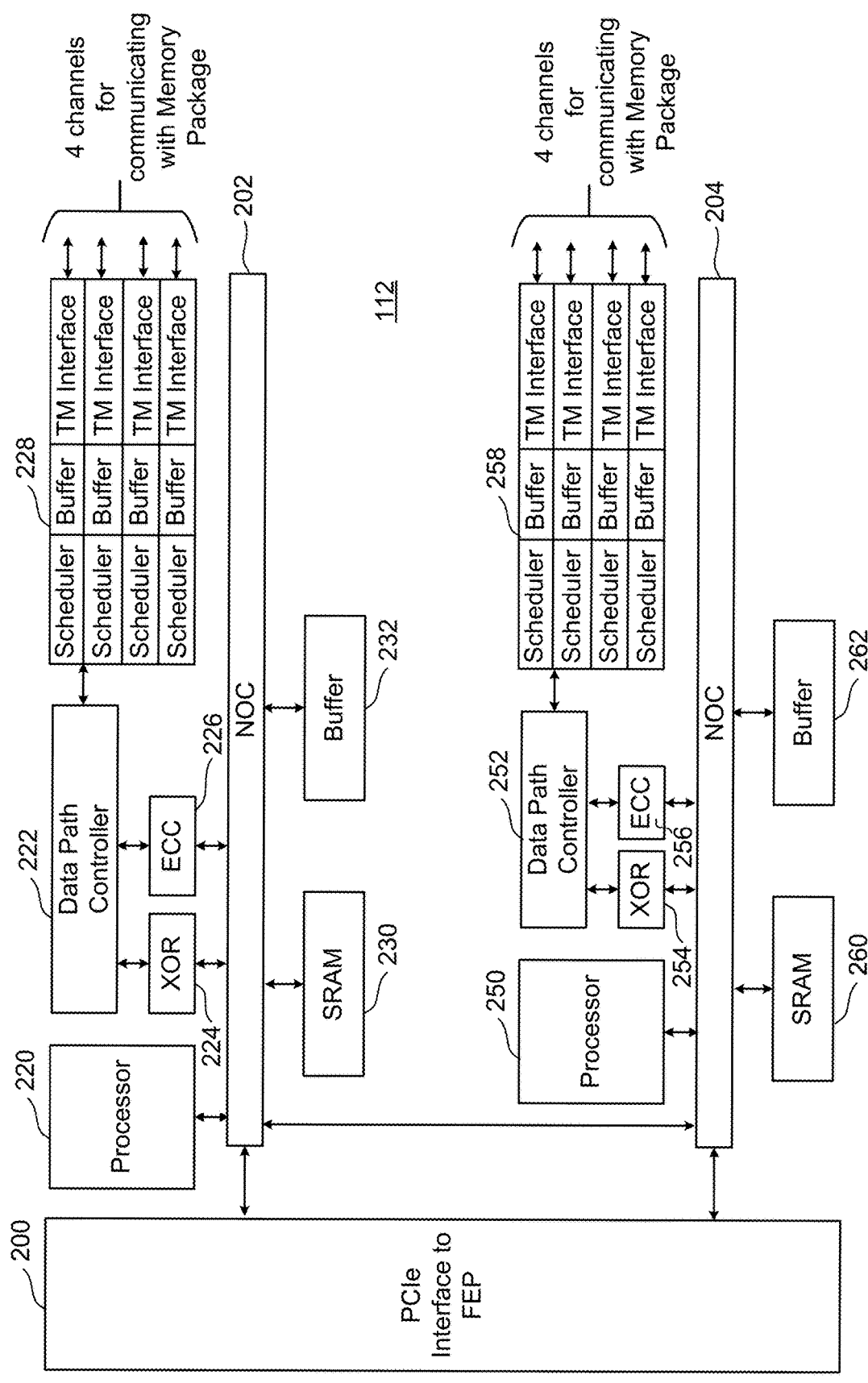
FIG. 2A is a block diagram of one embodiment of a Back End Processor Circuit.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254), and ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 are able to recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

Figure 2B:
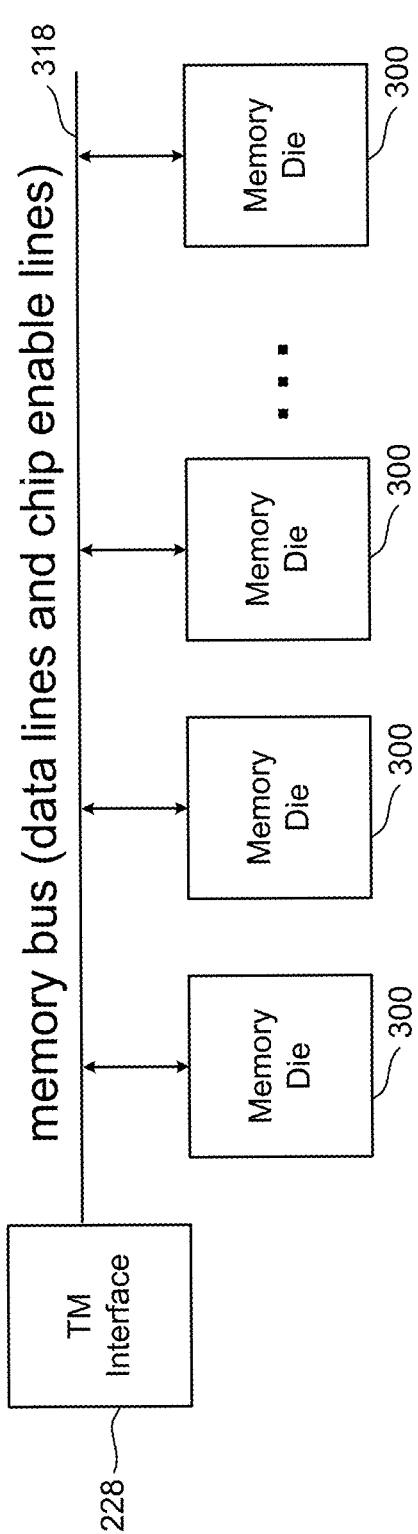
FIG. 2B is a block diagram of one embodiment of a memory package.

FIG. 2B is a block diagram of one embodiment of a memory package 104 that includes a plurality of memory dies 300 connected to a memory bus (data lines and chip enable lines) 318. The memory bus 318 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or sixteen memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 3A:
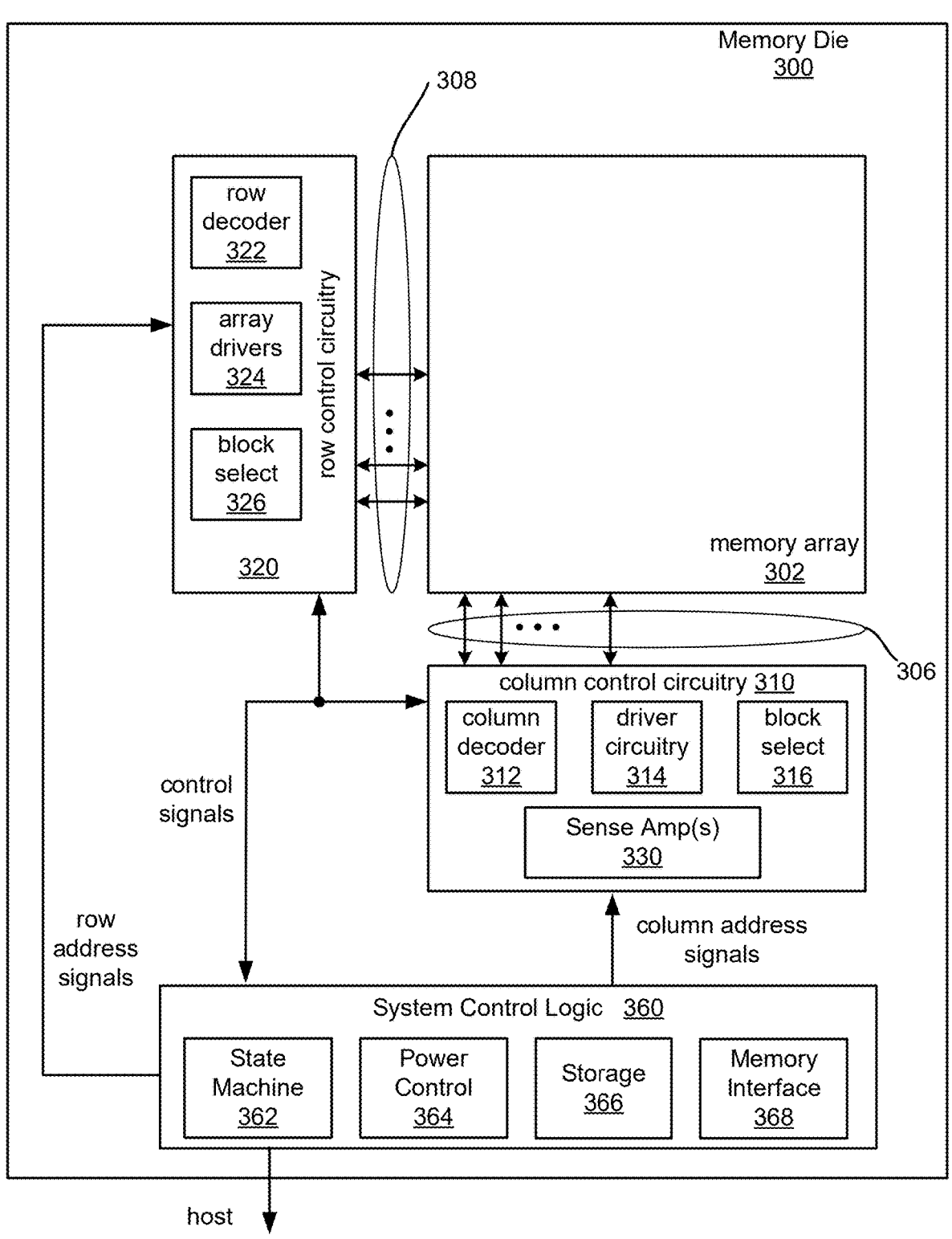
FIG. 3A is a functional block diagram of an embodiment of a memory die.

FIG. 3A is a block diagram that depicts one example of a memory die 300 that can implement the technology described herein. Memory die 300, which can correspond to one of the memory 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only a single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all of the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three dimensional memory array of non-volatile memory cells in which multiple memory levels are formed above a single substrate, such as a wafer. The memory structure may comprise any type of non-volatile memory that is mono-lithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a pro-grammable metallization cell. A conductive bridge memory element may be used as a state change element based on the physical relocation of ions within a solid electrolyte. In some cases, a conductive bridge memory element may include two solid metal electrodes, one relatively inert (e.g., tung-sten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's mag-netization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behav-ior of chalcogenide glass. One embodiment uses a GeTe-Sb2Te3 super lattice to achieve non-thermal phase changes by simply changing the co-ordination state of the Germa-nium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single spe-cific memory structure, memory construction or material composition, but covers many relevant memory structures within the spirit and scope of the technology as described herein and as understood by one of ordinary skill in the art.

The elements of FIG. 3A can be grouped into two parts, the structure of memory structure 302 of the memory cells and the peripheral circuitry, including all of the other elements. An important characteristic of a memory circuit is its capacity, which can be increased by increasing the area of the memory die of memory system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the memory system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 3A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 3B:
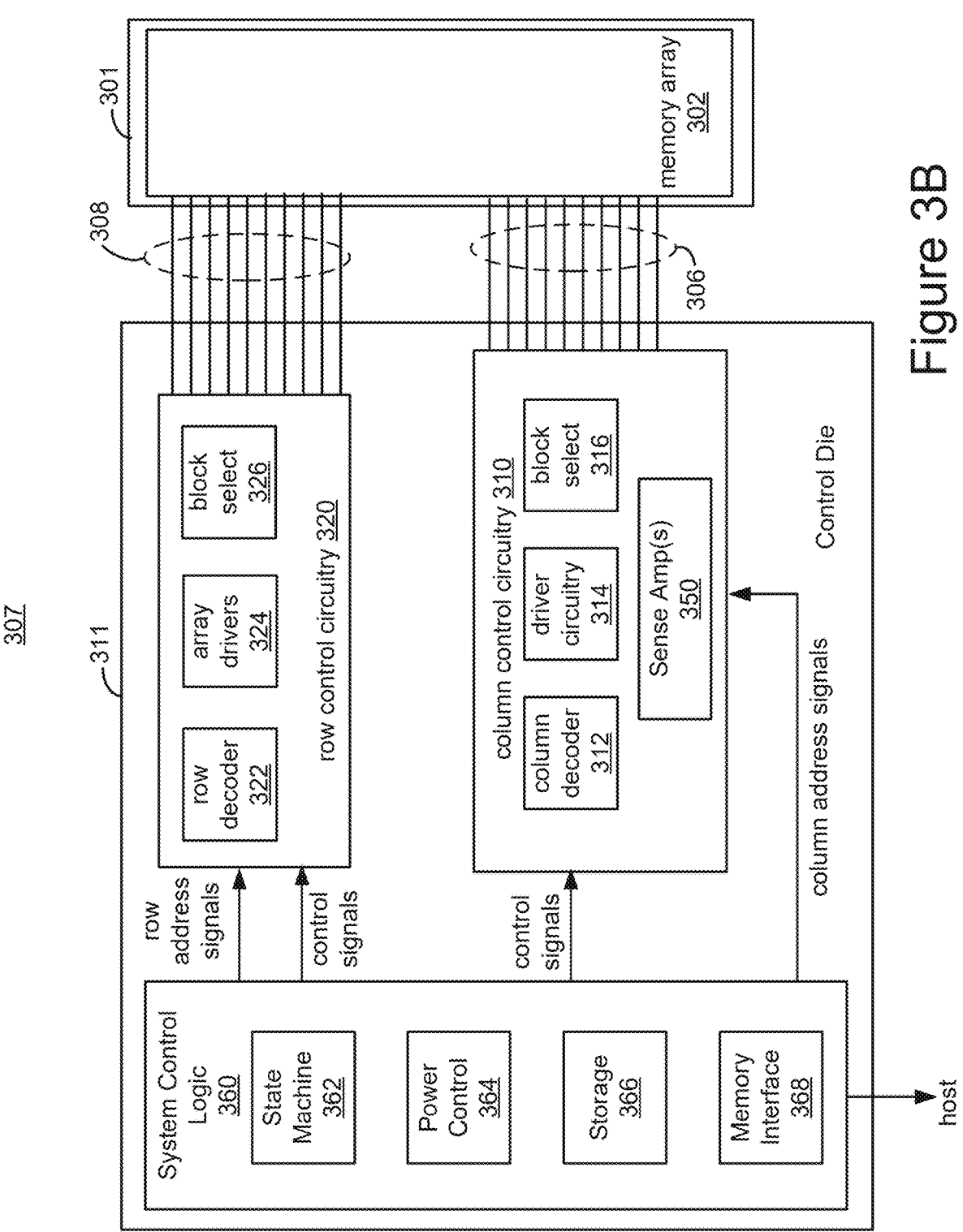
FIG. 3B is a functional block diagram of an embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 3B shows an example of the peripheral circuitry, including control circuits, formed in a peripheral circuit or control die 311 coupled to memory structure 302 formed in memory structure die 301. Common components are labelled similarly to FIG. 3A. It can be seen that system control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 3B shows column control circuitry 310 including sense amplifier(s) 350 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrase "one or more control circuits" can include one or more of controller 102, system control logic 360, column control circuitry 310, row control circuitry 320, a micro-controller, a state machine, and/or other control circuitry, or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 4:
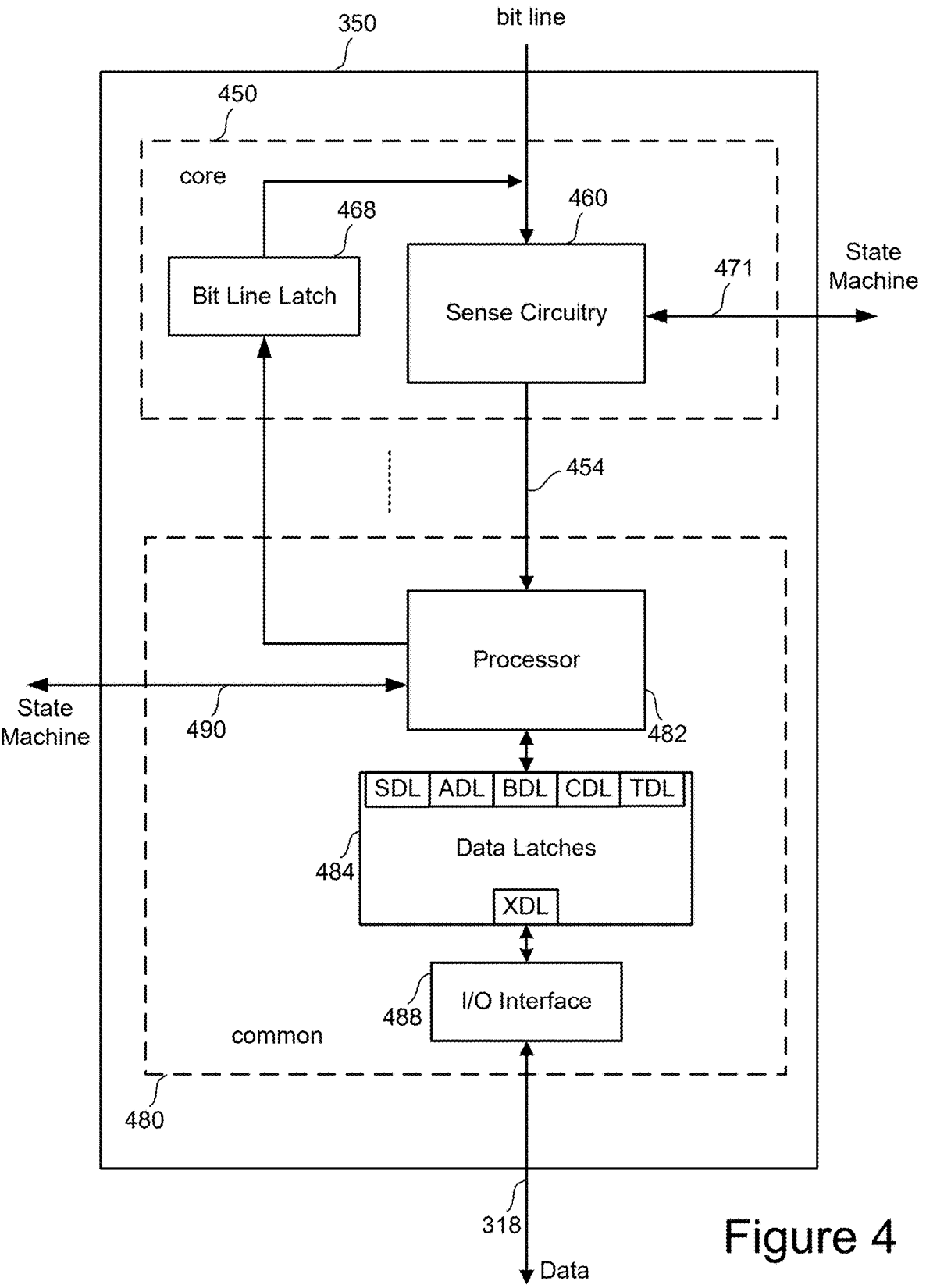
FIG. 4 is a block diagram of an individual sense block partitioned into a core portion and a common portion.

FIG. 4 is a block diagram of an individual sense block of sense amplifiers 350 partitioned into a core portion, referred to as a sense module 480, and a common portion 480. In one embodiment, there will be a separate sense module 450 for each bit line and one common portion 480 for a set of multiple sense modules 450. In one example, a sense block will include one common portion 480 and eight sense, twelve, or sixteen modules 450. Each of the sense modules in a group will communicate with the associated common portion via a data bus 454.

Sense module 450 comprises sense circuitry 460 that determines whether a conduction current in a connected bit line is above or below a predetermined level or, in voltage based sensing, whether a voltage level in a connected bit line is above or below a predetermined level. The sense circuitry 460 is to receive control signals from the state machine via input lines 471. In some embodiments, sense module 450 includes a circuit commonly referred to as a sense amplifier. Sense module 450 also includes a bit line latch 468 that is used to set a voltage condition on the connected bit line. For example, a predetermined state latched in bit line latch 468 will result in the connected bit line being pulled to a state designating program inhibit (e.g., VDD).

Common portion 480 comprises a processor 468, a set of data latches 484 and an I/O Interface 488 coupled between the set of data latches 484 and data bus 318. Processor 482 performs computations. For example, one of its functions is to determine the data stored in the sensed memory cell and store the determined data in the set of data latches. The set of data latches 484 is used to store data bits determined by processor 468 during a read operation. It is also used to store data bits imported from the data bus 318 during a program operation. The imported data bits represent write data meant to be programmed into the memory. I/O interface 488 provides an interface between data latches 484 and the data bus 318.

During read or sensing, the operation of the system is under the control of state machine 362 that controls (using power control 364) the supply of different control gate or other bias voltages to the addressed memory cell(s). As it steps through the various predefined control gate voltages corresponding to the various memory states supported by the memory, the sense module 450 may trip at one of these voltages and an output will be provided from sense module 450 to processor 468 via bus 454. At that point, processor 468 determines the resultant memory state by consideration of the tripping event(s) of the sense module and the information about the applied control gate voltage from the state machine via input lines 490. It then computes a binary encoding for the memory state and stores the resultant data bits into data latches 484. In another embodiment of the core portion, bit line latch 468 serves double duty, both as a latch for latching the output of the sense module 450 and also as a bit line latch as described above.

Data latch stack 484 contains a stack of data latches corresponding to the sense module. In one embodiment, there are three, four or another number of data latches per sense module 450. In one embodiment, the latches are each one bit. In this document, the latches in one embodiment of data latch stack 484 will be referred to as SDL, XDL, ADL, BDL, and CDL. In the embodiments discussed here, the latch XDL is a transfer latch used to exchange data with the I/O interface 488. In addition to a first sense amp data latch SDL, the additional latches ADL, BDL and CDL can be used to hold multi-state data, where the number of such latches typically reflects the number of bits stored in a memory cell. For example, in 3-bit per cell multi-level cell (MLC) memory format, the three sets of latches ADL, BDL, CDL can be used for upper, middle, lower page data. In a 2-bit per cell embodiment, only ADL and BDL might be used, while a 4-bit per cell MLC embodiment might include a further set of DDL latches. In other embodiments, the XDL latches can be used to hold additional pages of data, such as a 4-bit per cell MLC embodiment the uses the XDL latches in addition to the three sets of latches ADL, BDL, CDL for four pages of data. The following discussion will mainly focus on a 3-bit per cell embodiment, as this can illustrate the main features but not get overly complicated, but the discussion can also be applied to embodiments with more or fewer bit per cell formats. Some embodiments many also include additional latches for particular functions, such as represented by the TDL latch where, for example, this could be used in "quick pass write" operations where it is used in program operations for when a memory cell is approaching its target state and is partially inhibited to slow its programming rate. In embodiments discussed below, the latches ADL, BDL, . . . can transfer data between themselves and the bit line latch 468 and with the transfer latch XDL, but not directly with the I/O interface 488, so that a transfer from these latches to the I/O interface is transferred by way of the XDL latches.

For example, in some embodiments data read from a memory cell or data to be programmed into a memory cell will first be stored in XDL. In case the data is to be programmed into a memory cell, the system can program the data into the memory cell from XDL. In one embodiment, the data is programmed into the memory cell entirely from XDL before the next operation proceeds. In other embodiments, as the system begins to program a memory cell through XDL, the system also transfers the data stored in XDL into ADL in order to reset XDL. Before data is transferred from XDL into ADL, the data kept in ADL is transferred to BDL, flushing out whatever data (if any) is being kept in BDL, and similarly for BDL and CDL. Once data has been transferred from XDL into ADL, the system continues (if necessary) to program the memory cell through ADL, while simultaneously loading the data to be programmed into a memory cell on the next word line into XDL, which has been reset. By performing the data load and programming operations simultaneously, the system can save time and thus perform a sequence of such operations faster.

During program or verify, the data to be programmed is stored in the set of data latches 484 from the data bus 318. During the verify process, Processor 468 monitors the verified memory state relative to the desired memory state. When the two are in agreement, processor 468 sets the bit line latch 468 so as to cause the bit line to be pulled to a state designating program inhibit. This inhibits the memory cell coupled to the bit line from further programming even if it is subjected to programming pulses on its control gate. In other embodiments the processor initially loads the bit line latch 468 and the sense circuitry sets it to an inhibit value during the verify process.

In some implementations (but not required), the data latches are implemented as a shift register so that the parallel data stored therein is converted to serial data for data bus 318, and vice versa. In one preferred embodiment, all the data latches corresponding to the read/write block of m memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Figure 5:
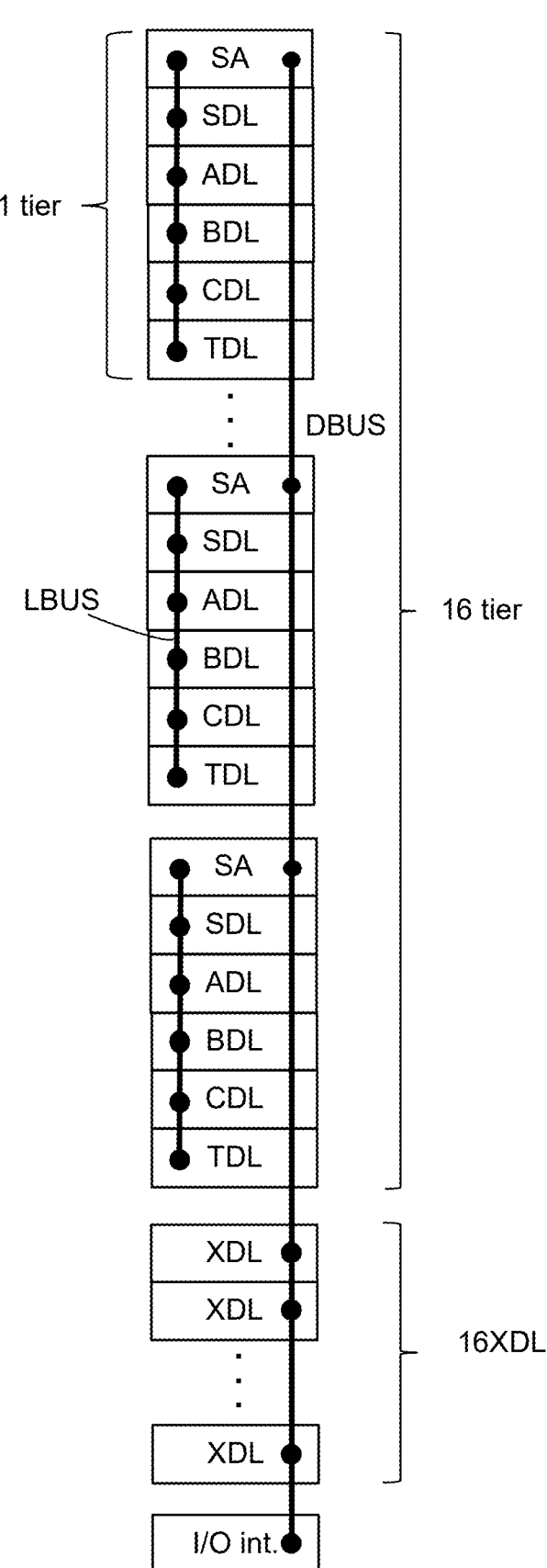
FIG. 5 is a schematic representation of one embodiment for the structure of the data latches.

FIG. 5 is a schematic representation of the structure for one embodiment of the data latches. The example of FIG. 5 is for a 3 bit per cell embodiment where each sense amplifier (SA) has a set of associated data latches forming a "tier" including a sense amp data latch (SDL), the data latches for the 3 bit data states (ADL, BDL, CDL), and an auxiliary data latch (TDL) that could be used for implementing quick pass write operations, for example. In one set of embodiments for 4 bit data states, the XDL data latches can be used for a fourth page of data. Within each of these stacks of data latches, data can be transferred between the sense amplifier and its associated set of latches along a local bus LBUS. In some embodiments, each of the sense amplifiers and corresponding set of data latches of a tier that are associated with one bit line can be grouped together for a corresponding "column" of bit lines, and formed on a memory die within the pitch of the column of memory cells along the periphery of the memory cell array. The example discussed here uses an embodiment where 16 bit lines form a column so that a 16-bit word is physically located together in the array. An example of a memory array may have 1000 such columns, corresponding to 16K bit lines. In the topology of the FIG. 5 embodiment, each sense amplifier and its set of associated data latches of a tier are connected along an internal bus structure of DBUSs along which data can be transferred between each of the tier of latches and a corresponding XDL. For the embodiment described in the following, the XDL transfer latches can transfer data to and from the I/O interface, but the other data latches of the tier (e.g., ADL) are not arranged to transfer data directly to or from the I/O interface and must go through the intermediary of the transfer data latch XDL.

As has been briefly discussed above, the control die 311 and the memory structure die 301 may be bonded together. Bond pads on each die 301, 311 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 301, 311. Where no such film is initially provided, a space between the dies may be under filled with an epoxy or other resin or polymer. The under-fill material may be applied as a liquid which then hardens into a solid layer. This under-fill step protects the electrical connections between the dies 301, 311, and further secures the dies together. Various materials may be used as under-fill material, but in embodiments, it may be Hysol epoxy resin from Henkel Corp., having offices in California, USA.

Figure 6A:
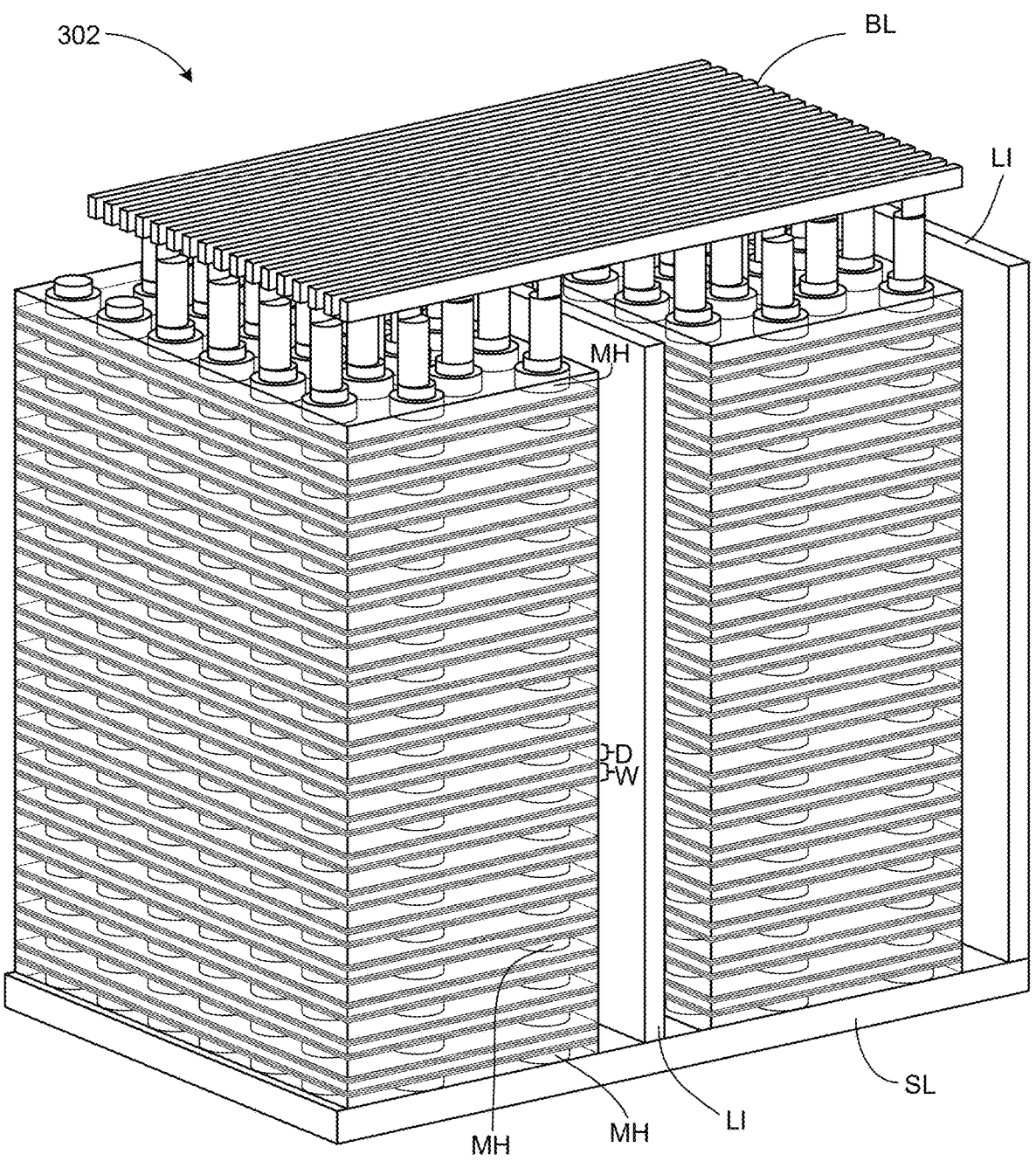
FIG. 6A is a perspective view of a portion of one example embodiment of a monolithic three dimensional memory array that can comprise memory structure.

FIG. 6A is a perspective view of a portion of one example embodiment of a monolithic three dimensional memory array that can comprise memory structure 302, which includes a plurality non-volatile memory cells. For example, FIG. 6A shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The word line layers contain one or more word lines that are connected to memory cells. For example, a word line may be connected to a control gate of a memory cell. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into multiple (e.g., four or five) "fingers" or sub-blocks by local interconnects LI, in an embodiment. (In some usages, these figures are referred to as "strings", but the terminology of fingers will be used here to avoid confusion with NAND strings.) FIG. 6A shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/ memory holes is marked as MH. Note that in FIG. 6A, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

Figure 6B:
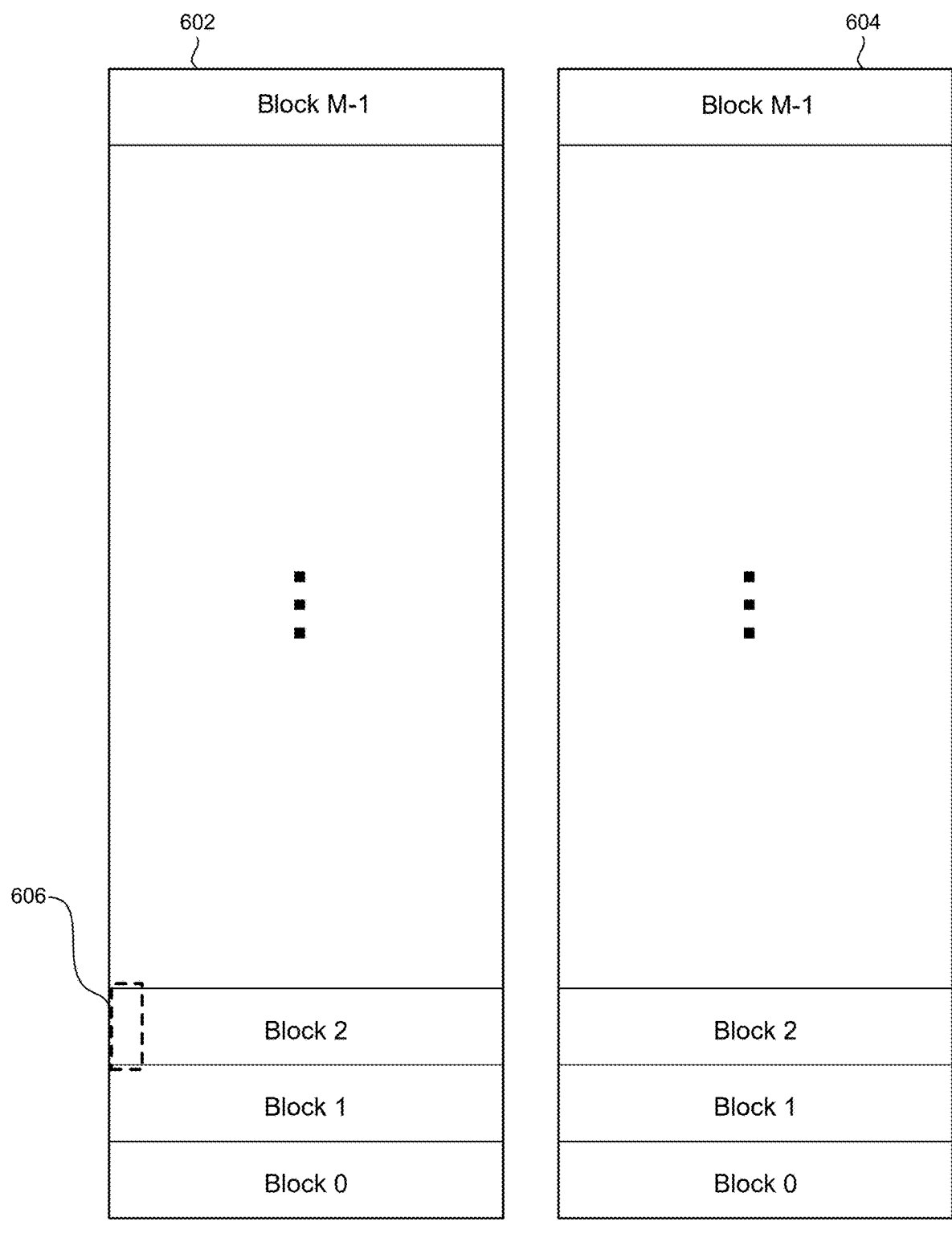
FIG. 6B is a block diagram explaining one example organization of memory structure.

FIG. 6B is a block diagram explaining one example organization of memory structure 302, which is divided into two planes 602 and 604. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 602 includes block 0, 2, 4, 6, . . . and plane 604 includes blocks 1, 3, 5, 7, . . . . In on embodiment, a block of memory cells is a unit of erase. That is, all memory cells of a block are erased together. In other embodiments, memory cells can be grouped into blocks for other reasons, such as to organize the memory structure 302 to enable the signaling and selection circuits.

Figure 6C:
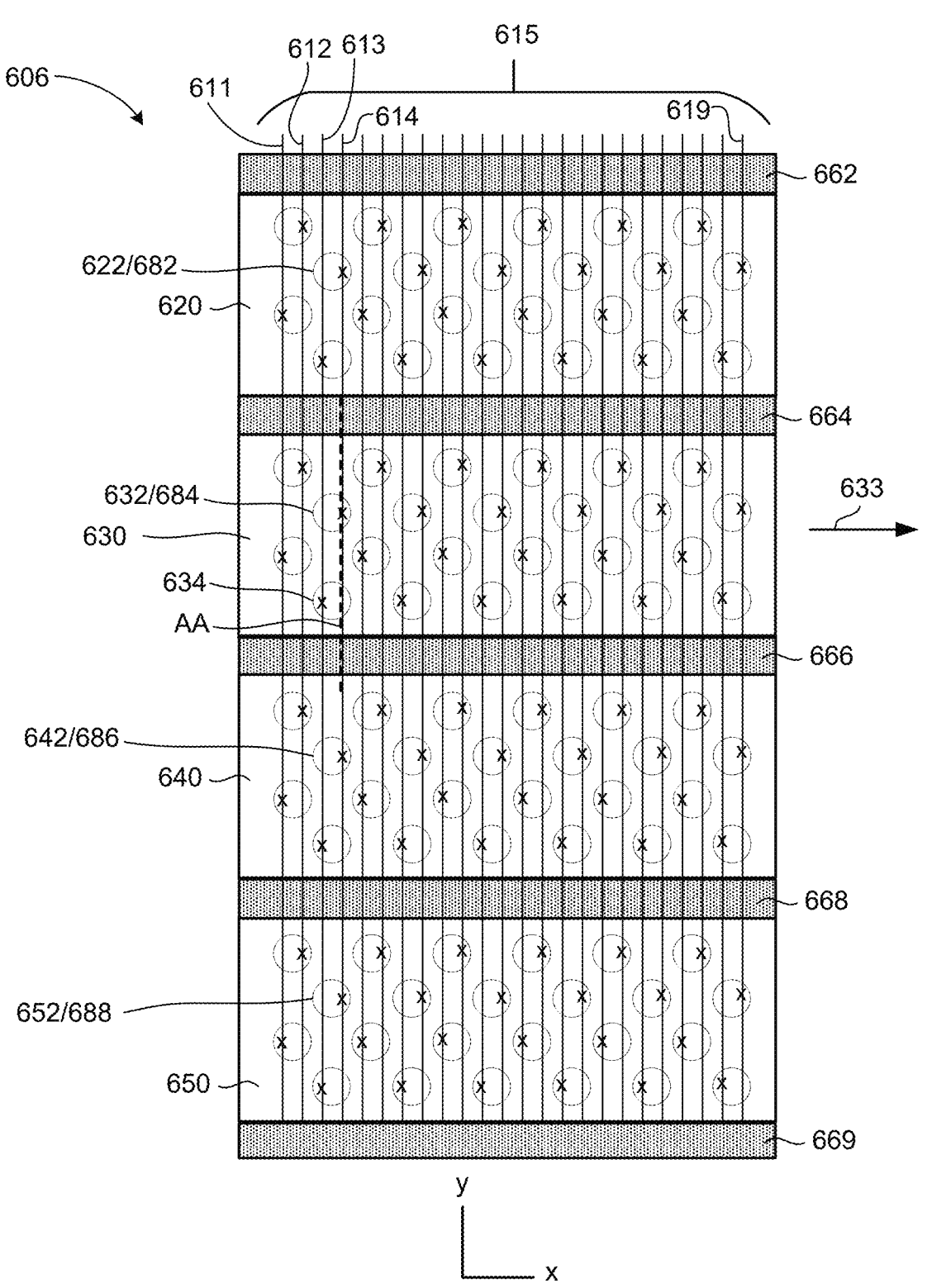
FIG. 6C is a block diagram depicting a top view of a portion of one block from the memory structure.
Figure 6E:
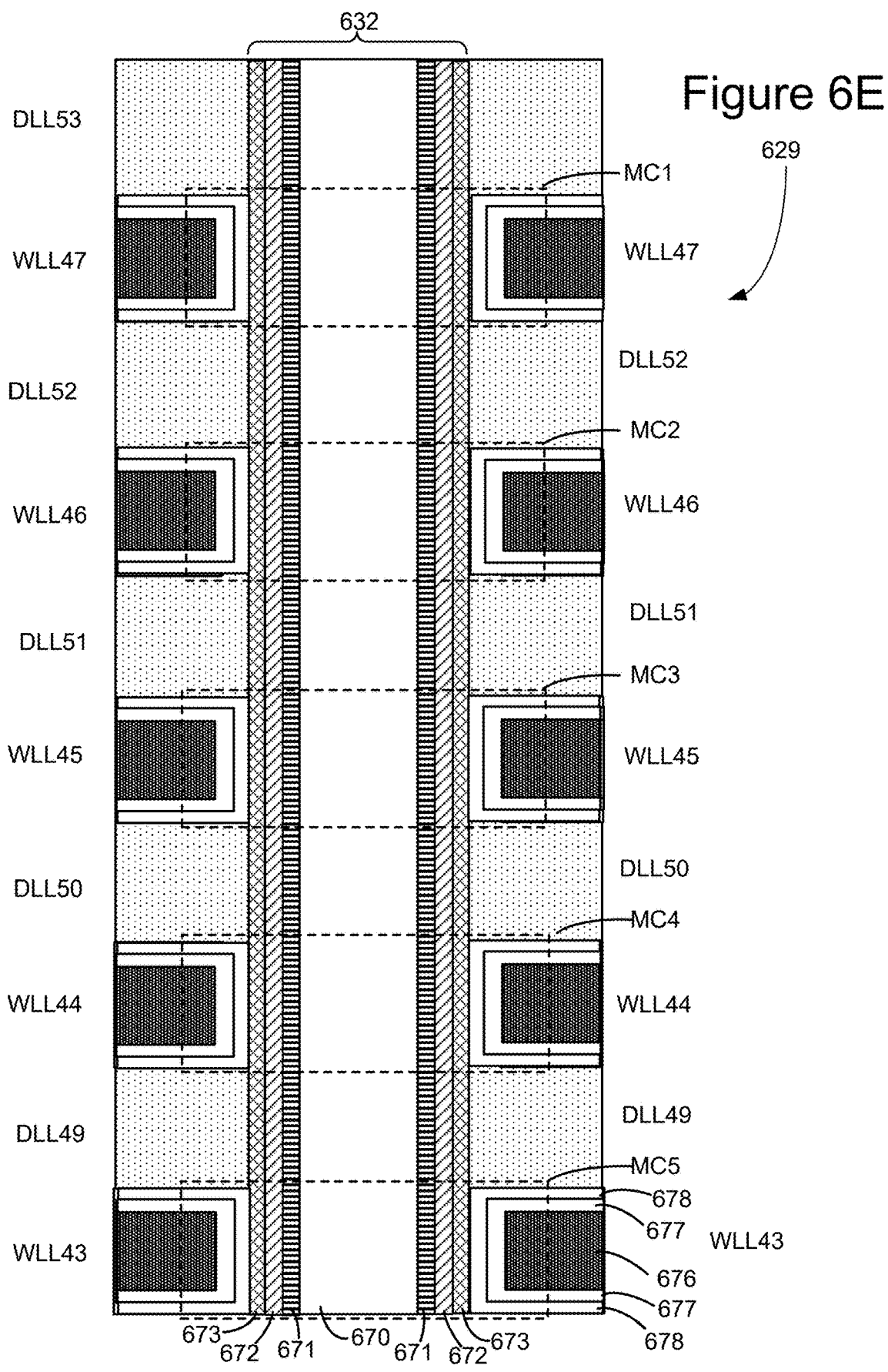
FIG. 6E depicts a cross sectional view of region of FIG. 6D that includes a portion of a vertical column.

FIGS. 6C-6E depict an example 3D NAND structure. FIG. 6C is a block diagram depicting a top view of a portion of one block from memory structure 302. The portion of the block depicted in FIG. 6C corresponds to portion 606 in block 2 of FIG. 6B. As can be seen from FIG. 6C, the block depicted in FIG. 6C extends in the direction of 633. In one embodiment, the memory array will have 60 layers. Other embodiments have less than or more than 60 layers. However, FIG. 6C only shows the top layer.

FIG. 6C depicts a plurality of circles that represent the vertical columns. Each of the vertical columns includes multiple select transistors and multiple memory cells. In one embodiment, each vertical column implements a NAND string. For example, FIG. 6C depicts vertical columns 622, 632, 642 and 652. Vertical column 622 implements NAND string 682. Vertical column 632 implements NAND string 684. Vertical column 642 implements NAND string 686. Vertical column 652 implements NAND string 688. More details of the vertical columns are provided below. Since the block depicted in FIG. 6C extends in the direction of arrow 633 and in the direction of arrow 633, the block includes more vertical columns than depicted in FIG. 6C.

FIG. 6C also depicts a set of bit lines 615, including bit lines 611, 612, 613, 614, . . . , 619. FIG. 6C shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 614 is connected to vertical columns 622, 632, 642 and 652.

The block depicted in FIG. 6C includes a set of local interconnects 662, 664, 666, 668 and 669 that connect the various layers to a source line below the vertical columns. Local interconnects 662, 664, 666, 668 and 669 also serve to divide each layer of the block into four regions; for example, the top layer depicted in FIG. 6C is divided into regions 620, 630, 640 and 650, which are referred to as fingers or sub-blocks. In the layers of the block that implement memory cells, the four regions are referred to as word line sub-blocks that are separated by the local interconnects. In one embodiment, the word line sub-blocks on a common level of a block connect together at the end of the block to form a single word line. In another embodiment, the word line sub-blocks on the same level are not connected together. In one example implementation, a bit line only connects to one vertical column in each of regions 620, 630, 640 and 650. In that implementation, each block has sixteen rows of active columns and each bit line connects to four rows in each block. In one embodiment, all of four rows connected to a common bit line are connected to the same word line (via different word line sub-blocks on the same level that are connected together); therefore, the system uses the source side select lines and the drain side select lines to choose one (or another subset) of the four to be subjected to a memory operation (program, verify, read, and/or erase).

Although FIG. 6C shows each region having four rows of vertical columns, four regions and sixteen rows of vertical columns in a block, those exact numbers are an example implementation. Other embodiments may include more or fewer regions per block, more or fewer rows of vertical columns per region and more or fewer rows of vertical columns per block.

FIG. 6C also shows the vertical columns being staggered. In other embodiments, different patterns of staggering can be used. In some embodiments, the vertical columns are not staggered.

FIG. 6D depicts a portion of an embodiment of three dimensional memory structure 302 showing a cross-sectional view along line AA of FIG. 6C. This cross sectional view cuts through vertical columns 632 and 634 and region 630 (see FIG. 6C). The structure of FIG. 6D includes four drain side select layers SGD0, SGD1, SGD2 and SGD3; four source side select layers SGS0, SGS1, SGS2 and SGS3; four dummy word line layers DD0, DD1, DS0 and DS1; and forty-eight data word line layers WLL0-WLL47 for connecting to data memory cells. Other embodiments can implement more or less than four drain side select layers, more or less than four source side select layers, more or fewer than four dummy word line layers, and more or fewer than forty eight word line layers (e.g., 96 word line layers). Vertical columns 632 and 634 are depicted protruding through the drain side select layers, source side select layers, dummy word line layers and word line layers. In one embodiment, each vertical column comprises a NAND string. For example, vertical column 632 comprises NAND string 684. Below the vertical columns and the layers listed below is substrate 601, an insulating film 654 on the substrate, and source line SL. The NAND string of vertical column 632 has a source end at a bottom of the stack and a drain end at a top of the stack. As in agreement with FIG. 6C, FIG. 6D show vertical column 632 connected to Bit Line 614 via connector 617. Local interconnects 664 and 666 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

In some embodiments, the word lines are read sequentially, which means that the word lines are read either from low to high (e.g., WLL0 to WLL47) or from high to low (e.g., WLL47 to WLL0). It is not required to read the entire set of word lines when reading sequentially. Techniques are disclosed herein for providing compensation for interference caused by adjacent memory cells on target memory cells during a sequential read.

In some embodiments, the read of an individual word line is broken down into separate reads of sub-blocks. Referring again to FIG. 6C, the block is divided into four sub-blocks 620, 630, 640, 650. Thus, the four sub-blocks on one word line layer may be read, prior to reading the four sub-blocks on an adjacent word line layer. In some embodiments, data state information is used to provide compensation on a sub-block basis. For example, data state information for memory cells at WLL35 is kept for each of the four sub-blocks 620-650. Then, when reading sub-block 620 at WLL36 the data state information for sub-block 620 at WLL35 is used to compensate for interference from adjacent memory cells in sub-block 620 at WLL35, when reading sub-block 630 at WLL36 the data state information for sub-block 630 at WLL35 is used to compensate for interference from adjacent memory cells in sub-block 620 at WLL35, etc.

FIG. 6E depicts a cross sectional view of region 629 of FIG. 6D that includes a portion of vertical column 632. In one embodiment, the vertical columns are round and include four layers; however, in other embodiments more or less than four layers can be included and other shapes can be used. In one embodiment, vertical column 632 includes an inner core layer 670 that is made of a dielectric, such as SiO$_2$. Other materials can also be used. Surrounding inner core 670 is polysilicon channel 671. Materials other than polysilicon can also be used. Note that it is the channel 671 that connects to the bit line. Surrounding channel 671 is a tunneling dielectric 672. In one embodiment, tunneling dielectric 672 has an ONO structure. Surrounding tunneling dielectric 672 is charge trapping layer 673, such as (for example) Silicon Nitride. Other memory materials and structures can also be used. The technology described herein is not limited to any particular material or structure.

FIG. 6E depicts dielectric layers DLL49, DLL50, DLL51, DLL52 and DLL53, as well as word line layers WLL43, WLL44, WLL45, WLL46, and WLL47. Each of the word line layers includes a word line region 676 surrounded by an aluminum oxide layer 677, which is surrounded by a blocking oxide (SiO$_2$) layer 678. The physical interaction of the word line layers with the vertical column forms the memory cells. Thus, a memory cell, in one embodiment, comprises channel 671, tunneling dielectric 672, charge trapping layer 673, blocking oxide layer 678, aluminum oxide layer 677 and word line region 676. For example, word line layer WLL47 and a portion of vertical column 632 comprise a memory cell MC1. Word line layer WLL46 and a portion of vertical column 632 comprise a memory cell MC2. Word line layer WLL45 and a portion of vertical column 632 comprise a memory cell MC3. Word line layer WLL44 and a portion of vertical column 632 comprise a memory cell MC4. Word line layer WLL43 and a portion of vertical column 632 comprise a memory cell MC5. In other architectures, a memory cell may have a different structure; however, the memory cell would still be the storage unit.

Note that the charge trapping layer 673 may extend from one end of the NAND string to the other, and hence may be referred to herein as a continuous charge trapping layer. When a memory cell is programmed, electrons are stored in a portion of the charge trapping layer 673 which is associated with the memory cell. These electrons are drawn into the charge trapping layer 673 from the channel 671, through the tunneling dielectric 672, in response to an appropriate voltage on word line region 676. The Vt of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 6F:
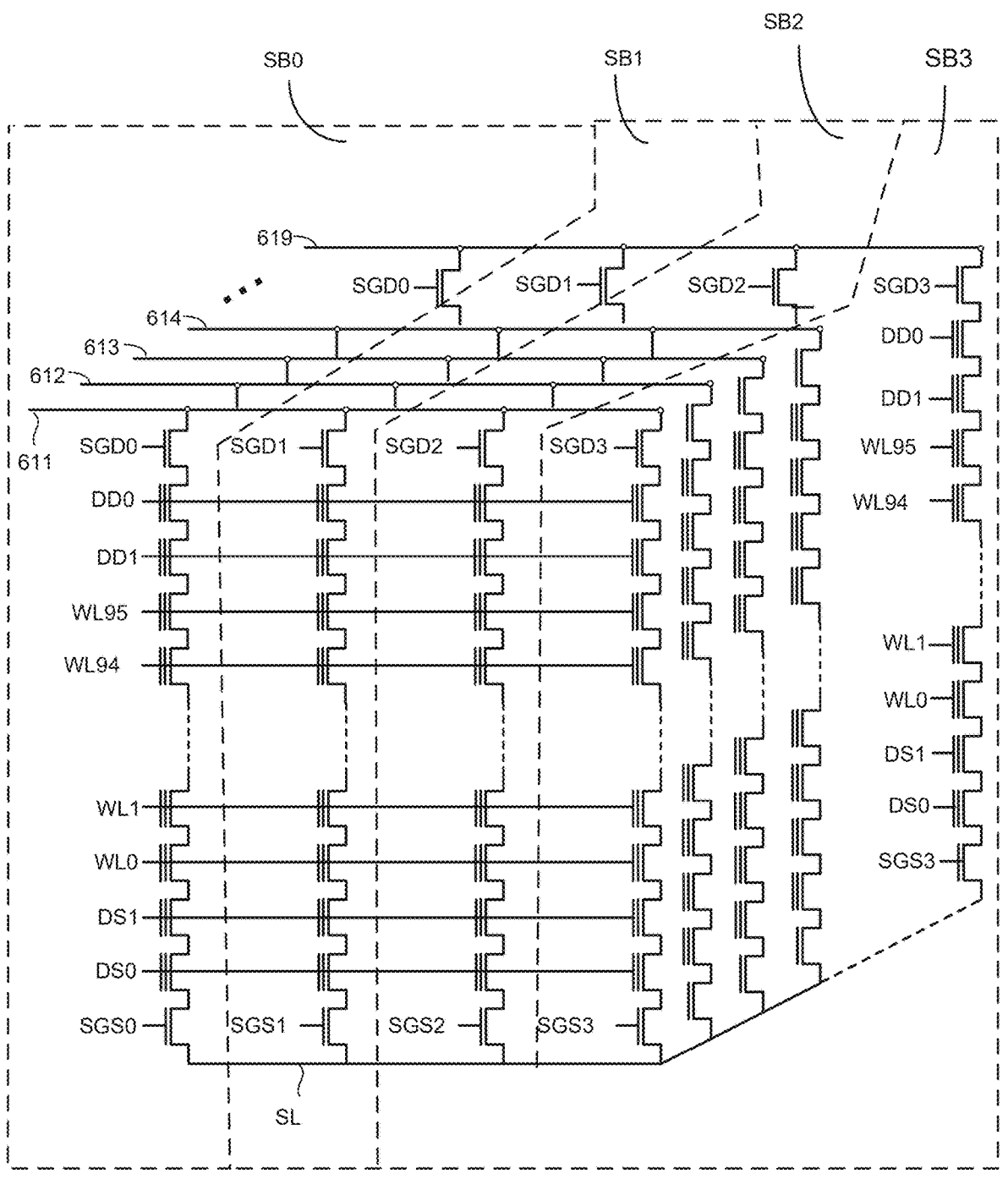
FIG. 6F is a schematic of a plurality of NAND strings showing multiple sub-blocks.

FIG. 6F is a schematic diagram of a portion of the memory depicted in FIGS. 6A-6E. FIG. 6F shows physical word lines WLL0-WLL95 running across the entire block. The structure of FIG. 6F corresponds to portion 606 in Block 2 of FIGS. 6A-6E, including bit lines 611, 612, 613, 614, . . . , 619. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

Although the example memory system of FIGS. 6A-6F is a three dimensional memory structure that includes vertical NAND strings with charge-trapping material, other (2D and 3D) memory structures (e.g., MRAM, ReRAM, PCM) can also be used with the technology described herein.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate.

FIG. 7A is a graph of threshold voltage versus number of memory cells, and illustrates example threshold voltage distributions for the memory array when each memory cell stores one bit of data. FIG. 7A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." Memory cells that store one bit of data are referred to as single level cells ("SLC").

FIG. 7B is a graph of threshold voltage versus number of memory cells, and illustrates example threshold voltage distributions for the memory array when each memory cell stores three bits of data. Other embodiments, however, may use other data capacities per memory cell (e.g., such as one, two, four, or five bits of data per memory cell). Memory cells that store more than one bit of data are referred to as multi-level cells ("MLC"). FIG. 7B shows eight threshold voltage distributions, corresponding to eight data states. For a data state N, that data state N has higher threshold voltages than data state N−1 and lower threshold voltages than data state N+1. The first threshold voltage distribution (data state) S0 represents memory cells that are erased. The other seven threshold voltage distributions (data states) S1-S7 represent memory cells that are programmed and, therefore, are also called programmed data states. In some embodiments, data states S1-S7 can overlap, with controller 122 relying on error correction to identify the correct data being stored.

FIG. 7B shows seven read reference voltages, Vr1, Vr2, Vr3, Vr4, Vr5, Vr6, and Vr7 for reading data from memory cells. By testing (e.g., performing sense operations) whether the threshold voltage of a given memory cell is above or below the seven read reference voltages, the system can determine what data state (i.e., S0, S1, S2, S3, . . . ) a memory cell is in. In FIG. 7A, read reference voltage Vr is used to test whether memory cells are erased or programmed.

FIG. 7B also shows seven verify reference voltages, Vv1, Vv2, Vv3, Vv4, Vv5, Vv6, and Vv7 (also referred to as verify target voltages). When programming memory cells to data state S1, the system will test whether those memory cells have a threshold voltage greater than or equal to Vv1. When programming memory cells to data state S2, the system will test whether the memory cells have threshold voltages greater than or equal to Vv2. When programming memory cells to data state S3, the system will determine whether memory cells have their threshold voltage greater than or equal to Vv3. When programming memory cells to data state S4, the system will test whether those memory cells have a threshold voltage greater than or equal to Vv4. When programming memory cells to data state S5, the system will test whether those memory cells have a threshold voltage greater than or equal to Vv5. When programming memory cells to data state S6, the system will test whether those memory cells have a threshold voltage greater than or equal to Vv6. When programming memory cells to data state S7, the system will test whether those memory cells have a threshold voltage greater than or equal to Vv7.

In one embodiment, known as full sequence programming, memory cells can be programmed from the erased data state S0 directly to any of the programmed data states S1-S7. For example, a population of memory cells to be programmed may first be erased so that all memory cells in the population are in erased data state S0. Then, a programming process is used to program memory cells directly into data states S1, S2, S3, S4, S5, S6, and/or S7. For example, while some memory cells are being programmed from data state S0 to data state S1, other memory cells are being programmed from data state S0 to data state S2 and/or from data state S0 to data state S3, and so on. The arrows of FIG. 7B represent the full sequence programming. The technology described herein can also be used with other types of programming in addition to full sequence programming including (but not limited to) multiple stage/phase programming.

Each threshold voltage distribution (data state) of FIG. 7B corresponds to predetermined values for the set of data bits stored in the memory cells. The specific relationship between the data programmed into the memory cell and the threshold voltage levels of the memory cell depends upon the data encoding scheme adopted for the memory cells. In one embodiment, data values are assigned to the threshold voltage ranges using a Gray code assignment so that if the threshold voltage of a memory erroneously shifts to its neighboring physical state, only one bit will be affected.

FIG. 7C is a table describing one example of an assignment of data values to data states. In the table of FIG. 7B, S0=111 (erased state), S1=110, S2=100, S3=000, S4=010, S5=011, S6=001 and S7=101. Other encodings of data can also be used. No particular data encoding is required by the technology disclosed herein. In one embodiment, when a block is subjected to an erase operation, all memory cells are moved to data state S0, the erased state. Referring back to FIG. 4, in one embodiment the ADL, BDL, and CDL data latches can respectively be used for the lower, middle, and upper page data values of a memory cell during a program operation.

In general, during verify operations and read operations, the selected word line is connected to a voltage (one example of a reference signal), a level of which is specified for each read operation (e.g., see read reference voltages Vr1, Vr2, Vr3, Vr4, Vr5, Vr6, and Vr7, of FIG. 6) or verify operation (e.g. see verify reference voltages Vv1, Vv2, Vv3, Vv4, Vv5, Vv6, and Vv7 of FIG. 6) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 8:
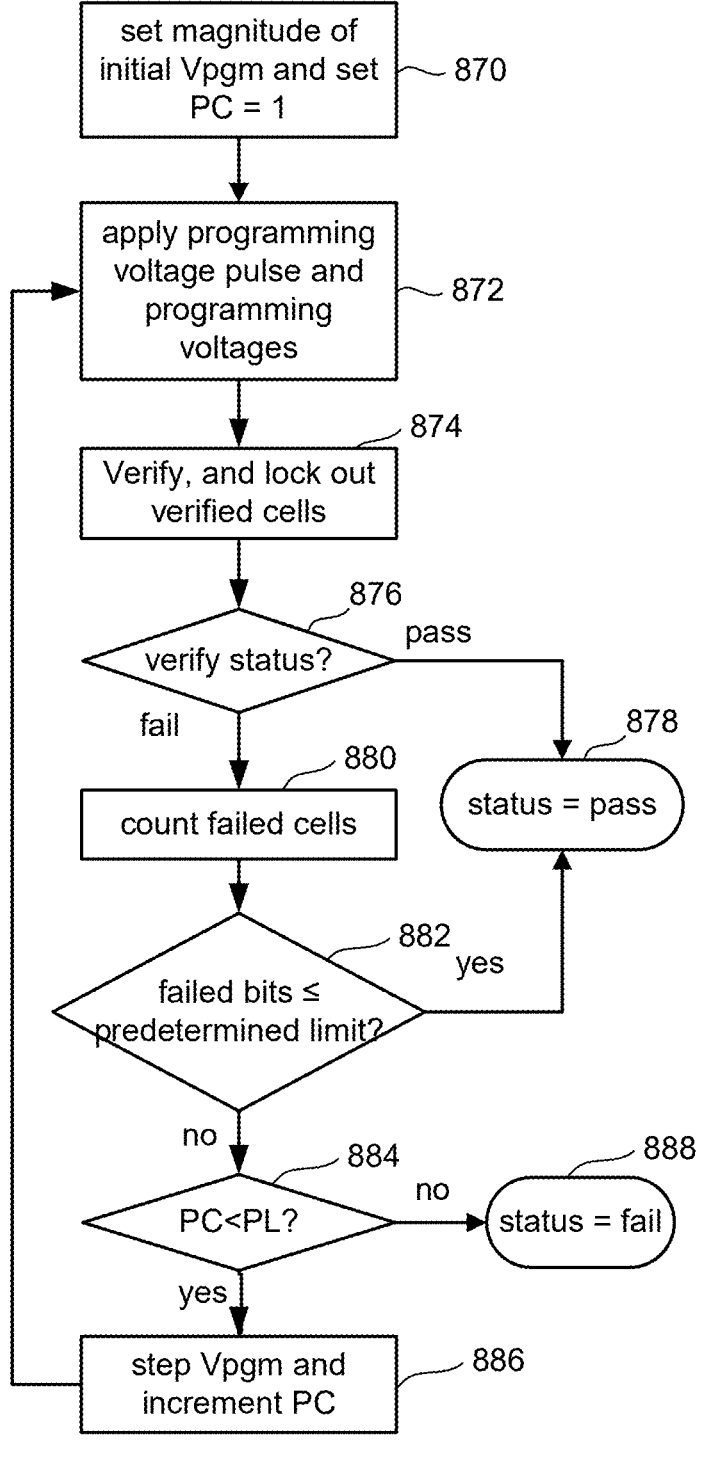
FIG. 8 is a flow chart describing one embodiment of a process for programming non-volatile memory.

FIG. 8 is a flowchart describing one embodiment of a process for programming that is performed by memory die 300/307. In one example embodiment, the process of FIG. 8 is performed on memory die 300/307 using the control circuit discussed above, at the direction of state machine 362. The process of FIG. 8 is performed to implement the programming of FIG. 7A, the full sequence programming of FIG. 7B, or other programming schemes including multi-stage programming. When implementing multi-stage programming, the process of FIG. 8 is used to implement any/each stage of the multi-stage programming process.

Figure 9:
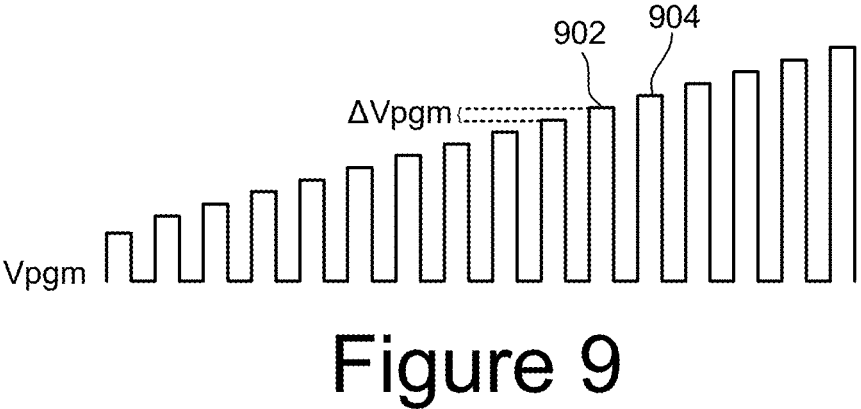
FIG. 9 depicts a series of programming voltage pulses.

Typically, a programming signal Vpgm is applied to the control gates (via a selected word line) during a program operation as a series of programming voltage pulses, as depicted in FIG. 9. Between programming pulses are a set of verify pulses to perform verification. In many implementations, the magnitude of the program pulses is increased with each successive pulse by a predetermined step size ΔVpgm (e.g., 0.2 v-0.5 v). In step 870 of FIG. 8, the programming voltage (Vpgm) is initialized to the starting magnitude (e.g., ~12-16V or another suitable level) and a program counter PC maintained by state machine 362 is initialized at 1. In step 872, a program pulse of the programming signal Vpgm is applied to the selected word line (the word line selected for programming). In one embodiment, the group of memory cells being programmed concurrently are all connected to the same word line (the selected word line). The unselected word lines receive one or more boosting voltages (e.g., ~7-11 volts) to perform boosting schemes known in the art. In one embodiment, if a memory cell should be programmed, then the corresponding bit line is grounded. On the other hand, if the memory cell should remain at its current threshold voltage, then the corresponding bit line is connected to VDD (e.g., 1-3.5 volts) to inhibit programming. In step 872, the programming voltage pulse is concurrently applied to all memory cells connected to the selected word line so that all of the memory cells connected to the selected word line are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 874, the appropriate memory cells are verified using the appropriate set of verify reference voltages to perform one or more verify operations. In one embodiment, the verification process is performed by testing whether the threshold voltages of the memory cells selected for programming have reached the appropriate verify reference voltage.

In step 876, it is determined whether all the memory cells have reached their target threshold voltages (pass). If so, the programming process is complete and successful because all selected memory cells were programmed and verified to their target states. A status of "PASS" (or success) is reported in step 878. If, in 876, it is determined that not all of the memory cells have reached their target threshold voltages (fail), then the programming process continues to step 880.

In step 880, the system counts the number of memory cells that have not yet reached their respective target threshold voltage distribution. That is, the system counts the number of memory cells that have, so far, failed the verify process. This counting can be done by the state machine 362, the controller 102, or other logic. In one implementation, each of the sense blocks will store the status (pass/fail) of their respective memory cells. In one embodiment, there is one total count, which reflects the total number of memory cells currently being programmed that have failed the last verify step. In another embodiment, separate counts are kept for each data state.

In step 882, it is determined whether the count from step 880 is less than or equal to a predetermined limit. In one embodiment, the predetermined limit is a number of bits that can be corrected by error correction codes (ECC) during a read process for the page of memory cells. If the number of failed cells is less than or equal to the predetermined limit, then the programming process can stop and a status of "PASS" is reported in step 878. In this situation, enough memory cells are programmed correctly such that the few remaining memory cells that have not been completely programmed can be corrected using ECC during the read process. In some embodiments, step 880 will count the number of failed cells for each sector, each target data state or other unit, and those counts will individually or collectively be compared to one or more thresholds in step 882.

In one embodiment, the predetermined limit can be less than the total number of bits that can be corrected by ECC during a read process to allow for future errors. When programming less than all of the memory cells for a page, or comparing a count for only one data state (or less than all states), than the predetermined limit can be a portion (prorata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, then the programming process continues at step 884 and the program counter PC is checked against the program limit value (PL). Examples of program limit values include 6, 20 and 30; however, other values can be used. If the program counter PC is not less than the program limit value PL, then the program process is considered to have failed, and a status of FAIL is reported in step 888. If the program counter PC is less than the program limit value PL, then the process continues at step 886 during which time the Program Counter PC is incremented by 1 and the program voltage Vpgm is stepped up to the next magnitude. For example, the next pulse will have a magnitude greater than the previous pulse by a step size (e.g., a step size of 0.1-0.4 volts). After step 886, the process loops back to step 872 and another program pulse is applied to the selected word line so that another iteration (steps 872-886) of the programming process of FIG. 8 is performed.

Because it is possible that errors can occur when programming or reading, and errors can occur while storing data (e.g., due to electrons drifting, data retention issues or other phenomenon), error correction is used with the programming of data. Memory systems often use Error Correction Codes (ECC) to protect data from corruption. Many ECC coding schemes are well known in the art. These conventional error correction codes are especially useful in large scale memories, including flash (and other non-volatile) memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits (i.e., the code "rate"). As such, some ECC codes are better suited for flash memory devices than others. Generally, ECC codes for flash memory devices tend to have higher code rates (i.e., a lower ratio of code bits to data bits) than the codes used in data communications applications (which may have code rates as low as 1/2). Examples of well-known ECC codes commonly used in connection with flash memory storage include Reed-Solomon codes, other BCH codes, Hamming codes, and the like. Sometimes, the error correction codes used in connection with flash memory storage are "systematic," in that the data portion of the eventual code word is unchanged from the actual data being encoded, with the code or parity bits appended to the data bits to form the complete code word.

The particular parameters for a given error correction code include the type of code, the size of the block of actual data from which the code word is derived, and the overall length of the code word after encoding. For example, a typical BCH code applied to a sector of 512 bytes (4096 bits) of data can correct up to four error bits, if at least 60 ECC or parity bits are used. Reed-Solomon codes are a subset of BCH codes, and are also commonly used for error correction. For example, a typical Reed-Solomon code can correct up to four errors in a 512 byte sector of data, using about 72 ECC bits. In the flash memory context, error correction coding provides substantial improvement in manufacturing yield, as well as in the reliability of the flash memory over time.

In some embodiments, controller 102 receives host data (also referred to as user data or data from an entity external to the memory system), also referred to as information bits, that is to be stored non-volatile memory structure 302. The informational bits are represented by the matrix i=[1 0] (note that two bits are used for example purposes only, and many embodiments have code words longer than two bits). An error correction coding process (such as any of the processes mentioned above or below) is implemented by ECC engine 226/256 of controller 102 in which parity bits are added to the informational bits to provide data represented by the matrix or code word v=[1 0 1 0], indicating that two parity bits have been appended to the data bits. Other techniques can be used that map input data to output data in more complex manners. For example, low density parity check (LDPC) codes, also referred to as Gallager codes, can be used. More details about LDPC codes can be found in R. G. Gallager, "Low-density parity-check codes," IRE Trans. Inform. Theory, vol. IT-8, pp. 21 28, January 1962; and D. MacKay, Information Theory, Inference and Learning Algorithms, Cambridge University Press 2003, chapter 47. In practice, such LDPC codes are typically applied (e.g., by ECC engine 226/256) to multiple pages encoded across a number of storage elements, but they do not need to be applied across multiple pages. The data bits can be mapped to a logical page and stored in memory structure 302 by programming one or more memory cells to one or more programming states, which corresponds to v.

In one embodiment, programming serves to raise the threshold voltage of the memory cells to one of the programmed data states S1-S7. Erasing serves to lower the threshold voltage of the memory cells to the Erase data state S0.

One technique to erase memory cells in some memory devices is to bias a p-well (or other types of) substrate to a high voltage to charge up a NAND channel. An erase enable voltage is applied to control gates of memory cells while the NAND channel is at a high voltage to erase the non-volatile storage elements (memory cells). Another approach to erasing memory cells is to generate gate induced drain leakage (GIDL) current to charge up the NAND string channel. An erase enable voltage is applied to control gates of the memory cells, while maintaining the string channel potential to erase the memory cells.

In one embodiment, the GIDL current is generated by causing a drain-to-gate voltage at a select transistor. A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to a bit line to generate a first GIDL current. A second GIDL voltage may be created between two terminals of a select transistor (e.g., source side select transistor) that is connected to a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

Figures 10, 11:
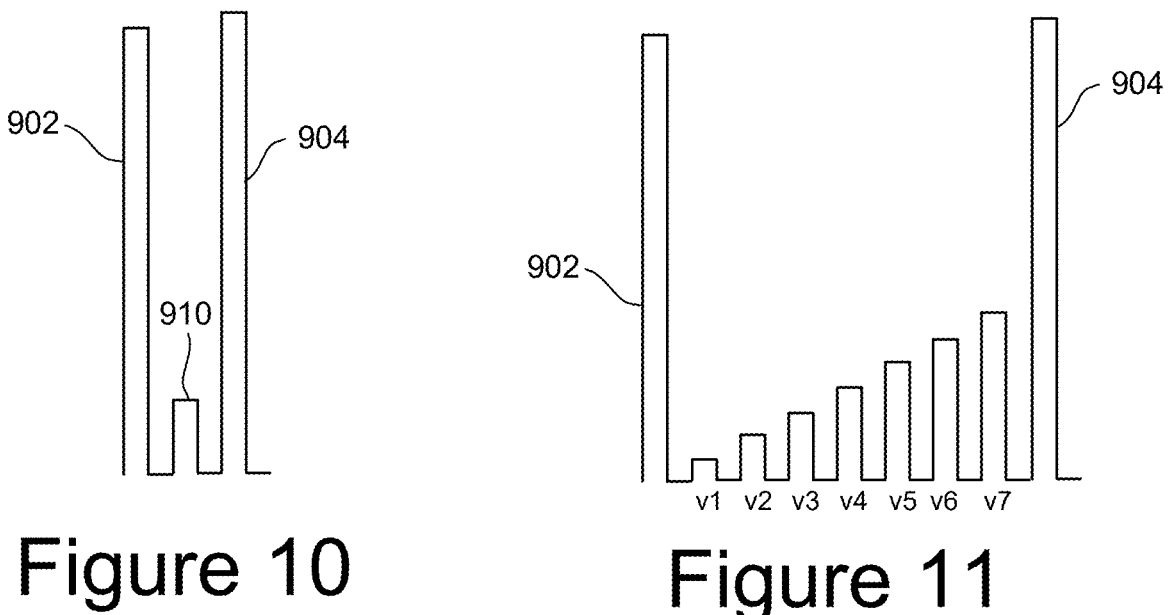
FIG. 10 depicts two programming voltage pulses and a verify voltage pulse.
FIG. 11 depicts two programming voltage pulses and a set of verify voltage pulses.

As discussed above, FIG. 9 depicts the programming signal Vpgm as a series of programming voltage pulses. These programming voltage pulses are one example of doses of programming applied to a plurality of non-volatile memory cells being programmed to a data state. As described by FIG. 8, the system performs program verification between the doses of programming, as depicted in FIGS. 10 and 11. FIG. 10, which illustrates an embodiment in which memory cells store one bit of data per memory cell, depicts two of the programming voltage pulses 902 and 904 of FIG. 9. Between programming voltage pulses 902 and 904 is verify voltage pulse 910. In one embodiment, verify voltage pulse 910 has a magnitude of Vv (see FIG. 7A) and represents the system performing program verification (step 874) between the doses of programming (successive iterations of step 872).

FIG. 11, which illustrates an embodiment in which memory cells store three bits of data per memory cell, depicts two of the programming voltage pulses 902 and 904 of FIG. 9. Between programming voltage pulses 902 and 904 are verify voltage pulses v1, v2, v3, v4, v5, v6 and v7. In one embodiment, verify voltage pulse v1 has a magnitude of Vv1 (see FIG. 7B), verify voltage pulse v2 has a magnitude of Vv2, verify voltage pulse v3 has a magnitude of Vv3, verify voltage pulse v4 has a magnitude of Vv4, verify voltage pulse v5 has a magnitude of Vv5, verify voltage pulse v6 has a magnitude of Vv6, and verify voltage pulse v7 has a magnitude of Vv7. Verify voltage pulses v1, v2, v3, v4, v5, v6 and v7 represent the system performing program verification (step 874) between the doses of programming (successive iterations of step 872).

Figure 12:
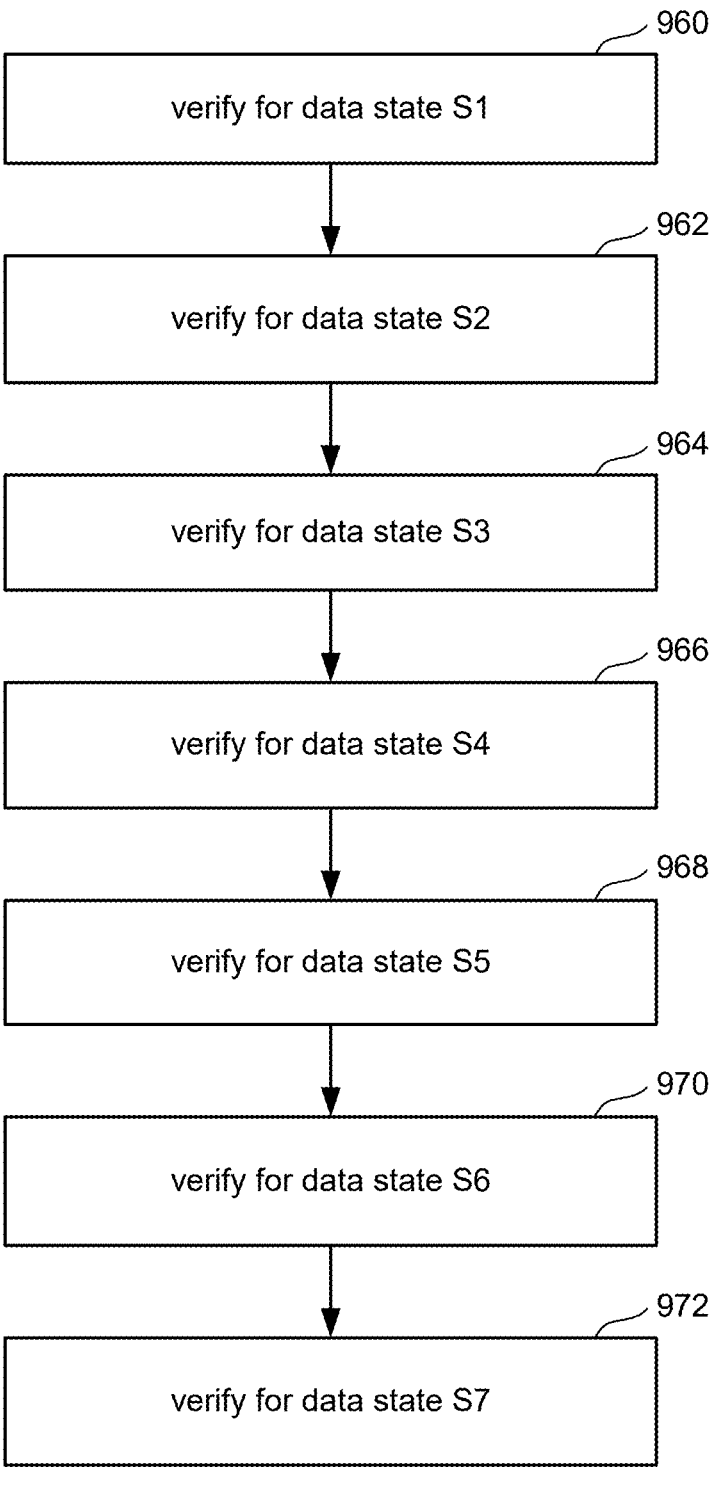
FIG. 12 is a flowchart describing one embodiment of a process for verifying programming of non-volatile memory.

FIG. 12 is a flow chart describing one embodiment of a process for verifying programming of non-volatile memory. That is, the process of FIG. 12 is a process performed during an example implementation of step 874 of FIG. 8 for an embodiment in which memory cells store three bits of data per memory cell. The process of FIG. 12 is performed using the waveforms of FIGS. 9 and 11. In step 960 of FIG. 12, the system performs verification for data state S1. For example, the system tests whether memory cells being programmed to data state S1 have threshold voltages greater than Vv1 (e.g., applying verify voltage pulse v1 of FIG. 11 to the control gates of memory cells being programmed to data state S1).

In step 962, the system performs verification for data state S2. For example, the system tests whether memory cells being programmed to data state S2 have threshold voltages greater than Vv2 (e.g., applying verify voltage pulse v2 of FIG. 11 to the control gates of memory cells being programmed to data state S2).

In step 964, the system performs verification for data state S3. For example, the system tests whether memory cells being programmed to data state S3 have threshold voltages greater than Vv3 (e.g., applying verify voltage pulse v3 of FIG. 11 to the control gates of memory cells being programmed to data state S3).

In step 966, the system performs verification for data state S4. For example, the system tests whether memory cells being programmed to data state S4 have threshold voltages greater than Vv4 (e.g., applying verify voltage pulses v4 of FIG. 11 to the control gates of memory cells being programmed to data state S4).

In step 968, the system performs verification for data state S5. For example, the system tests whether memory cells being programmed to data state S5 have threshold voltages greater than Vv5 (e.g., applying verify voltage pulses v5 of FIG. 11 to the control gates of memory cells being programmed to data state S5).

In step 970, the system performs verification for data state S6. For example, the system tests whether memory cells being programmed to data state S6 have threshold voltages greater than Vv6 (e.g., applying verify voltage pulse v6 of FIG. 11 to the control gates of memory cells being programmed to data state S6).

In step 972, the system performs verification for data state S7. For example, the system tests whether memory cells being programmed to data state S7 have threshold voltages greater than Vv7 (e.g., applying verify voltage pulse v7 of FIG. 11 to the control gates of memory cells being programmed to data state S7). Note that, in one embodiment, steps 960-972 are performed between doses of programming (e.g., between programming voltage pulses). In some embodiments, one or more of steps 960-972 can be skipped between certain programming voltage pulses. In one embodiment, steps 960-972 are performed sequentially (in any order or in the order depicted), while in other embodiments steps 960-972 are performed in parallel (e.g., concurrently).

The flow of FIG. 12 illustrates the verification of all of the target data states, but to speed up the verification phase of a programming operation a "smart verify" operation can be used. In a smart verify, not all of the target data state levels are checked. Initially, for the first few programming pulses, only the lower data states need to be checked. As the programming operation continues, as the lower target data states begin to verify, additional higher data states are included; and, as the lower states finish, the lower target state verifies can be dropped out.

In the following, system control logic 360, column control circuitry 310, row control circuitry 320, and/or controller 102 (or equivalently functioned circuits), in combination with all or a subset of the other circuits depicted in FIG. 3A or on the control die 311 in FIG. 3B and similar elements in FIG. 3A, can be considered part of the one or more control circuits that perform the functions described herein. The control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Turning now to types of data that can be stored in non-volatile memory devices, a particular example of the type of data of interest in the following discussion are the weights used in artificial neural networks, such as convolutional neural networks or CNNs. The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

Figure 13:
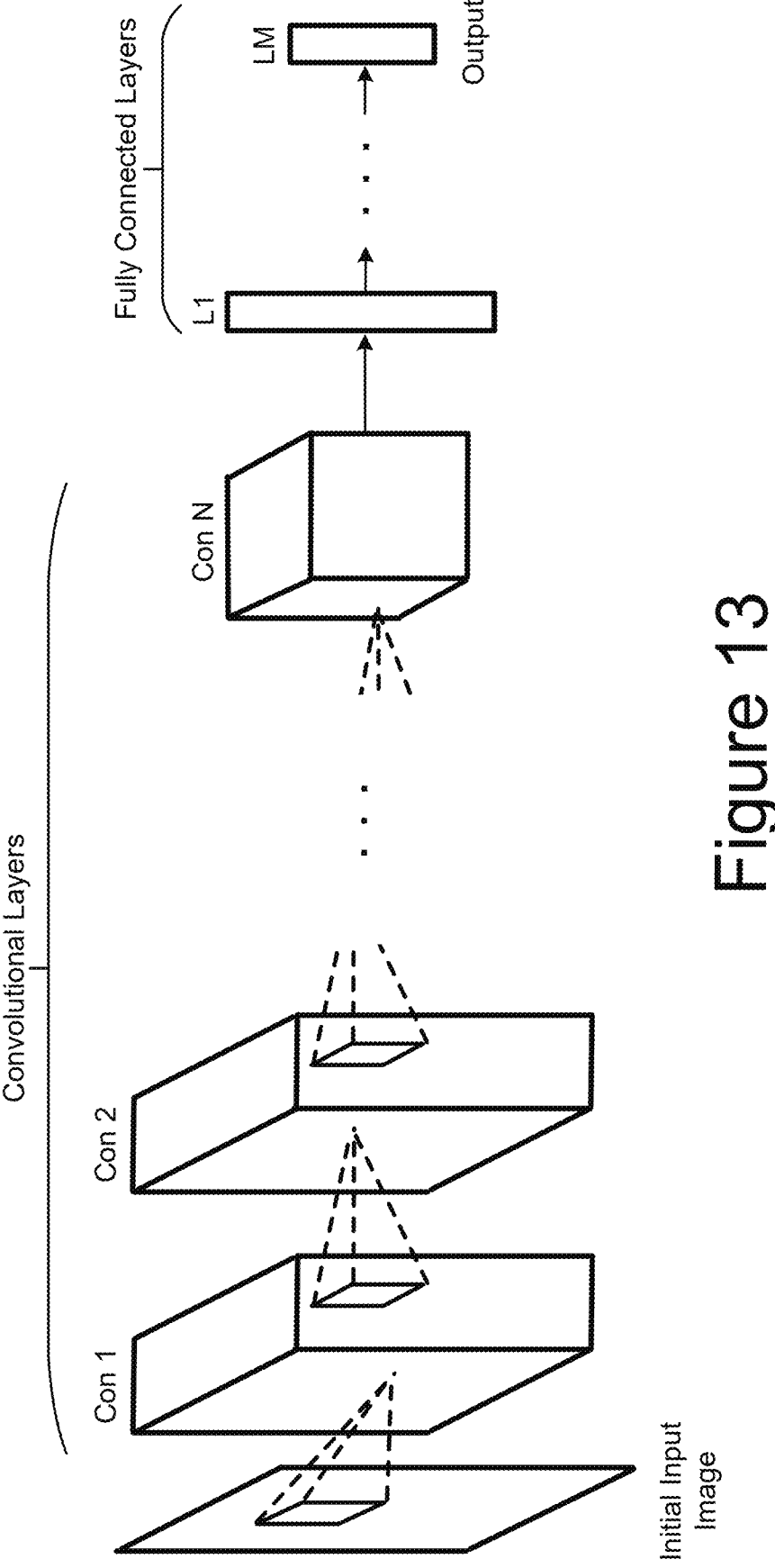
FIG. 13 illustrates a simple example of a convolutional neural network (CNN).

FIG. 13 is a schematic representation of an example of a CNN. FIG. 13 illustrates an initial input image of an array of pixel values, followed by a number of convolutional layers that are in turn followed by a number of fully connected layers, the last of which provides the output. Each neuron in the first convolutional layer (Con 1) takes as input data from an $n \times n$ pixel sub-region of the input image. The neuron's learned weights, which are collectively referred to as its convolution filter, determine the neuron's single-valued output in response to the input. In the convolutional layers, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through each of the convolutional layers (Con1 to Con N) using each layer's learned weights, after which it is propagated through the fully connected layers (L1 to LM) using their learned weights.

Figure 14:
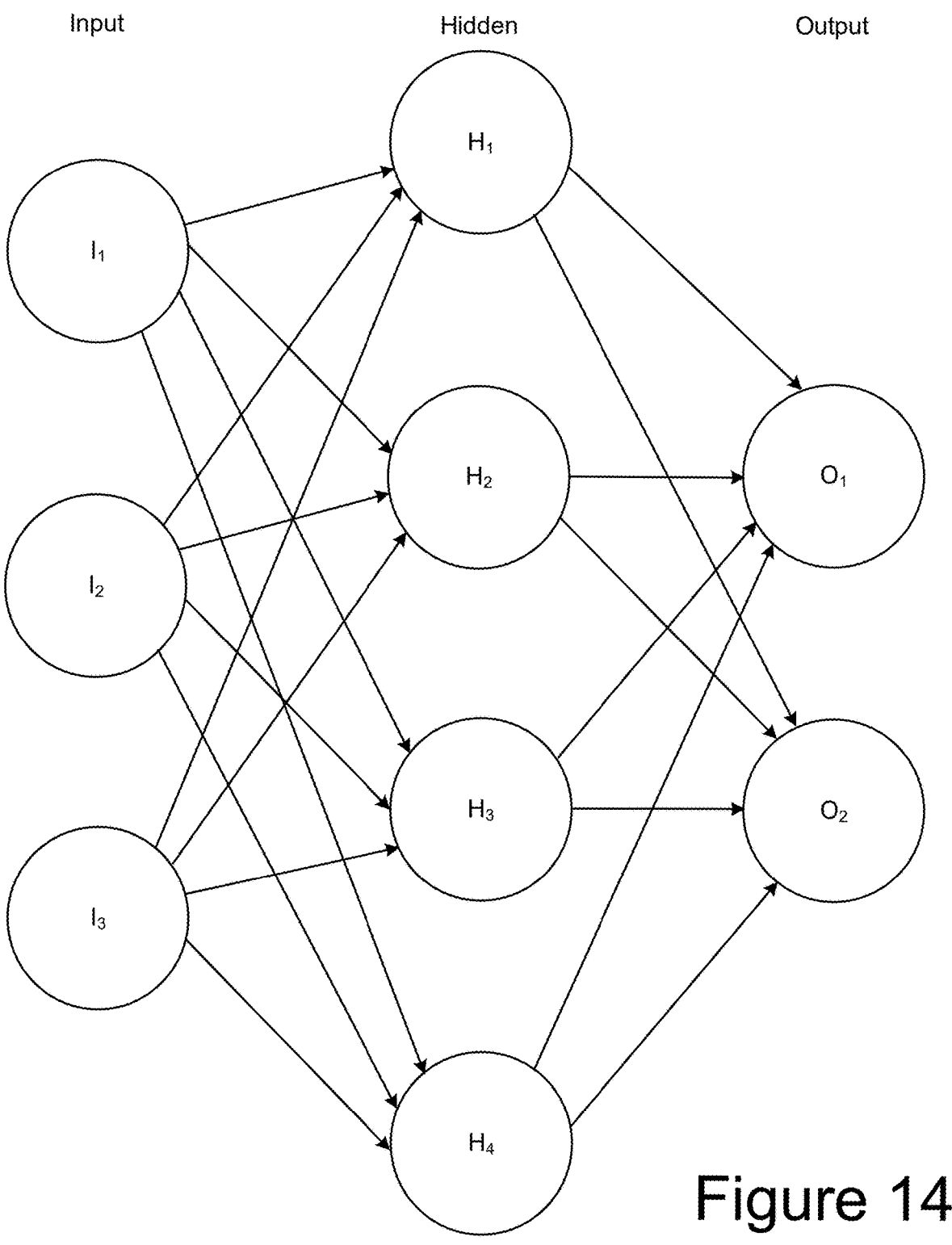
FIG. 14 illustrates a simple example of fully connected layers in an artificial neural network.

FIG. 14 represents several fully connected layers of a neural network in more detail. In FIG. 14 the three layers of the artificial neural network shown are represented as an interconnected group of nodes or artificial neurons, represented by the circles, and a set of connections from the output of one artificial neuron to the input of another. The example shows three input nodes ($I_1$, $I_2$, $I_3$) and two output nodes ($O_1$, $O_2$), with an intermediate layer of four hidden or intermediate nodes ($H_1$, $H_2$, $H_3$, $H_4$). The nodes, or artificial neurons/synapses, of the artificial neural network are implemented by logic elements of a host or other processing system as a mathematical function that receives one or more inputs and sums them to produce an output. Usually each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a weight that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer), to the last layer (the output layer), possibly after traversing the layers multiple times. Although FIG. 13 shows only a single intermediate or hidden layer, a complex deep neural network (DNN) can have many such intermediate layers.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

Figure 15B:
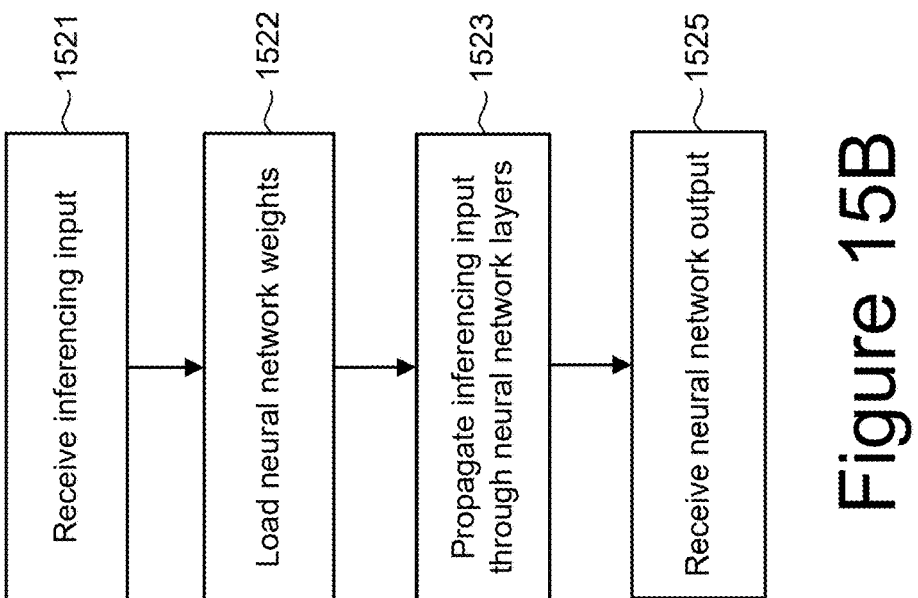
FIG. 15B is a flowchart describing one embodiment of a process for inference using a neural network.
Figure 15A:
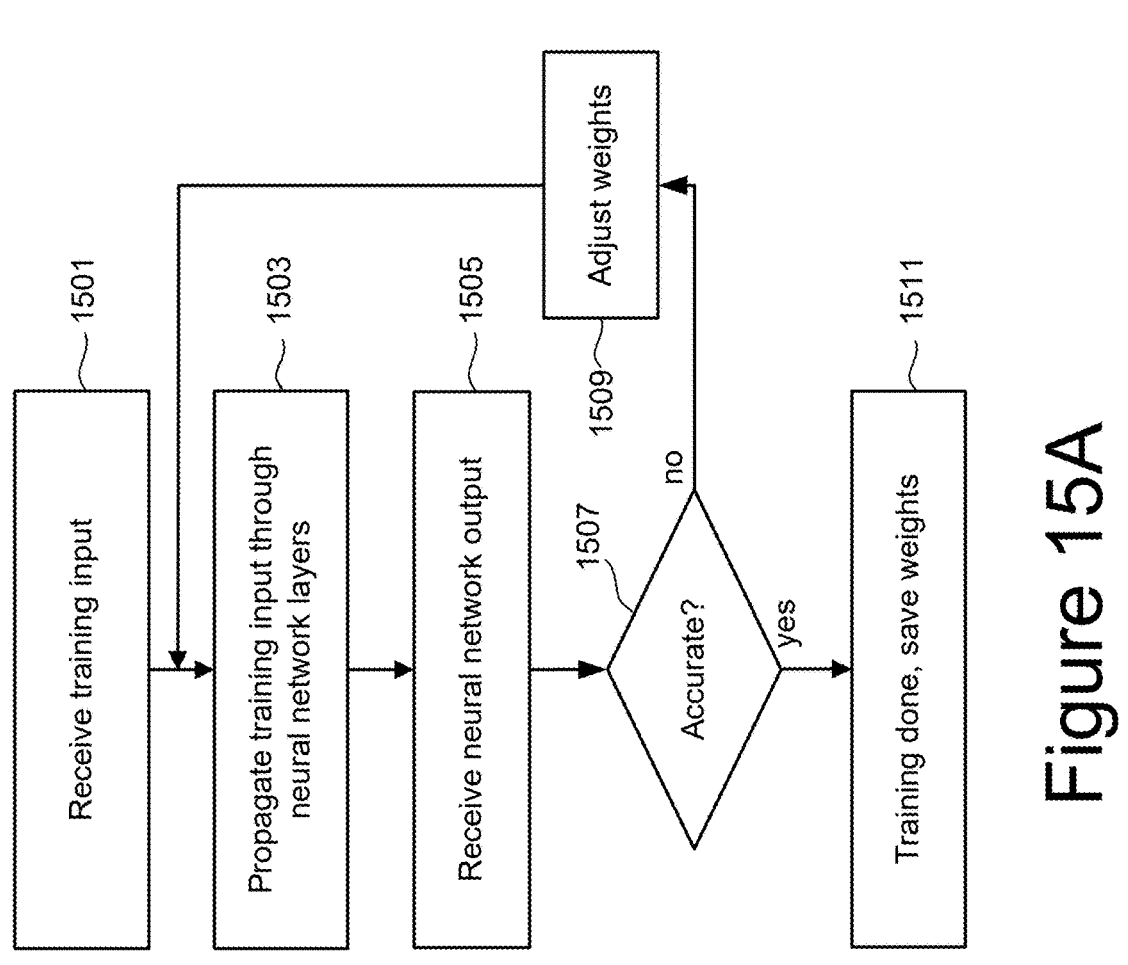
FIG. 15A is a flowchart describing one embodiment of a process for training a neural network to generate a set of weights.

FIG. 15A is a flowchart describing one embodiment of a process for training a neural network to generate a set of weights. The training process is often performed in the cloud, allowing additional or more powerful processing to be accessed. At step 1501, the input, such as a set of images, is received (e.g., the image input in FIG. 13). At step 1503 the input is propagated through the layers connecting the input to the next layer (e.g., CON1 in FIG. 13) using the current filter, or set of weights. The neural network's output is then received at the next layer (e.g., CON2 in FIG. 13) in step 1505, so that the values received as output from one layer serve as the input to the next layer. The inputs from the first layer are propagated in this way through all of the intermediate or hidden layers until they reach the output. In the dog breed example of the preceding paragraph, the input would be the image data of a number of dogs, and the intermediate layers use the current weight values to calculate the probability that the dog in an image is a certain breed, with the proposed dog breed label returned at step 1505. A user can then review the results at step 1507 to select which probabilities the neural network should return and decide whether the current set of weights supply a sufficiently accurate labelling and, if so, the training is complete (step 1511). If the result is not sufficiently accurate, the neural network adjusts the weights at step 1509 based on the probabilities the user selected, followed by looping back to step 1503 to run the input data again with the adjusted weights. Once the neural network's set of weights have been determined, they can be used to "inference," which is the process of using the determined weights to generate an output result from data input into the neural network. Once the weights are determined at step 1511, they can then be stored in non-volatile memory for later use, where the storage of these weights in non-volatile memory is discussed in further detail below.

FIG. 15B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 1521, the input is received, such as the image of a dog in the example used above. If the previously determined weights are not present in the device running the neural network application, they are loaded at step 1522. For example, on a host processor executing the neural network, the weights could be read out of an SSD in which they are stored and loaded into RAM on the host device. At step 1523, the input data is then propagated through the neural network's layers. Step 1523 will be similar to step 1503 of FIG. 15B, but now using the weights established at the end of the training process at step 1511. After propagating the input through the intermediate layers, the output is then provided at step 1525.

Figure 16:
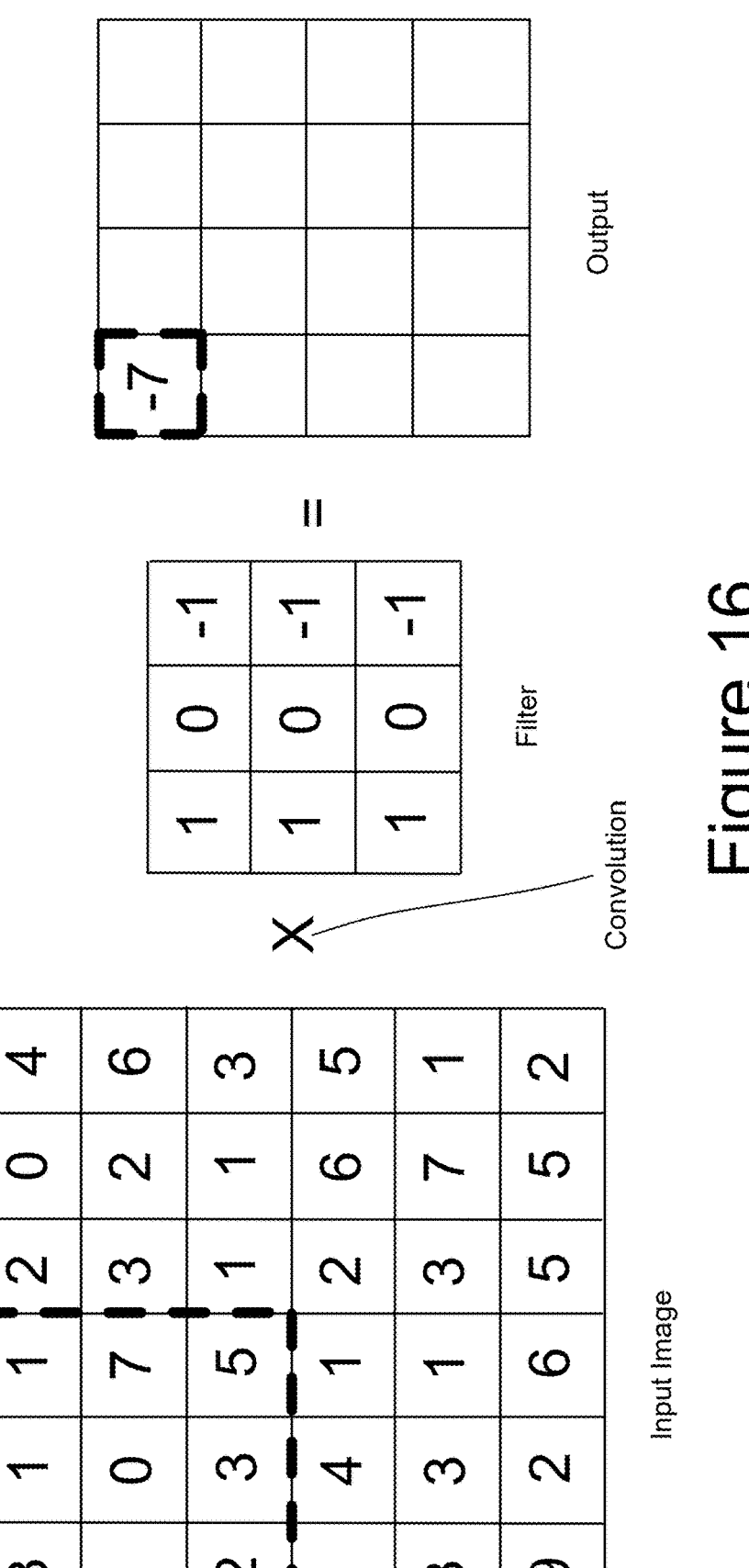
FIG. 16 is a schematic representation of a convolution operation in a convolutional neural network.

FIG. 16 is a schematic representation of a convolution operation between an input image and filter, or set of weights. In this example, the input image is a 6×6 array of pixel values and the filter is a 3×3 array of weights. The convolution operation is performed by a matrix multiplication of the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

Figure 17:
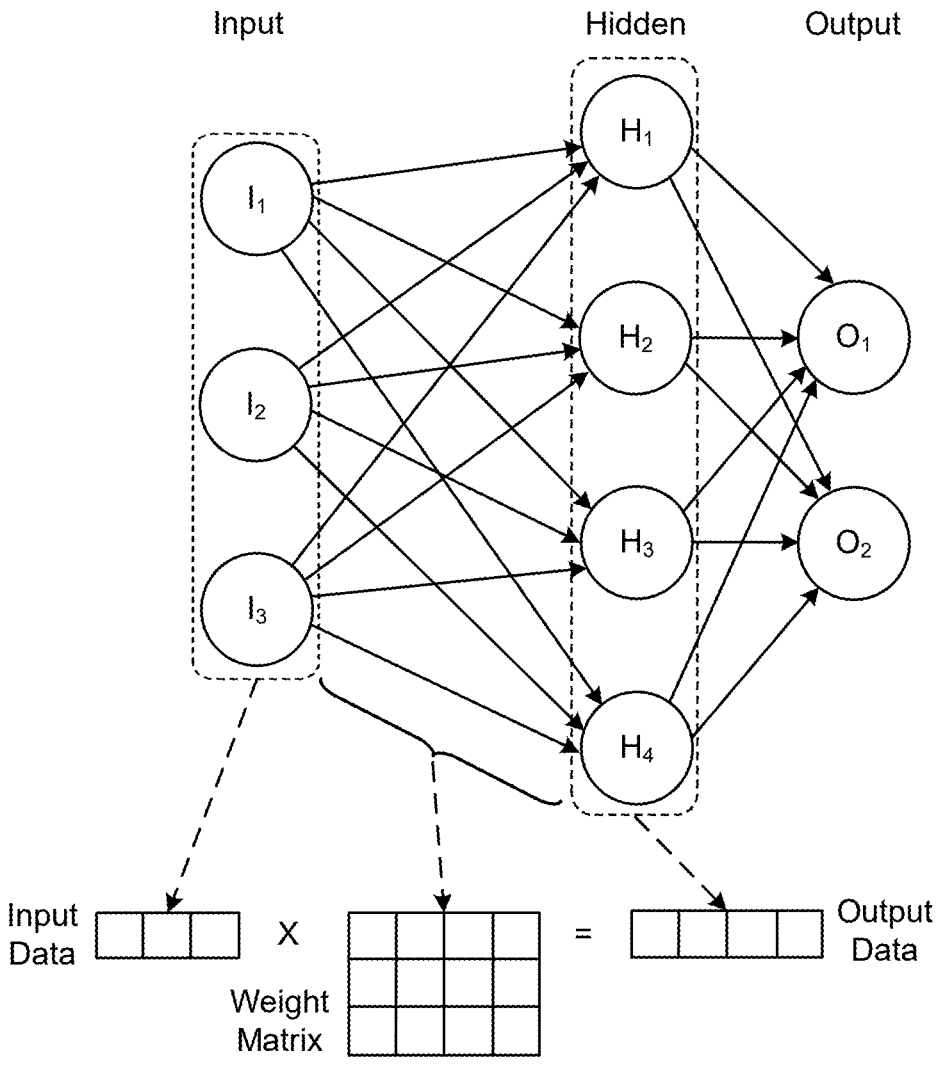
FIG. 17 is a schematic representation of the use of matrix multiplication in a fully connected layer of a neural network.

FIG. 17 is a schematic representation of the use of matrix multiplication in a fully connected layer of a neural network. Matrix multiplication, or MatMul, is a commonly used approach in both the training and inference phases for neural networks and is used in kernel methods for machine learning. FIG. 17 at the top is similar to FIG. 14, where only a single hidden layer is shown between the input layer and the output layer. The input data is represented as a vector of a length corresponding to the number of input nodes. The weights are represented in a weight matrix, where the number of columns corresponds to the number of intermediate nodes in the hidden layer and the number of rows corresponds to the number of input nodes. The output is determined by a matrix multiplication of the input vector and the weight matrix, where each element of the output vector is a dot product of the vector of the input data with a column of the weight matrix.

A common technique for executing the matrix multiplications is by use of a multiplier-accumulator (MAC, or MAC unit). However, this has a number of issues. Referring back to FIG. 15B, the inference phase loads the neural network weights at step 1522 before the matrix multiplications are performed by the propagation at step 1523. However, as the amount of data involved can be extremely large, use of a multiplier-accumulator for inferencing has several issues related to the loading of weights. One of these issues is high energy dissipation due to having to use large MAC arrays with the required bit-width. Another issue is high energy dissipation due to the limited size of MAC arrays, resulting in high data movement between logic and memory and an energy dissipation that can be much higher than used in the logic computations themselves.

To help avoid these limitations, the use of a multiplier-accumulator array can be replaced with other memory technologies. For example, the matrix multiplication can be computed within a memory array by leveraging the characteristics of NAND memory and Storage Class Memory (SCM), such as those based on ReRAM, PCM, FeRAM or MRAM based memory cells. This allows for the neural network inputs to be provided via read commands and the neural weights to be preloaded for inferencing. By use of in-memory computing, this can remove the need for logic to perform the matrix multiplication in the MAC array and the need to move data between the memory and the MAC array.

FIGS. 18-28 consider embodiments based on memory arrays using NAND type of architectures, such as flash NAND memory using memory cells with a charge storage region. Flash NAND memory can be implemented using both multi-level cell (MLC) structures and single-level cell (SLC) structures, where the following mainly considers embodiments based on SLC Flash memory. In contrast to MAC array logic, use of SLC Flash memory shows several advantages, including a much higher area/bit value, a much higher throughput rate, and a significant reduction in energy dissipation due to minimizing data movement by performing in-array multiplication. Additionally, the NAND flash structure is highly scalable, supporting deep and wide neural networks.

One technique that can be used to reduce the computational complexity of the inference process is by use of a Binarized Neural Network (BNN), in which a neural network works with binary weights and activations. A BNN (also called an XNOR-Net) computes the matrix-vector multiplication with "binary" inputs {−1, 1} and "binary" weights {−1, 1}. FIG. 18 is a table illustrating the output of a binary neural network in response to the different input-weight combinations. As shown in the right-most column, when the input and weight match, the output is 1; and when the input and the weight differ, the output is −1. FIGS. 19-22 illustrate an embodiment for the realization of a neural network with binary-input and binary-weights in an SLC NAND array.

FIG. 19 illustrates an embodiment for a unit synapse cell for storing a binary weight in a pair of series connected memory cells FG1 and FG2. In this example, each of the memory cells are SLC cells storing one of two states and can be part of a larger NAND string. The memory cells FG1 and FG2 can be flash memory cells and are programmed or erased by respectively adding or removing electrons from a charge storing layer or a floating gate, and are sensed by applying corresponding voltages V1 and V2 to their control gates. When the memory cells FG1 and FG2 are part of a larger NAND string that includes additional unit synapse cells or other memory cells, the pair of memory cells can be adjacent on the NAND string or separated by other memory cells forming the NAND string. In the following discussion, the individual memory cells of a unit synapse cell will be represented as being adjacent, but other arrangements are possible depending on the embodiment. For example, the upper half of a NAND string could hold the first memory cell of each unit synapse, with the second memory cell of each unit synapse in the lower half of the NAND string. For any of these arrangements, when sensing a given unit synapse, the other memory cells and select gates on the same NAND string will be biased such that both of the memory cells of the non-selected unit synapses and any other memory cells, along with the select gates, are conducting.

FIG. 20 illustrates the distribution of threshold voltages for the storage of data states on an SLC memory. In this embodiment, the erased negative threshold state is taken as the "1" state and the positive threshold state is taken as the "0". FIG. 19 illustrates a typically distribution of the threshold voltage of the memory cells of a set of memory cells, such as an erase block or whole array, after the memory cells have been erased (here assigned the "1" state) and the memory cells to programmed to the positive threshold states (here assigned the "0" state). As discussed further with respect to FIGS. 21 and 22, a binary weight will have one memory cell of a unit synapse in the "0" state and the other memory cell in the "1" state. More generally, the "1" state need not be a negative threshold state as long as the two states correspond to a lower threshold state, here defined as the "1' state, and a higher threshold state, here defined as the "0" state.

For sensing the memory cells with the threshold distribution illustrated in FIG. 20, a first voltage level Vread is used to distinguish between the data states, so that if applied to the control gate of a memory cell, the memory cell will conduct if in the "1" state and not conduct if in the "0" state. For example, if the "1" states are a negative threshold voltage state and the "0" states are a positive threshold voltage state, Vread could be taken as 0V. A second sensing voltage Vpass is high enough such that a memory cell in either state will conduct. For example, Vpass could be a few volts. In the following, Vread will be defined as the "0" input voltage value and Vpass will be defined as the "1" input voltage value.

In implementations of NAND flash memory, a number of different voltage levels are often used for sensing operations, both in program verify and read operations, for both SLC and MLC memory. For example, a program verify level for a given data state may be offset from the read voltage level for the same data state. Also, various levels may be used for pass voltages in different operations and conditions to place a memory cell in a conducting state independently of its stored data state. To simply the following discussion, only the single Vread voltage will be used to differentiate between the data states and only the single Vpass voltage will be used when a memory cell or select gate is to be put into a conducting state for all stored data state values.

Figure 21:
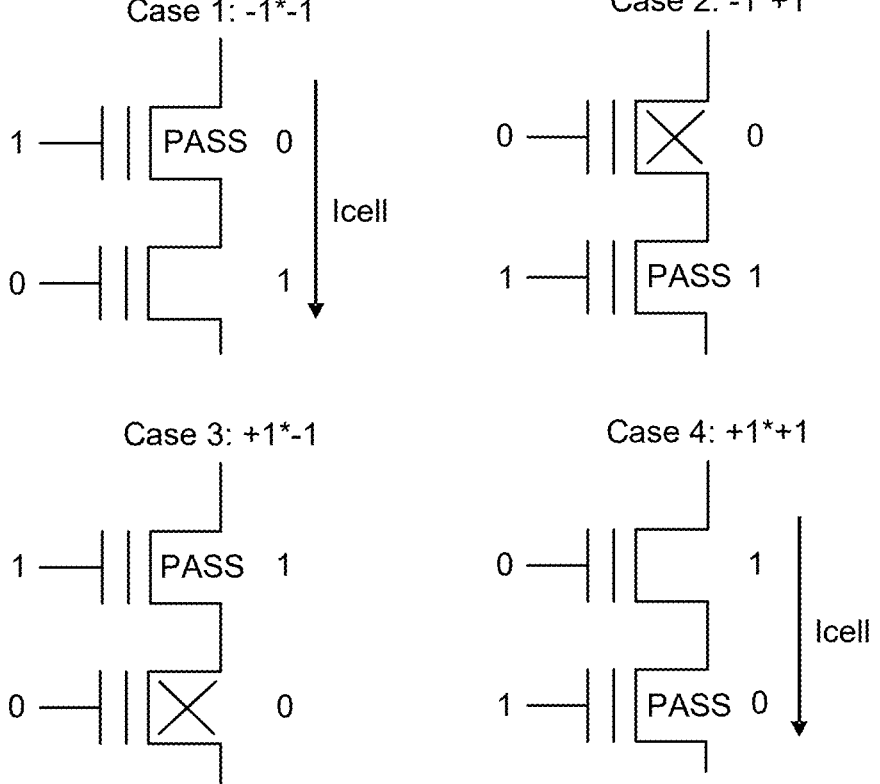

FIGS. 21 and 22 illustrate an embodiment for implementing a binary neural network using a pair of series connected SLC memory cells as a unit synapse. More specifically, FIG. 22 shows one embodiment for the correspondence between input logic, weight logic, and output logic of FIG. 18 and the input voltage patterns, threshold voltage Vth of the unit synapse's memory cells, and the output voltage, respectively. FIG. 21 is a schematic representation of the response of a unit synapse to the different cases.

In FIGS. 21 and 22, a logic input of −1 corresponds to the input voltage pattern of V1=Vpass="1", V2=Vread="0"; and a logic input of +1 corresponds to the input voltage pattern of V1=Vread="0", V2=Vpass="1". A weight logic of −1 corresponds to the memory cell FG1 being in the "0" (programmed) state and FG2 being in the "1" (erased state); and a weight logic of +1 corresponds to the memory cell FG1 being in the "1" state and FG2 being in the "0". An output logic of +1 corresponds to the unit synapse conducting a current Icell, resulting in an output voltage drop of ΔV across the unit synapse; and an output logic of −1 corresponds to the unit synapse not conducting, resulting in little or no output voltage drop across the unit synapse.

FIG. 21 schematically represents the four cases of input, weight pairs. In case 1, the input and weight both match with values of −1. The applied input voltage pattern applies the higher input voltage of Vpass, or "1", to upper cell with the higher Vth "0" data state and the lower input voltage of Vread, or "0", to the lower cell with the lower Vth "1" data state, so that cells are conductive and pass a current of I cell. In case 2, the input voltage pattern is reversed with respect to case 1, with the input logic is now at +1 while the weight is at −1. This results in the lower Vpass, or "0", voltage level applied to the top cell in higher Vth, which consequently will not be conductive (as indicated by the X under the memory cell) and no appreciable current will flow thought the pair.

For cases 3 and 4 on the bottom of FIG. 21, the weight value is now +1, with the lower Vth "1" state in the upper cell and the upper Vth "0" programmed in to the lower cell. In case 3, the −1 input voltage pattern is applied to the unit synapse, resulting the lower cell not conducting as it receives the lower Vread, or "0", voltage level. In case 4, the higher Vpass, or "1" input is now applied to the lower memory cell, which consequently conducts, and the unit synapse passes the current Icell.

As represented in the embodiment of FIGS. 21 and 22, the use of a pair of series connected memory cells of FIG. 19 as a unit synapse can be used to implement the binary neural network logic table of FIG. 18. The unit synapses can be incorporated into larger NAND strings of multiple such series connected unit synapses. When sensing a selected unit synapse on a NAND string, other unit synapses on the same NAND string can be biased to be on by using a Vpass voltage, with the NAND stings select gates also biased to be on.

The use of NAND flash memory to store weight and compute the dot products of inputs and weights in-array can be used in both the training and inference phases. The training phase can proceed as in the flow of FIG. 15A, where step 1509 would erase and reprogram the weights as needed to adjust the weights until determined to be sufficiently accurate at step 1507. The present discussion will mostly focus on the inference phase, where the weights have previously been determined in a training process and then loaded into a NAND memory by programming of the unit synapses to the determined binary weight values.

Figure 23:
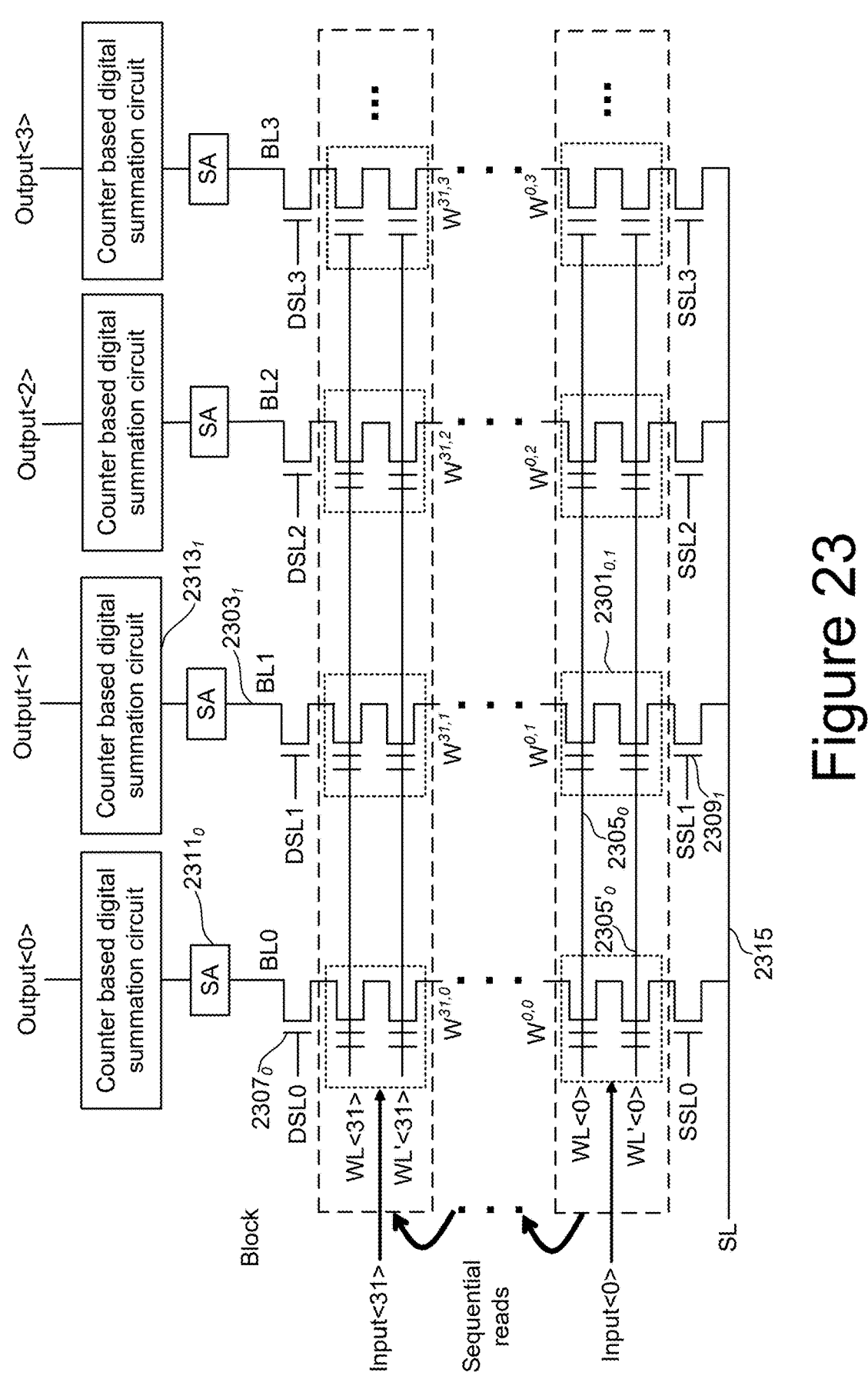
FIG. 23 illustrates the incorporation of the unit synapses into a NAND array.

FIG. 23 illustrates the incorporation of the unit synapses into a NAND array, such as in the memory structure 302 of FIG. 3A or 3B. FIG. 23 shows one block of what can be a larger array of many blocks, each with multiple NAND strings connected between a source line 2315 and a corresponding bit line BLi 2303*i*. A typical NAND memory array will be formed of many such memory blocks. Each NAND string is formed of a number of series memory cells connected in series between a source side select gate SSLi 2309*i*, by which the NAND string is connected to the source line 2315, and a drain side select gate DSLi 2307*i*, by which the NAND string is connect to the corresponding bit line BLi 2303*i*.

The memory cells along each NAND string are paired into unit synapses of a pair of memory cells storing a weight $W^{i,j}$, as illustrated by the unit synapse of FIG. 19. Each of the NAND strings can have one or more unit synapse connected in series, where the embodiment of FIG. 23 illustrates 32 unit synapses per NAND string. Each unit synapse can store a binary weight and is connected along a pair of word lines WL<j> 2305*j* and WL'<j> 2305'*j* that receive a corresponding logic input Input<j> corresponding to the voltages of FIG. 22. The word line pairs WL<j> 2305*j* and WL'<j> 2305'*j* span the columns of NAND strings of the block. In the embodiment of FIG. 23, the memory cells of a unit synapse are adjacent on the NAND string, but other arrangements can be used such that the memory cells of the synapses are interleaved rather than being contiguous; and although the discussion here is focused on binary weights using two SLC memory cells per synapse, other embodiments can use more memory cells per unit synapse, multi-level memory cells, or both, to store neural network weights with more than the two values of the binary example. Additionally, although the NAND strings in the shown embodiment are formed of charge storing, flash memory cells, other memory cells with the same array architecture can also be used.

The determination of the output of a unit synapse 2301*i,j* storing weight $W^{i,j}$ can be determined by applying an input logic voltage pattern to the corresponding input to Input<j>, while the other memory cells and select gates of the selected NAND string are biased to be ON. Based on the input logic and weight logic, the unit synapse storing 2301*i,j* weight $W^{i,j}$ will either conduct or not, as represented in the table of FIG. 24, which can be determined by the corresponding sense amplifier SAi 2311*i*. As discussed further below, for each bit line a corresponding counter-based digital summation circuit CSCi 2313*i* can keep track of how many of the unit synapses along the bit line conduct in response to the inputs, summing these values, where the sense amplifiers and summation circuits can be part of the Sense Blocks 350 of FIG. 3A or 3B. The same input Input<j> is applied concurrently to all of the unit synapses 2301*i,j* storing weight $W^{i,j}$ for all of the bit lines BLi 2303*i* biasing the select gates of the corresponding select gates SSLi 2309*i* and DSLi 2307*i*. Consequently, the same input can be applied to multiple synapses concurrently. The different synapses along the NAND strings can selected sequentially for sensing, with the results along each bit line BLi 2303*i* being accumulated by CSCi 2313*i*. In a NAND memory, a page is the unit of read and program, where the read page and program page are usually taken to be the same, such as the whole of the memory cells connected along a word line or some portion of the memory cells along a common word line. For programming, the data of the unit synapses along a single word line would still be programmed word line by word line; however, relative to a standard NAND memory operation, where the goal to determine the data content of the individual memory cells, the reading of a page of the binary weight unit synapses is performed in word line pairs such that the read page in this case can be taken as corresponding to a word line pair.

Referring back to FIG. 16 or 17, matrix multiplication is a multiple sum-of product (dot-product) calculation for input-weight vector pairs (row-column of input matrixes) used for inferencing in a neural network. FIGS. 24 and 25 consider an example of the computation of a dot-product for the binary neural network algebra and how to implement this using a counter based summation digital circuit for an SLC NAND BNN embodiment. More specifically, although a binary neural network based on the logic illustrated by the table of FIG. 18 is based on the weights, inputs, and outputs as having the values of either +1 or −1, when implemented by a NAND array as illustrate by FIG. 23, a sense amplifier will either register as conducting ("1") or not conducting ("0"). Consequently, for the counter-based digital summation circuits CSCi 2313*i* to accumulate the results to compute the dot-product of the matrix multiplication requires a conversion of the (+1, −1) based values to a (1,0) basis, where the −1 values are replaced by 0.

The table of FIG. 24 considers the dot product of the example of an 8 element binary neural network input vector $I^{bnn}$ across the top row and an 8 element binary neural network weight vector $W^{bnn}$ in the second row when the vector elements are all quantized to −1/+1. The third row illustrates the element by element product of $I^{bnn}$ and $W^{bnn}$, equaling +1 when the two match and −1 when these differ. The dot product is then based on summing these bit by bit products to generate the dot-product $P^{bnn\_dec}$ of the two vectors. In decimal system, the final correct result of adding up these values is calculated as $P^{bnn\_dec}=2$.

On the top two rows of the table of FIG. 25, the input vector $I^{bnn}$ and weight vector $W^{bnn}$ are converted into the 1/0 binary basis for the same vectors as in FIG. 24. The third row of FIG. 25 illustrates the corresponding sense amplifier output, being the bit by bit XNOR value of the two vectors, which is 1 when the values match and 0 when the values differ. By accumulating these values from the sense amplifiers SAi 2311*i* in the corresponding summation circuits CSCi 2313*i* to determine their sum, this produces a popcount $CNT^{bnn\_out}$ corresponding to the number 1 values. In the example of FIG. 25, $CNT^{bnn\_out}$=5, which differs from the $P^{bnn\_dec}$=2 value of FIG. 24 as the result of a mismatch in the input and weight is now a 0 rather than a −1.

To correct for this and determine $P^{bnn\_dec}$ in the binary system, a substitution of the output of popcount operand $CNT^{bnn\_out}$ into Eq. 1 can be used to obtain a derived $P^{bnn\_dec}$:

$$P^{bnn\_dec} = 2 * CNT^{bnn\_out} - S, \qquad\text{(Eq. 1)}$$

where S is the size of vector. In this example S=8, so that $P^{bnn\_dec}$=2*5−8=2, which is the exact $P^{bnn\_dec}$=2 for the dot-product of FIG. 24.

Figure 26:
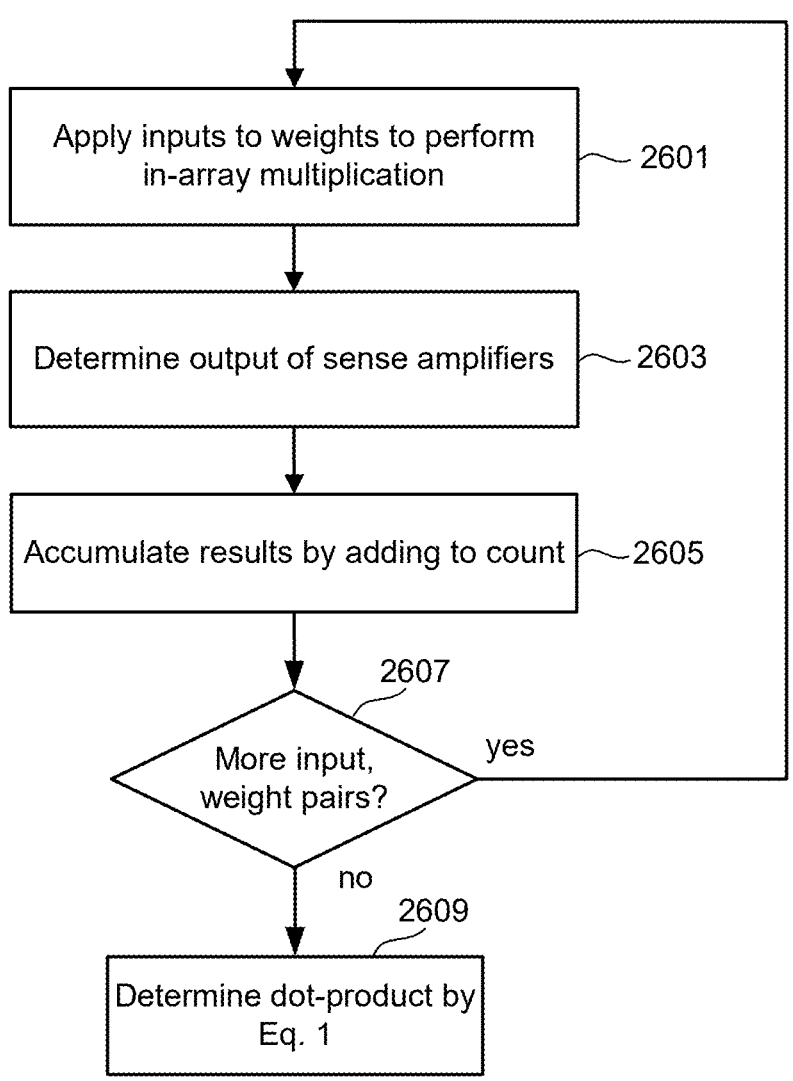
FIG. 26 is a flowchart for one embodiment of a dot-product calculation using a binary neural network in inference.

FIG. 26 is a flowchart for one embodiment of a dot-product calculation using a binary neural network in inference, as illustrated in FIGS. 24 and 25. At step 2601, a first input value is applied to a weight of a first unit synapse to perform an in-array multiplication. Referring back to FIG. 23, this corresponds to applying an Input<j> value to a corresponding selected unit synapse 2301i,j storing weight $W^{i,j}$ on a bit line BLi 2303i, for example Input<0> applied to the bottom-most unit synapse on BL0. At step 2603, the corresponding sense amplifier SAi 2311i determines whether the NAND string is conducting (1) or not (0), corresponding to an XNOR-ing of the input and weight values. Step 2605 performs the accumulation, with the sensing result added to a $CNT^{bnn\_out}$ value maintained by the counter CSCi 2313i. At step 2607, it is determined if there are more input/weight pairs to contribute to the dot-product, corresponding to another input/weight pair for the NAND (or for other NAND strings on other blocks connected along the bit line) and, if so, loops back to step 2601. If all the input/weight pairs have been computed and summed for the $CNT^{bnn\_out}$ of the dot product, the flow move on to step 2609 to convert the popcount $CNT^{bnn\_out}$ value to the dot-product $P^{bnn\_dec}$ by use of Eq. 1. In the example of the tables of FIGS. 24 and 25, the S value for Eq. 1 would be 8, while for an entire NAND string as illustrated in FIG. 23 S=32. Note that the NAND array structure of FIG. 23 allows for the computation of a dot-product according to the flow of FIG. 26 to be performed concurrently along each bit line.

Figure 27:
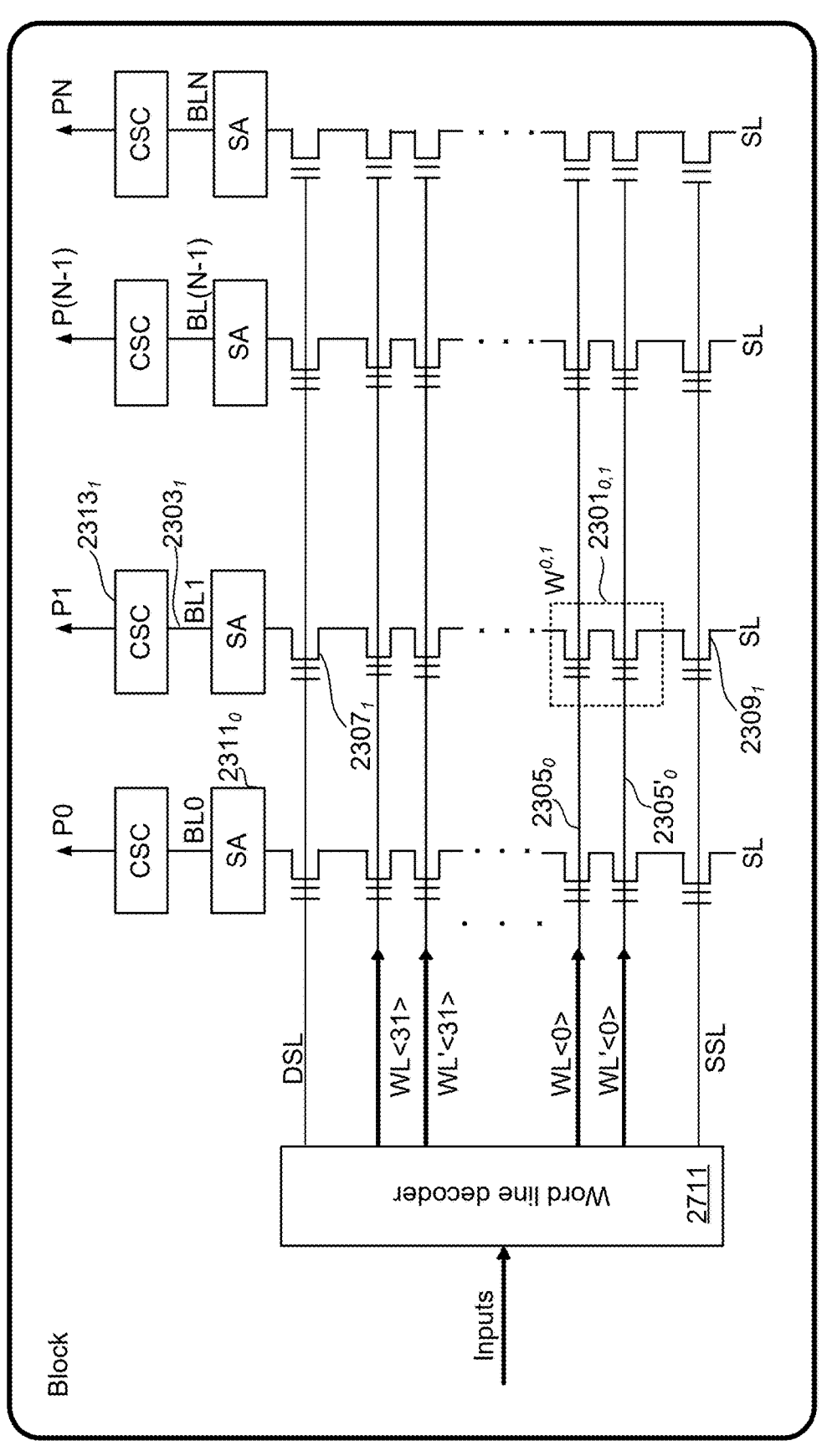
FIG. 27 illustrates an embodiment of a summation circuit for an SLC NAND array to support binary neural networks.

FIG. 27 illustrates an embodiment of summation circuit for an SLC NAND array to support binary neural networks. More specifically, FIG. 27 repeats many of the elements of FIG. 25 in a somewhat simplified form, but also shows a word line decoder block 2711. The word line decoder 2711 received the inputs, either a −1 or +1 input for a selected unit synapse, which are then translated into the corresponding voltage pattern for the word line pairs WL<j>, WL'<j> and applied to the selected unit synapse one of the word line pairs (those of the selected unit synapse). For non-selected unit synapses on the NAND string and for the select gates, the word lines and select lines will be set to be on, such as at the voltage level of Vpass. Based on these inputs, the counter-based summation digital circuits CSCi 2313i of each of the bit lines can increase the count based on the output of the sense amplifier SAi 2311i in the accumulation process.

Figure 28:
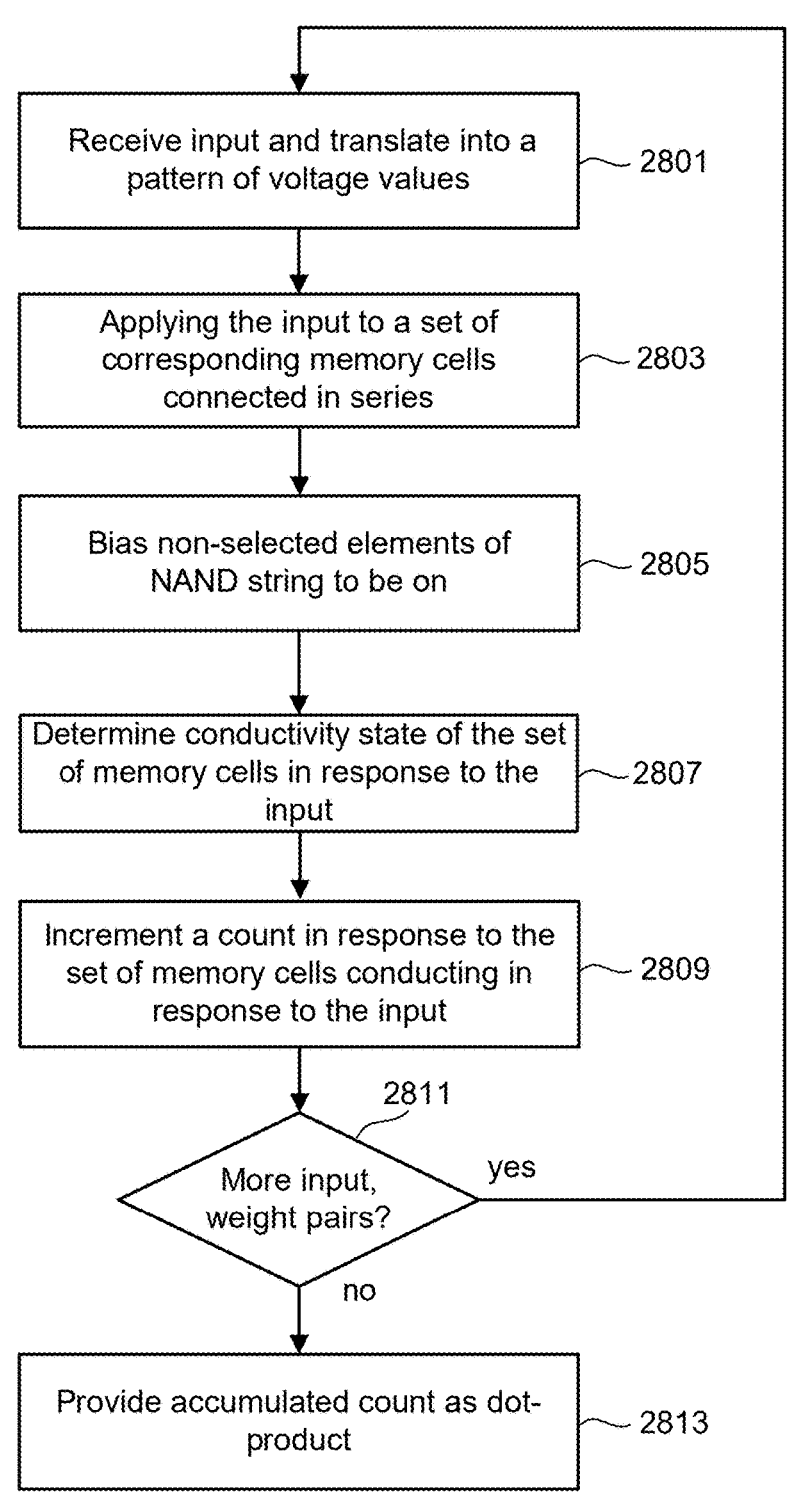
FIG. 28 is a flowchart for one embodiment of a dot-product calculation using a ternary-binary neural network in inference, as illustrated in the tables of FIGS. 24 and 25 and array architecture of FIG. 27.

FIG. 28 is a flowchart for one embodiment of a dot-product calculation using a binary neural network in inference, as illustrated in the tables of FIGS. 24 and 25 and array architecture of FIG. 27. Beginning at step 2801, and referring FIG. 27, the memory array receives an input Input<j> of and translates this into a set of voltage values, corresponding to a −1 or +1 input value; and at step 2803 applies the voltage level to a word line pair WL<j>, WL'<j> 2305j, 2305'j. As the word lines span the NAND string of the selected block, the process of FIG. 28 can be performed concurrently for any of the NAND strings for the unit synapses connected along the word line pair WL<j>, WL'<j> 2305j, 2305'j. Additionally, in the NAND structure, the other elements of a selected NAND string (SSLi 2309i, DSLi 2307i, and the non-selected memory cells of the NAND string) will be biased to be on, such as applying Vpass, at step 2805. Although listed as an ordered set of separate steps in FIG. 28, steps 2803 and 2805 are typically performed concurrently by the word line decoder 2711.

Step 2807 determines the conductivity of set of memory cells of the selected unit synapse. As illustrated in the table of FIG. 24, the conductivity of the NAND string corresponds to the output logic value of the unit synapse in response to the input and can be determined by the sense amplifier SAi 2311i. Based on the conductivity state of the unit synapse, at step 2809 the value of count of the corresponding CSCi 2313i is either incremented or not as discussed above with respect Eq. 1 and the table of FIG. 25.

Step 2811 determines if there are more input, weight pairs to add to the dot-product and, if so, the flow loops back to step 2801. Once the contributions of all of the input, weight pairs to the dot products have been determined, the dot product can be provided at step 2813. The set of dot-products determined at step 2813 can then serve as the input to a subsequent neural network layer or be the output of inference process.

Figure 29:
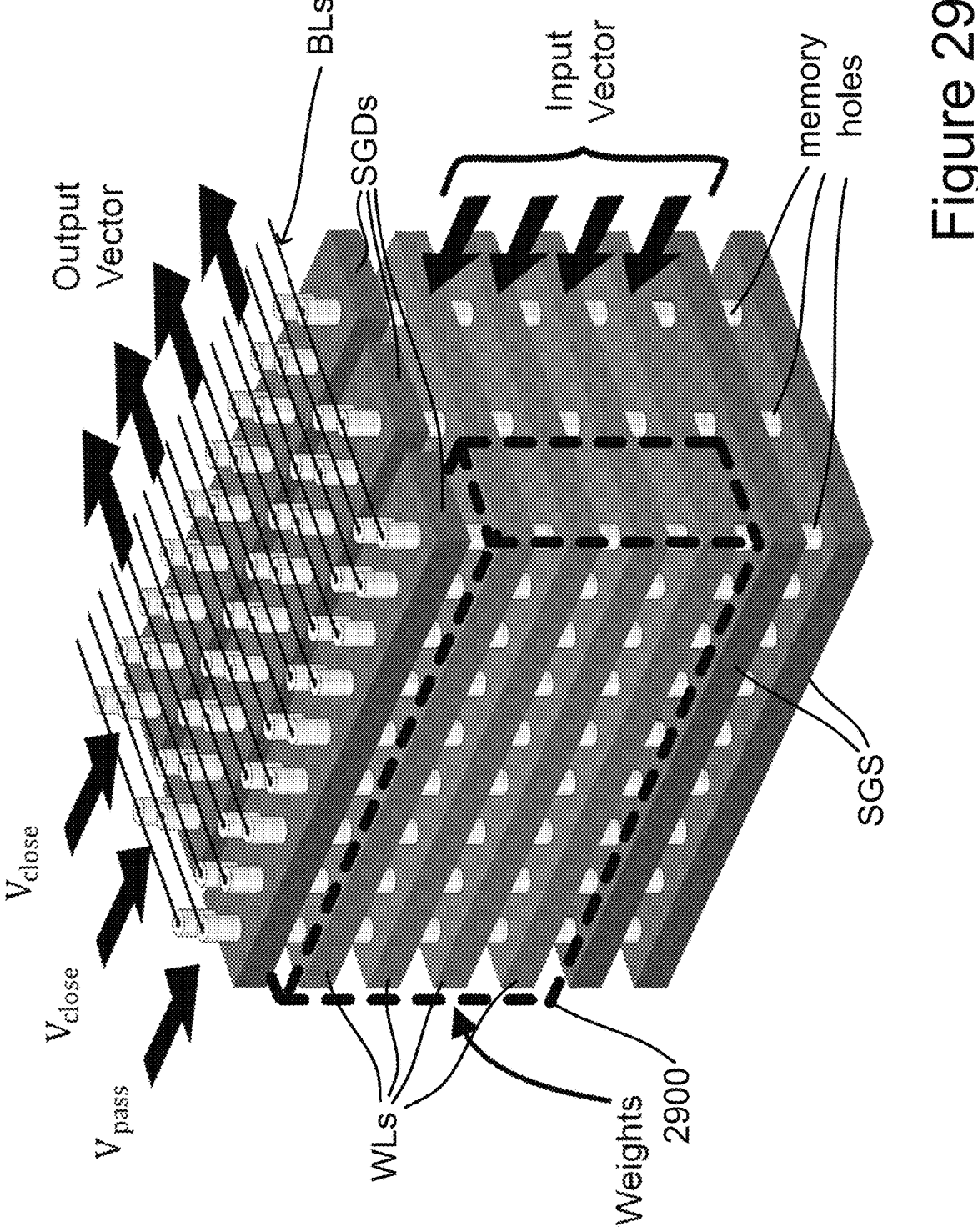
FIG. 29 illustrates an embodiment for the multiplication of a vector and a matrix using a 3D NAND structure in which the input vector applied to the word lines.

In the following, methods are presented for realizing a more generalized MAC (multiply accumulate) engine in a 3D NAND flash die, such as one which can take as input two vectors and output their dot product. The dot product, or inner product, of two vectors is a building block of matrix multiplication. The embodiments presented here for 3D NAND MAC can be used to implement modern machine learning algorithms and, in particular, neural networks. As these operands are not programed into the NAND memory, the memory cells are not reprogrammed with each operation so that the endurance of the device is not compromised. FIGS. 18-28 presented one example of embodiments for realizing the multiplication of an input vector and a matrix (the weight matrix) when the weight matrix is programmed into the NAND and in the context of a binary neural network. FIG. 29 is a schematic representation of the multiplication of a vector and a matrix when the input vector is applied to the word lines.

FIG. 29 illustrates an embodiment for the multiplication of a vector and a matrix using a 3D NAND structure in which the input vector applied to the word lines. FIG. 29 shows an abbreviated version of the 3D NAND structure presented above with respect to FIGS. 6A-6F, showing four word lines WLs between a (two-layer, in this example) lower source side select gate SGS and three drain side select gates SGDs, one each for a corresponding three planes. The memory holes run vertically through these horizontal layers and are each connected to a corresponding bit line BL through drain side select gates. To select a block 2900, the corresponding drain side select gate SGD is biased at $V_{pass}$ to turn these gates on, while for the other, non-selected blocks, the SGDs are biased at the off voltage of $V_{close}$.

As presented above with respect to FIGS. 18-28, to realize the multiplication of a vector and a matrix (e.g., a set of weights for a neural network), the matrix values are programmed into block of a NAND memory, such as block 2900. The weights, or other matrix entries, are static and are changed rarely (if at all) in order not to compromise endurance of the flash memory. The drain side select gates for the selected block (2900 in this example) receive the select gate on voltage $V_{pass}$, while the drain side select gates for unselected blocks are biased at select gate off, or non-select voltage, $V_{close}$. The input vector, which is dynamic and can change for every new operation, is applied on the word line planes. The output vector, corresponding to the product of the input vector and the stored matrix, is then collected on the bit lines.

The topology of the 3D NAND structure, such as illustrated in abbreviated form in FIG. 29, has a degree of symmetry with respect to the vertical direction and the horizontal direction. Vertically, multiple word line layers with subsets of the memory holes are selectable at the plane level by the horizontal, multiple drain side select gate line layers. A "vertical" input vector, with one component input for each word line layer, can be multiplied with the matrix stored in block 2900 selected based on the drain side select gate bias levels. In a horizontal arrangement, the roles of the word lines and drain side select gates can be reversed, as illustrated by FIG. 30.

Figure 30:
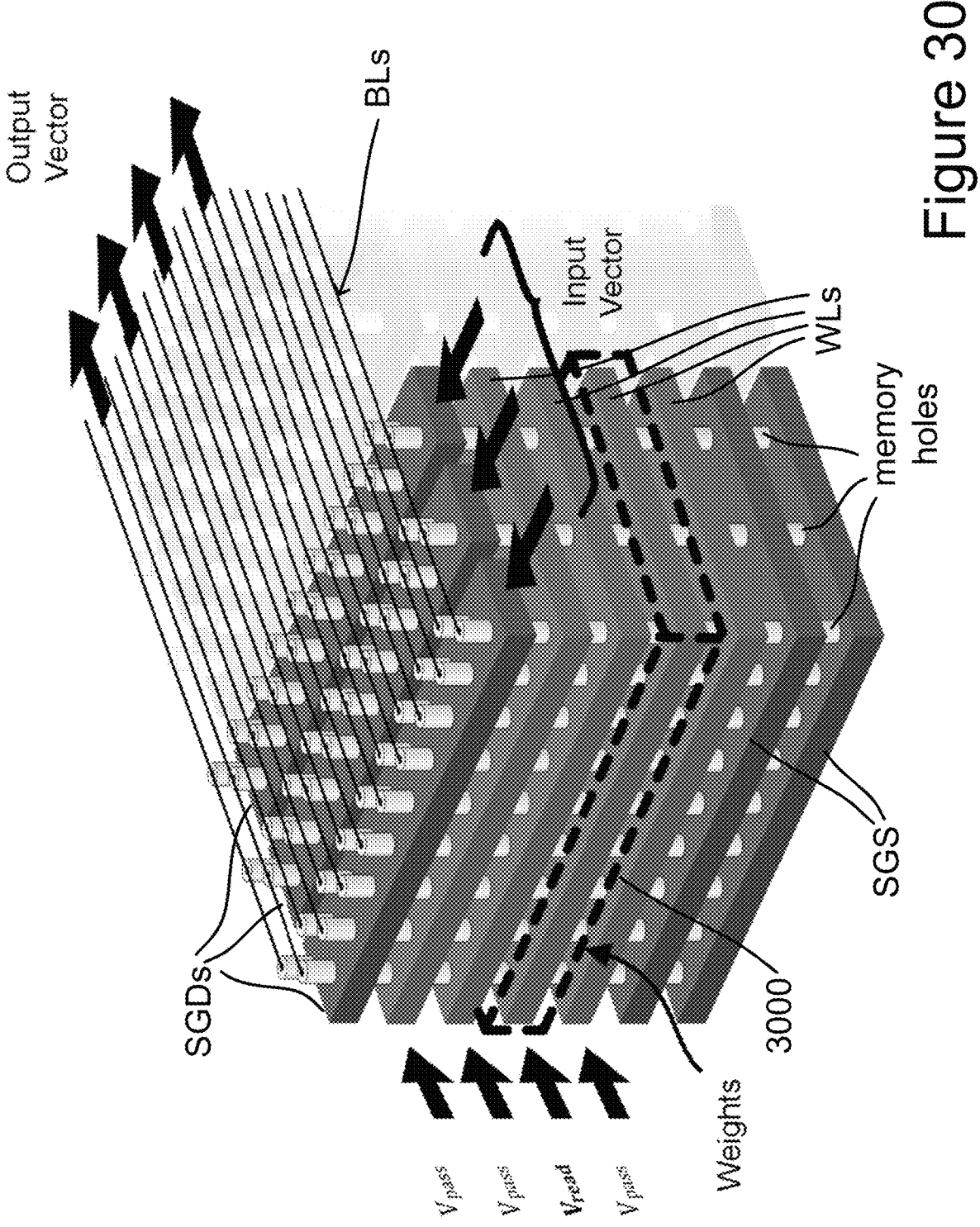
FIG. 30 illustrates a "horizontal" arrangement for vector-matrix multiplication in which the matrix values are stored on word line layers.

FIG. 30 illustrates a "horizontal" arrangement for vector-matrix multiplication in which the matrix values are stored on word line layers. In the arrangement of FIG. 30, the matrix values, such as neural network weights, are stored and accessed on a word line plane by word line plane basis. For example, to access a set of weights stored on a word line plane 3000, the select function is now implemented by the word line bias levels, with the selected word line biased at $V_{read}$, and the other unselected word lines biased at read by-pass voltage $V_{pass}$. The input vector is then applied horizontally, with the different components applied to different drain side select gates to select different sub-sets, or fingers, of the 3D NAND structure illustrated with respect to FIG. 6A-6F. The output vector values are then collected on the bit lines.

The approaches of FIGS. 29 and 30 can be used for computing the product of a dynamic input vector and a static weight matrix in neural networks. The following discussion considers a method to multiply two dynamic vectors (namely, for each new multiplication, the vectors can change, none of them being static as in the previous examples). This is done by combining the methods FIGS. 29 and 30 into a single operation, as illustrated schematically in FIG. 31.

Figure 31:
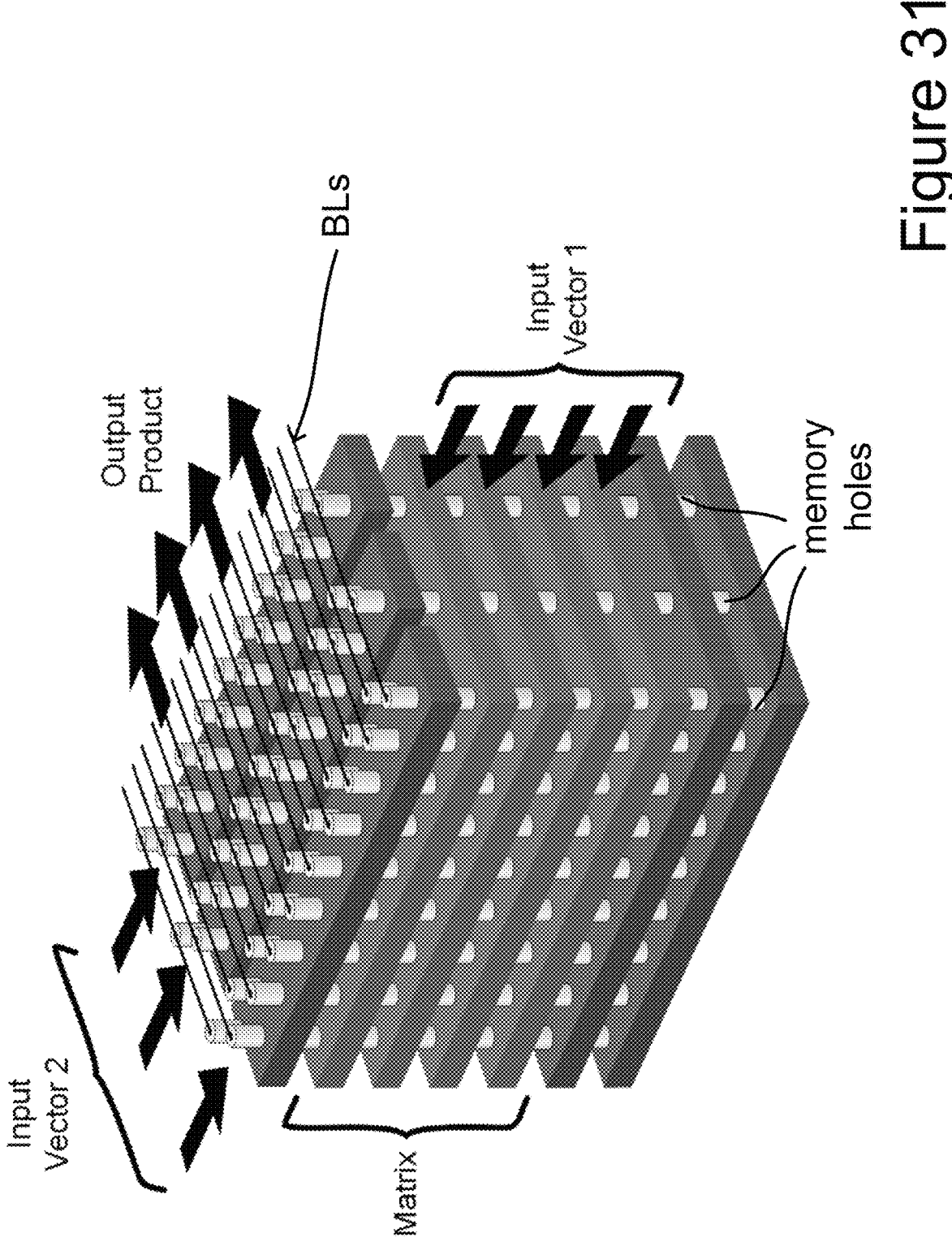
FIG. 31 schematically illustrates the use of a 3D NAND array to multiply two dynamic vectors.

FIG. 31 schematically illustrates the use of a 3D NAND array to multiply two dynamic vectors, where, for each new multiplication, the vectors can change, but the matrix programmed into the memory stays the same. FIG. 31 shows an abbreviated 3D NAND array laid out as in FIGS. 29 and 30, with four word line layers between a pair of source side select gate layers and multiple individually biasable drain side select gate layers (three are shown) running horizontally over the word lines. As discussed in more detail with respect to FIGS. 6A-6E, the memory holes extend vertically through these layers and are connected, for each drain side select gate, to a corresponding bit line. The array is now programmed to a represent a matrix. There are now two independent input vectors, with input vector 1 of a set of values applied vertically to word lines (as in FIG. 28) and an input vector 2 of a set of values applied horizontally to drain side select gates (as in FIG. 30). For each sub-set of NAND strings corresponding to one of the finger select gates, one of the NAND string is connected to a given bit line. The output product is then collected on the bit lines. This can be illustrated with respect to FIG. 32.

Figure 32:
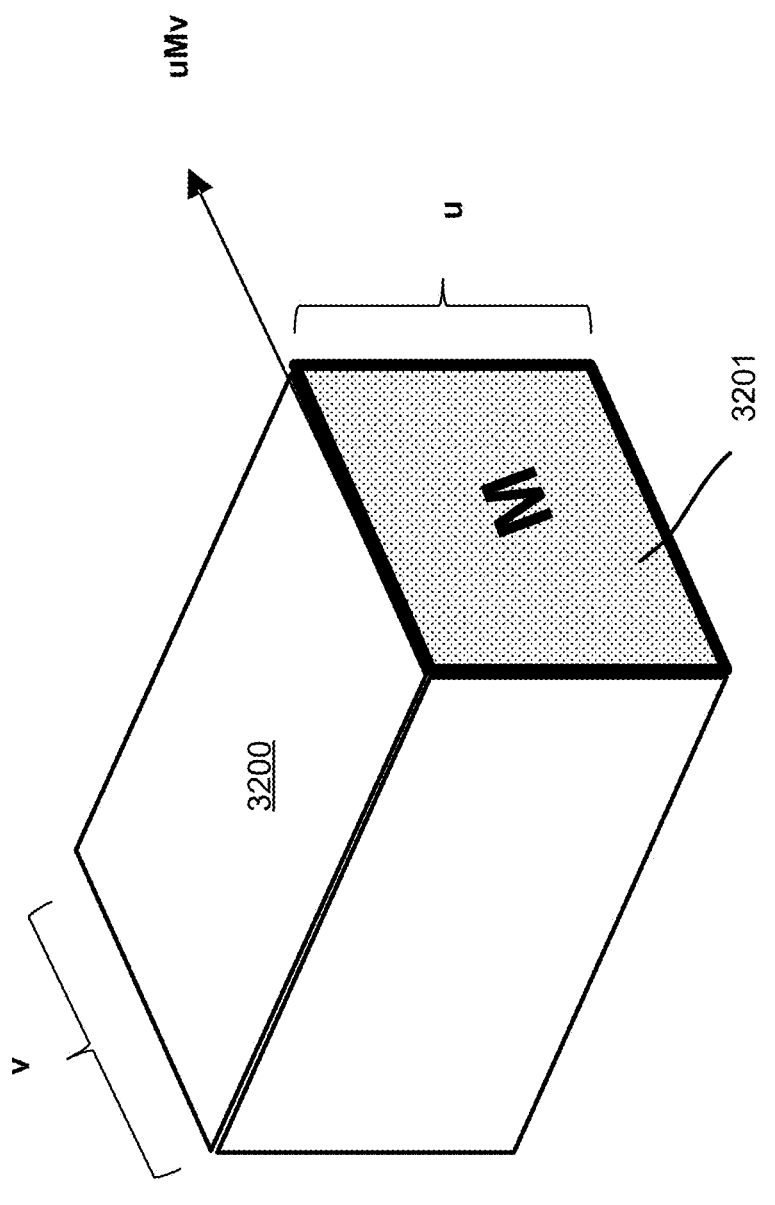
FIG. 32 illustrates the multiplication of two dynamic vectors with a matrix using 3D NAND memory.

FIG. 32 illustrates the multiplication of two dynamic vectors with a matrix using 3D NAND memory. A section 3200 of 3D NAND memory is arranged as the abbreviated layout in FIG. 31, but an actual device can have many more word line layers and drain side select gates, as described above with respect to FIGS. 6A-6E. An input vector u with i components $u^i$ is applied to a corresponding i word line layers, where i can be an integer up to the number of word line layers. An input vector v with j components $v_j$ is applied to a corresponding j drain side finger select gates. Both u and v can vary from operation to operation. The stippled region 3201 is a vertical plane of NAND strings corresponding to a single bit line in which a matrix M of i×j values $M_i^j$ is programmed into the memory cells corresponding to the vertical plane 3201. When a vector u is applied to the word line planes and a vector v is applied to the drain side finger select lines, the single bit line will collect the scalar result of the multiplication is $uMv = \Sigma_{i,j} u^i M_i^j v_j$, where the sum runs over the range of i and j values. Note that M can be programmed just once, saving memory wear and providing largely limitless memory endurance, while u and v can change for each new operation. These multiplications can be executed in both a binary embodiment or, by operating the linear regions for the memory transistors and select gate transistors, an analog embodiment.

Figure 33:
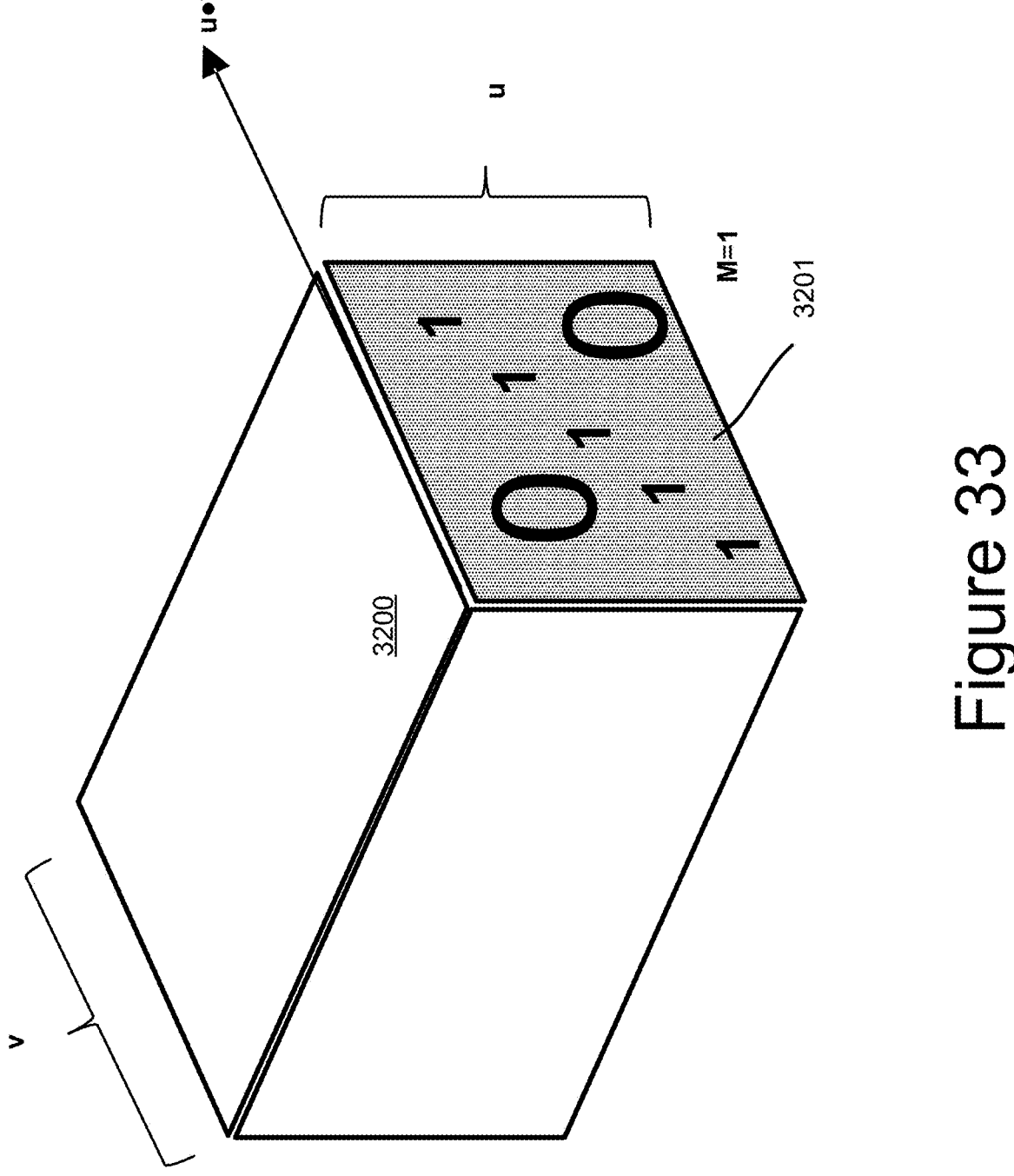
FIG. 33 illustrates an example of the multiplication of two dynamic vectors with a matrix for the identity matrix using 3D NAND memory.

FIG. 33 illustrates an example of the multiplication of two dynamic vectors using 3D NAND memory when M is the identity matrix. More generally, M can be another i×j matrix, but the examples here will be binary valued and, more specifically, the identity matrix to simplify the discussion. In this example, u and v have the same number of components (i.e., i and j have the same range), so that M is a square matrix and equal to the identity matrix 1, or $\delta_i^j$, which is 1 when i=j and 0 when i≠j. As used here, a "1" value is the low threshold voltage state (e.g., the erased) of a memory cell and a "0" is a high threshold voltage state memory cell, which will not conduct for the applied read voltage. In FIG. 33, due to the numbering convention used here, in vertical plane 3201 the "1" values run anti-diagonally rather than the usual diagonal "1" value of the identity matrix. The memory cells of vertical plane 3201 are programmed to the M values, while the other vertical planes corresponding to other bit lines are all programmed to have their memory cells in the 0 value. For the M=1 example, $uMv = \Sigma_{i,j} u^i \delta_i^j v_j = \Sigma_i u^i v_i = u \cdot v$, the dot product of u and v. Consequently, by programming the vertical plane of NAND strings along a word line to the identity matrix, the bit line will collect the dot product of the two vectors dynamically applied to the word lines and the drain side finger select lines.

In a 3D NAND embodiment, the size of the vertical u vector (i.e., the range of i) is limited by the number of word line layers. The size of the horizontal v vector (i.e., the range of j) is limited by the number of individual fingers selectable by the drain side select gate lines for the entirety of a plane, which is typically much larger than the number of word line layers. Consequently, this allows for a single operation to realize the concurrent multiplication of u and several different vectors $v_1, v_2, v_3, \ldots$, where the v vectors can be separate vectors or columns of a matrix V, so that the result of one computation (with M=1) becomes a vector of output values $u \cdot V$. This can be illustrated with respect to FIG. 34.

Figure 34:
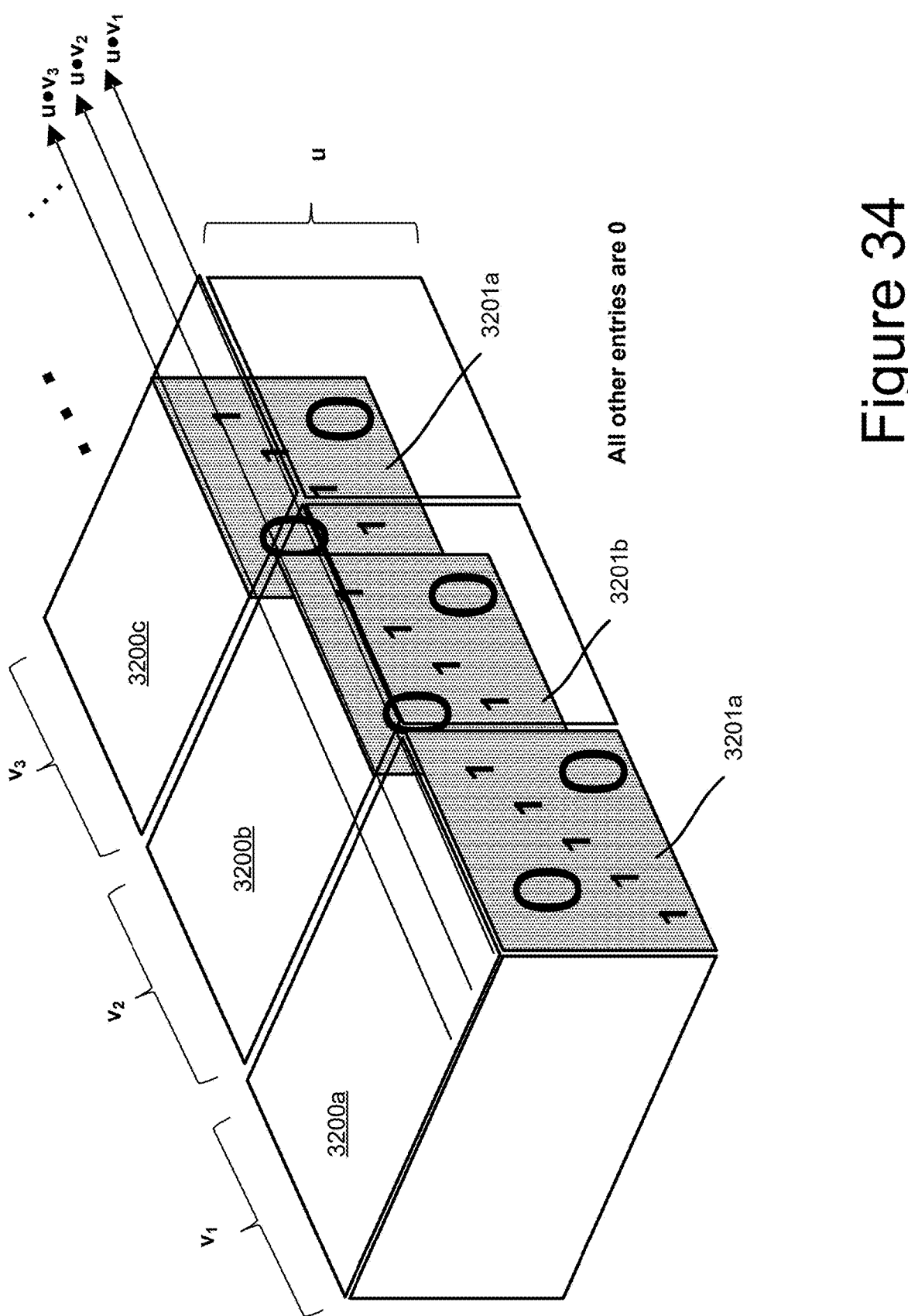
FIG. 34 illustrates the use of an extended portion or the entirety of a NAND plane and, in some embodiments, die for the multiplication of dynamic vector values.

FIG. 34 illustrates the use of an extended portion or the entirety of a NAND plane or, in some embodiments die, for the multiplication of dynamic vector values. This example again uses the identity matrix, M=1, for each of the multiplications to simplify the discussion. For each of the three shown portions 3200a, 3200b, 3200c of a NAND plane, a corresponding vertical plane of NAND strings 3201a, 3201b, 3201c is programmed to a set of matrix values, which are all the identity matrix in this example. Although three portions of the plane are shown, this can extend further into the plane, as represented by the ellipsis. A vertical input vector u is applied by biasing the word line layers, with a set of second input vectors $v_1$, $v_2$, $v_3$, . . . applied horizontally to the drain side finger select gates. The second input vectors $v_1$, $v_2$, $v_3$, . . . can be separate vectors or columns/rows of a matrix. For each of the horizontal second input vectors $v_1$, $V_2$, $v_3$, . . . , the corresponding bit line collects the value $u \cdot v_1$, $u \cdot v_2$, $u \cdot v_3$, . . . , where these can either be kept as separate output values (such as a vector in the case of a matrix V) or combined, in the case of a dot product broken down into sub-sets for the second input. The other memory cells for each of the portions 3200a, 3200b, 3200c, . . . of the NAND plane are programmed to "0". The input vector u can similarly be split up into multiple segments, either corresponding to different vectors or columns/rows of a matrix.

Figure 35A:
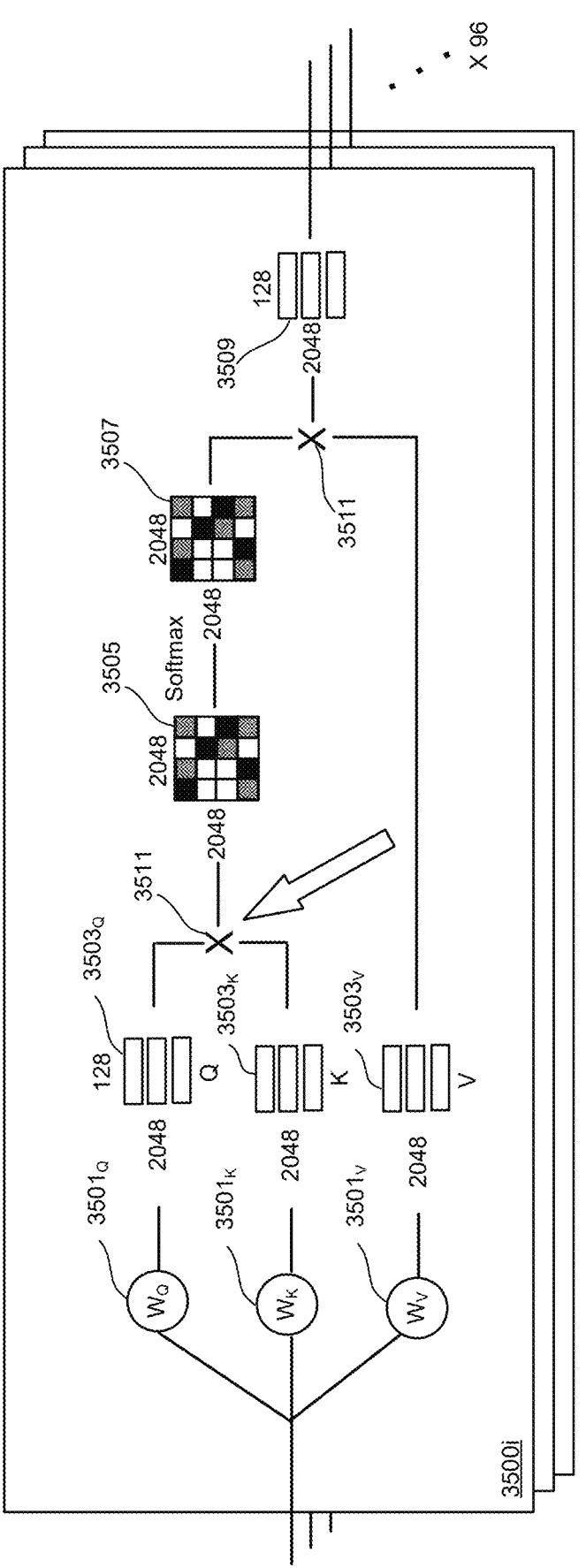
FIGS. 35A and 35B illustrates some elements of an example of a transformer model of deep neural network and how the techniques of FIGS. 31-34 can be applied.
Figure 35B:
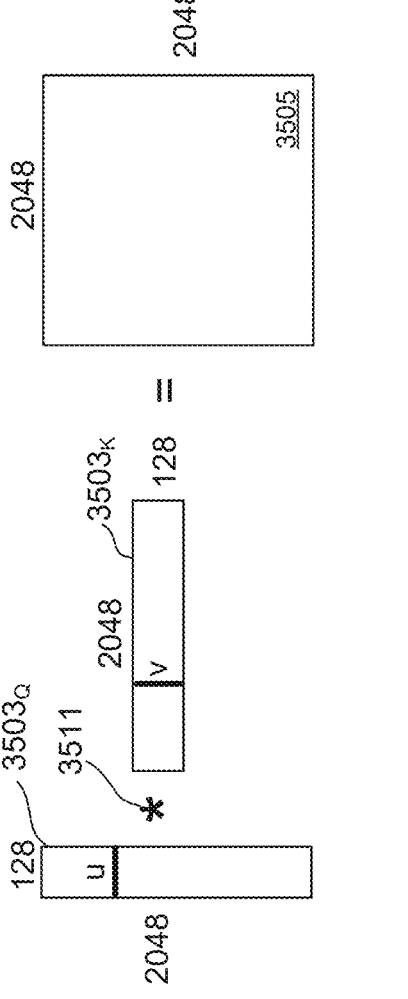

Returning to examples of neural networks applications, the embodiments of FIGS. 18-28 program the weights into the memory array, which is convenient for applications where the weight values are largely fixed and the input vectors are dynamic. In these embodiments, if the weights change, the memory array needs to be reprogrammed, leading to memory wear and, since a set of weights can be quite large, this can require a relatively large re-writing time. The embodiments of FIGS. 31-34 allow for both of the inputs to change dynamically from operation to operation, which makes them suitable for multiply and accumulation operations in examples such as Generative Pre-trained Transformer (GPT) models of deep neural networks where a significant part of MAC computations involve dynamic values, for example in the attention mechanism. FIGS. 35A and 35B illustrate such an example.

FIGS. 35A and 35B illustrate some elements of an example of a transformer model of a deep neural network and how the techniques of FIGS. 31-34 can be applied. FIG. 35A shows some of the elements of a layer 3500i of the transformer model, where there can be a large number of these layers, such 96 layers for example. The layer receives as inputs three sets of weights $W_Q$ 3501$_Q$, $W_K$ 3501$_K$, and $W_V$ 3501$_V$, corresponding to Query, Keys and Value matrices of weight values at 3503$_Q$, 3503$_K$, and 3503$_V$. In this example the size of the matrices in 128×2048, which, as represented schematically, can be broken down into vectors. The Query and Key matrices are multiplied at 3511 to generate the 2048×2048 matrix 3505, where all of the sizes here are examples and other embodiments may have different sizes. Various neural network operations, such as Softmax, can be performed on the matrix 3505 to generate the matrix 3507. The output matrix 3509 for the layer is then generated by a multiplication of matrices 3507 and 3503$_V$. FIG. 35B illustrates an embodiment of how the techniques of FIGS. 31-34 can be applied to the matrix multiplications of FIG. 35A, such as multiplication 3511 indicated by the arrow.

In FIG. 35A, the multiplication of Query, Keys and Value matrices involves values that change for each new computation. FIG. 35B illustrates the multiplication 3511 of the Query matrix 3503$_Q$ and Keys matrix 3503$_K$. The matrices can be split into rows/columns and the multiplication 3511 can be realized by programming the 3D NAND array to the identity matrix as in FIGS. 33 and 34. The Query values are broken down into the u vectors and Keys values broken down into v vectors. The example size of 128 is smaller than the number of NAND word line layers, so that it fits the u vector. The size 2048 can be spread across multiple finger select lines, as vectors $v_1$, $v_2$, $v_3$, . . . as illustrated in FIG. 34. As the multiplication identity 1 or other matrix M is only programmed into the NAND array once with either 1 or 0 values, so that there is essentially no wear on the array.

Figure 36:
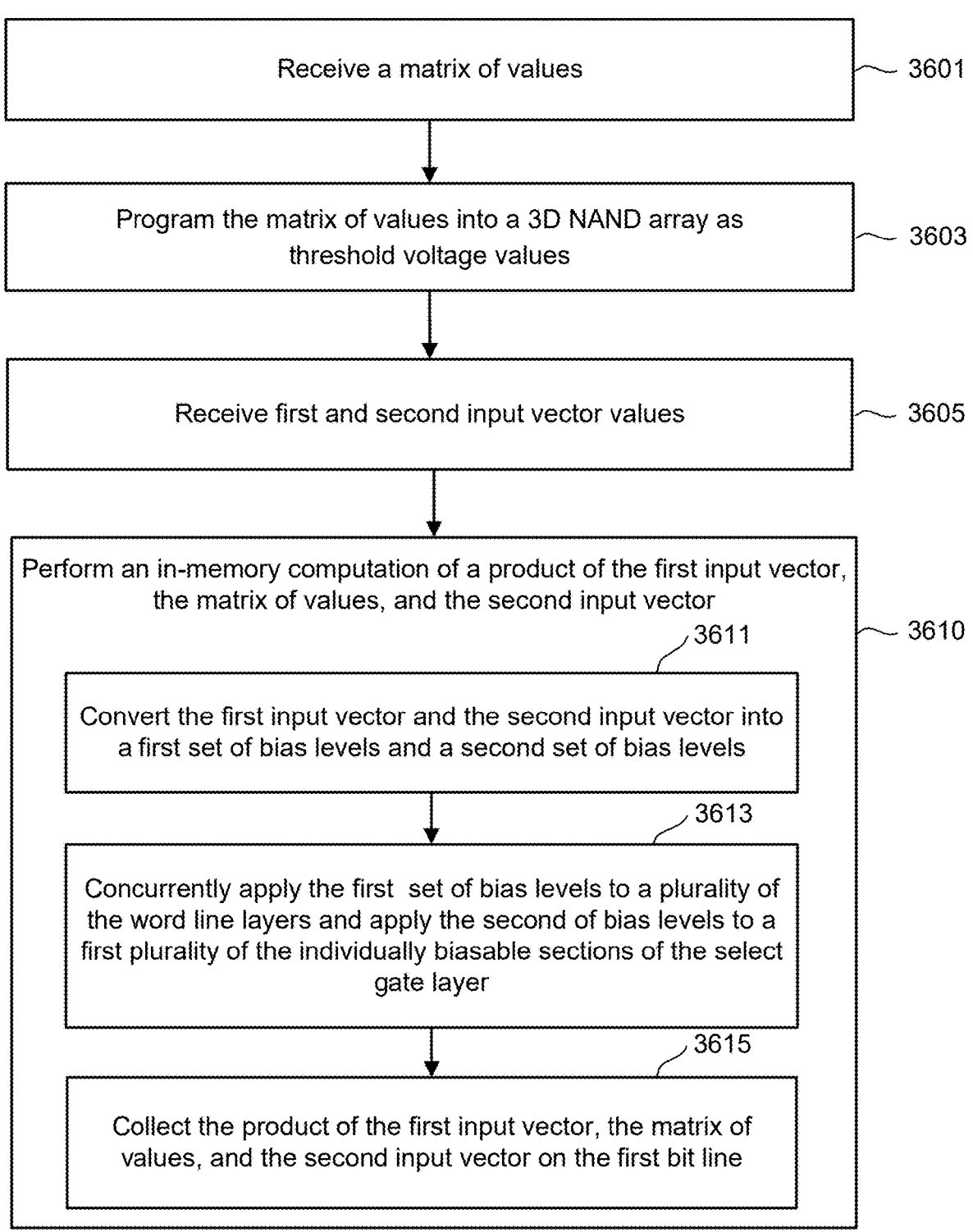
FIG. 36 is a flowchart for an embodiment of operating a 3D NAND multiply and accumulate engine with dynamic inputs.

FIG. 36 is a flowchart for an embodiment of operating a 3D NAND multiply and accumulate engine with dynamic inputs. Beginning at step 3601, a matrix of values is received. The matrix is received, for example, at the control circuitry of memory die 300 or control die 311 from the controller 102, which in turn can receive the matrix from the host 120. The memory die control circuitry can then program the matrix into the memory array 302 as described with respect to FIGS. 32-34 using the programming algorithms as described above with respect to FIGS. 7A-12. In some embodiments, the matrix can be pre-programed into the memory array before the memory device shipped to the user. Once the matrix is programmed in to the array, the dynamic input vectors can be received at step 3605.

At step 3605 first and second input vectors are received at memory die 300 or control die 311 from the controller 102, where these can again be received from a host 120. The in-memory multiplication is then performed for the first input vector, the matrix of values, and the second input vector at step 3610. The multiplication occurs at steps 3611 and 3613, with the accumulation, or collection, at step 3615. In more detail, in step 3611 the system control logic 360 and/or row decoder 322 converts the first and second input vector values into a corresponding set of bias levels that, at step 3613, are applied by the array drivers 324 to the word lines and drain side select lines. The product, such as a dot product in the case of the matrix being the identity matrix, is then collected on the corresponding bit line at step 3615.

Although the embodiments above are presented primarily in the context of binary embodiments, as noted above with respect to FIG. 32, the in-memory multiplications can also have analog implementations. In the case of Vector-Matrix Multipliers (VMMs), such as when a matrix of values (e.g., weight of a neural network) are programmed into the memory cells of a memory array, the weights can be programmed as analog or multi-bit (e.g., 6- or 8-bit) values. The inputs are then applied as analog voltage level vertical input vectors on word lines of different fingers (as in FIG. 29) or as analog voltage level horizontal input vectors on finger select gates of different word line planes. In the case of multiplying two input vectors and a matrix, as in the case of FIG. 31, both of the input vectors can be analog values and the matrix programmed into the array an analog or multi-bit value. The following discussion considers such analog embodiments and, more specifically, techniques of treating noise in such embodiments in more detail.

The analog embodiments discussed below will focus on vector-matrix multiplication, but readily extend to the vector-matrix-vector multiplication with two dynamic input vectors described above with respect to FIGS. 31-34 and to matrix-matrix multiplications, which can be implemented by breaking one of the matrices into vectors such as discussed with respect to FIG. 35B. Deep neural networks (DNNs), including large language models such as the transformer models discussed with respect to FIGS. 35A and 35B, are largely linear algebra engines built out of vector-matrix multipliers.

Inferencing in deep neural networks (DNNs) requires a large amount of memory and computations, where the computations are usually real number multiplication and accumulations (MACs). Traditional DNNs are inferred on GPU devices, where the large size of DNN models require the GPUs to have a large memories and transfer large amounts of data, with a corresponding high cost. The process-in-memory techniques presented above enable the computation to be implemented using the memory array. Although presented here primarily in the context of a 3D NAND memory, in other embodiments the non-volatile memory can be implemented in other memory technologies, such as ReRAM, MRAM, or PCM. In the embodiments represented in FIGS. 29-31, the computations are implemented by inputting signals into the memory array and measuring the output as voltages or currents. A memory array will have a dynamic range (i.e., the max/min voltage/current it can represent) based on its design and the memory technology used, where a larger dynamic range has better precision and more tolerance to noise. The following presents techniques for enlarging the dynamic range of weight values that can accurately be used.

Figure 37:
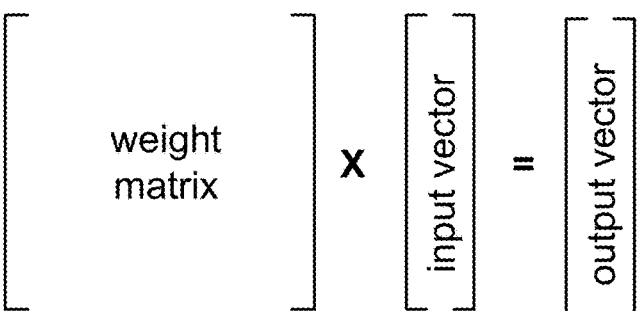
FIGS. 37 and 38 schematically illustrate matrix-vector multiplications, which are a basic computation unit of a DNN, and its implementation using a non-volatile memory array.
Figure 38:
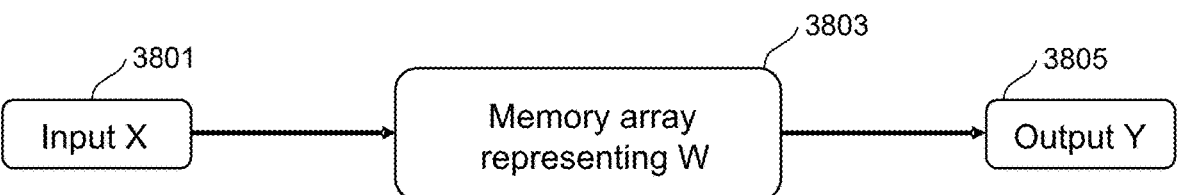

FIGS. 37 and 38 schematically illustrate vector-matrix multiplications, which are a basic computation unit of a DNN, and its implementation using a non-volatile memory array. Examples of such multiplications have been given above, but are being represented here to illustrate the splitting of weights presented in FIGS. 40 and 41. More specifically, FIG. 37 illustrates the basic idea of a vector-matrix multiplication where the matrix is a set of weights, where a weight matrix is multiplies by an input vector to generate an output vector. If the input vector X is of size n×1 with components $x_i$, where i runs from 1 to n, and the weight matrix W is of size m×n with components $W_j{}^i$, where j runs from 1 to m, then the output vector Y is of size m×1 with components given by $y_j = \Sigma_i W_j{}^i x_i$.

When implemented through an in-memory computation as illustrated in FIG. 38, the input X 3801 is applied to a set of weights W 3803 to programmed into a memory array to generate an output vector Y 3805. In an analog implementation, input vector X and output vector Y will be analog valued, with the weight values programmed as either analog values or multi-bit digital values. For example, in NAND memory devices multi-bit programming techniques are better developed so that weights might be written in a 6- or 8-bit per cell format, for example. For example, in an embodiment based on FIG. 29, the input vector is applied as a vertical input vector of analog values to the word line layers of the array to generate the output vector on the bit lines based on the product of the input vector and the weights 2900. In an embodiment based on FIG. 30 a horizontal input vector of analog values to the drain-side finger select gates of the array to generate the output vector on the bit lines based on the product of the input vector and the weights 3000. Similarly, in the vector-matrix-vector multiplication based on the embodiment of FIG. 31, both of input vector 1 and input vector 2 are applied as analog voltage levels to generate the product with the matrix value programmed in the array can be more general analog or multi-bit threshold voltage levels, extending the identity matrix examples of FIGS. 32-34. In addition to implementing the analog input values based on voltage level, alternate embodiments can implement the analog input values based on a timing-based method.

Figure 39:
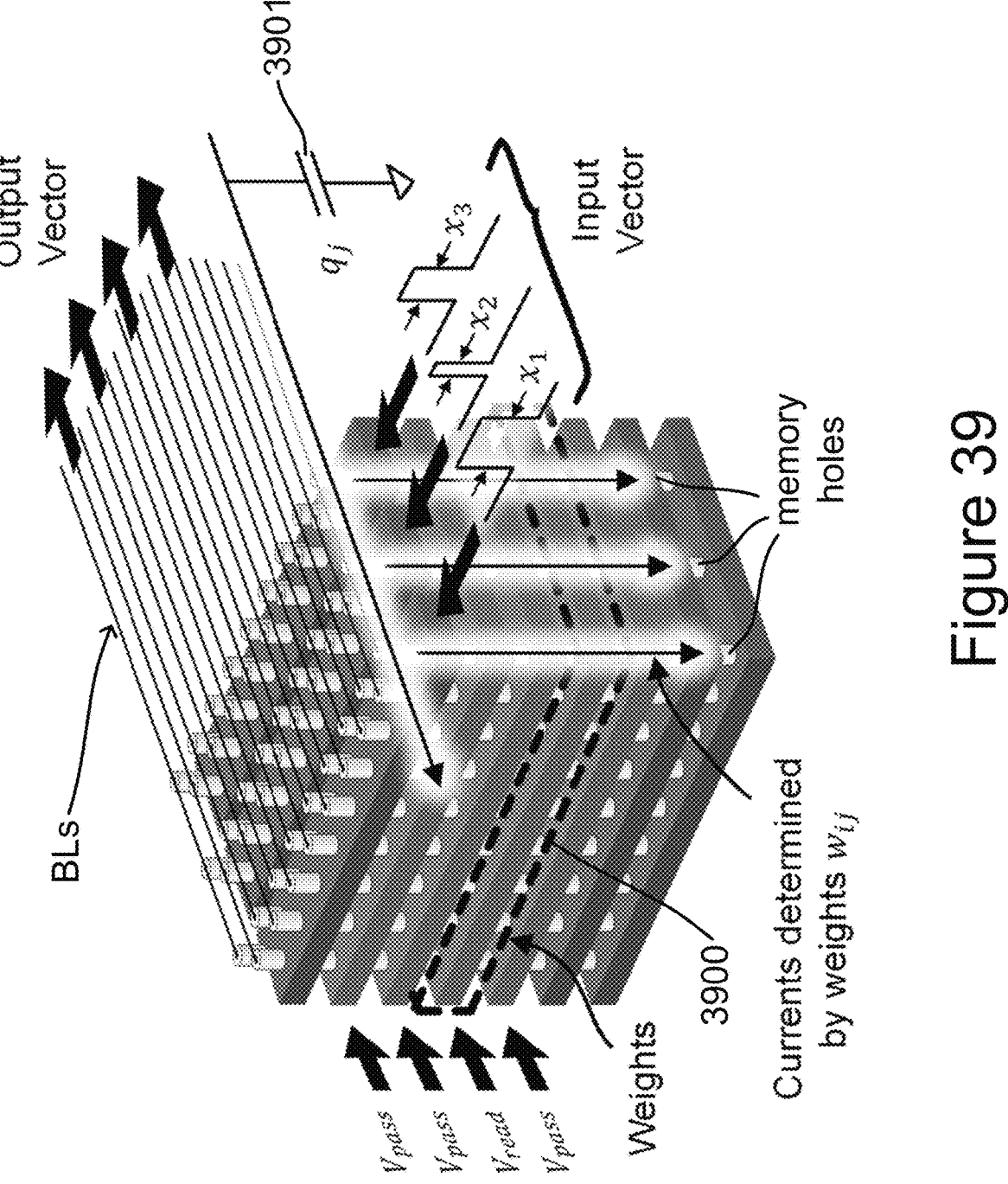
FIG. 39 illustrates a timing based method for analog values matrix-vector multiplication.

FIG. 39 illustrates a timing based method for analog values matrix-vector multiplication. In this example, the input vector is a horizontal input vector as in FIG. 30, where the input is applied to a set of weights 3900 by the set of voltages applied to the drain-side finger select gates of the array to generate the output vector on the bit lines, with the output value for a bit line q saved as accumulated charge $q_j$ on the capacitor 3901. Rather than input values encoded as voltage amplitudes as in FIG. 30, the high voltage level is now the same for all (non-zero) inputs, but the analog values are now encoded as the duration of the high voltage level. FIG. 39 shows three examples of timing-based inputs, $x_1 > x_3 > x_2$, where the duration is proportional to the amplitude of the analog value. The timing-based method can also be applied the vertical input vectors, applied as in FIG. 29, but with a duration encoding rather than an amplitude encoding, and also to one or both input vectors for a vector-matrix-vector multiplication as in FIG. 31.

One application to which neural networks can be applied is to the determination of defects of a memory device and, in particular, the determination of the health of the memory blocks of the memory device storing the weights of a neural network for this determination. By training and storing in a memory device the weights of a neural network in a memory system, during the operation of the memory system features related to defects or errors that arise during the operation of the memory system can be saved in the memory device and used as part of the input vectors for the neural network to determine bad blocks that should be mapped out of the memory system. This approach can be used for memory systems that are themselves being used for compute-in-memory applications of neural networks, but also for more general applications, such as general use solid state drives. Although the following discussion is based on a NAND memory embodiment, it can be applied more generally to memory devices using other types of non-volatile memory cells, such as MRAM or PCM.

NAND flash memory is a widely used choice for storage and data transfer across consumer devices, enterprise systems, and industrial applications. This preference is attributed to its nonvolatile nature, cost-effectiveness, high storage density, and rapid access speeds. In addition solid state drives, in applications such as a mobile phone NAND Flash serves as the repository for data files like photos, videos, and music on a microSD card.

In these applications, the intricacies of NAND block management emerge as a pivotal subject, influencing not only NAND development but also broader system development. This significance arises from the direct correlation between NAND block management and the overall quality of NAND. The primary factors contributing to NAND quality issues can be distilled into two key reasons: firstly, there is the depletion of the NAND block budget; and secondly, data loss within NAND blocks. Effectively managing these blocks poses an enduring and challenging task that remains a central theme in the realm of NAND technology.

Previous approaches to managing the blocks of NAND memory can be divided into two approaches: factory screen/stress methods for identifying bad blocks; and firmware block management algorithms for bad blocks occurring in the field. The fundamental concept behind the screen/stress method is to establish and utilize indicators for distinguishing between good and bad NAND blocks. However, this methodology introduces challenges, including overkill and underkill. Overkill leads to the misclassification of good NAND blocks as bad, resulting in resource inefficiencies and a decline in overall NAND efficiency. Conversely, underkill treats defective NAND blocks as acceptable, potentially allowing flawed units to reach customers and causing quality problems or even disasters. Another drawback is the one-time nature of this method during factory testing, as certain indicators may not degrade significantly, rendering them unreliable. Moreover, the substantial cost associated with developing and deploying screen/stress items, along with significant capital expenditure on testers, diminishes the efficiency of this method.

Once with a customer in the field, the NAND firmware can have a dedicated algorithm that manages bad blocks that arise in the field, relying predominantly on the status returns of NAND operations. For instance, in the event of a NAND erase operation failure, the corresponding NAND bad block is retired. When a program operation occurs, the firmware relocates the program source data to another functional block. In the case of read errors, the firmware employs various technologies such as ECC, optimal read, and XOR, among others, to recover the data. Despite the firmware-based block management operating on-the-fly, a significant weakness lies in its post-treatment approach after a failure has occurred. As a result, there are persisting NAND fatal failures that may lead to data loss and contribute to quality issues for customers.

Figure 40:
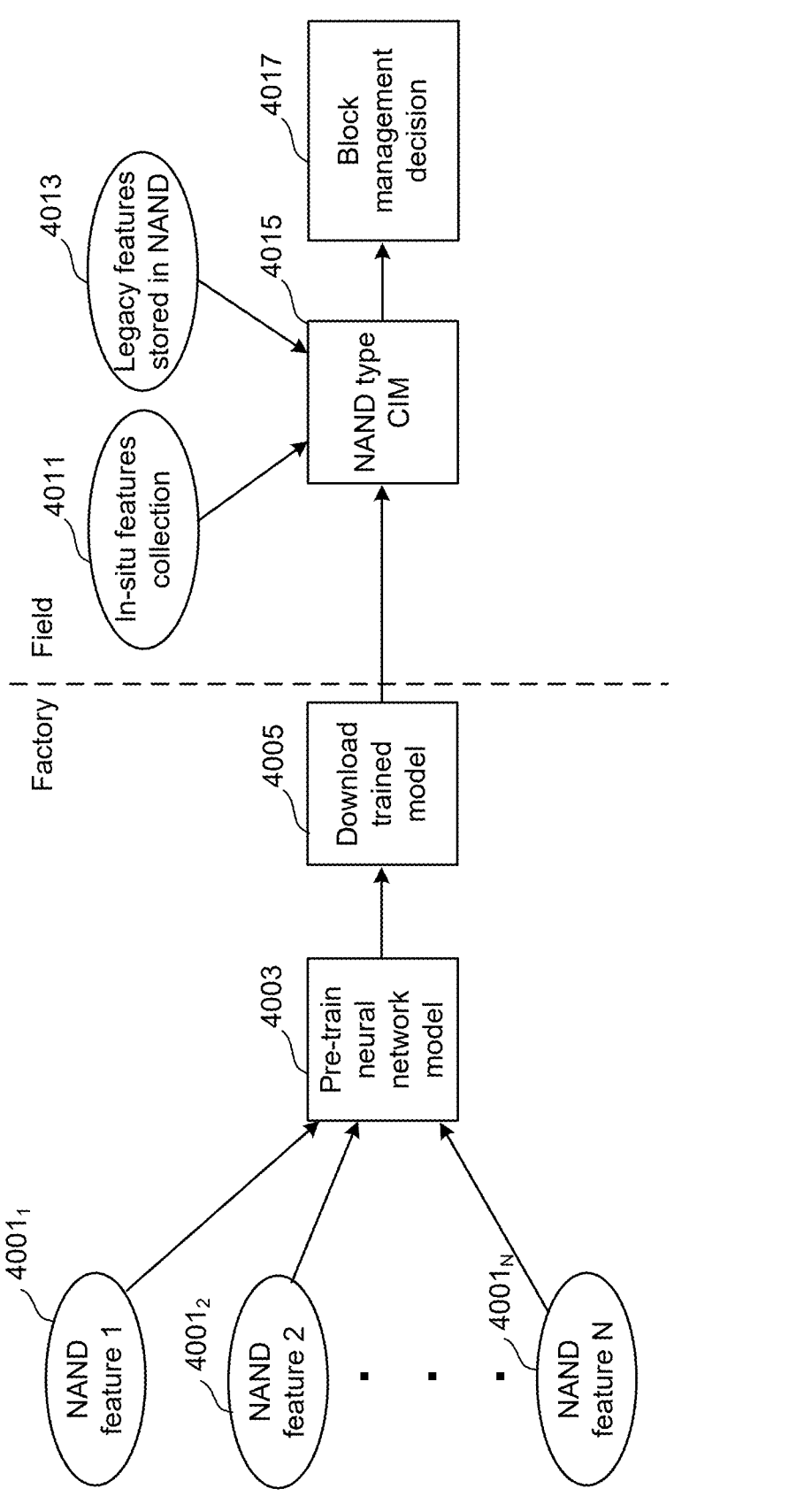
FIG. 40 illustrates an example of splitting and renormalizing a set of weights to reduce the relative amount of noise error for smaller weight values.

Following an in-depth examination of data related to defects during customer use, a significant pattern emerged, revealing that the major contributors to the number of defect quality incidents (typically expressed as defective parts per million, or DPPM) were instances of data loss within specific blocks, rather than the commonly expected issue of running out of the block budget. To address this finding, the following embodiments present the incorporation of NAND with compute-in-memory techniques as a proactive measure for predicting and managing the health of blocks in the NAND system to mitigate these problems. More specifically, the following embodiments use a NAND type matrix as compute-in-memory module with two functions: one is to store a neural network model which is pre-training during factory and another function of this NAND type matrix is to do inference associated with the neural network model which is stored in the same NAND matrix. FIG. 40 provides an overview of these embodiments.

FIG. 40 is an outline of embodiments for intelligent NAND with compute-in-memory to enable predictive block health assessment. The process includes two segments, one for the factory portion (4001, 4003, 4005) and one for the field usage (4011, 4013, 4015, 4017). The factory portion includes training the neural network 4003 based a set of NAND features $4001_1$-$4001_N$ related to memory defects. And after neural network model is trained, this pre trained model is downloaded 4005 to the compute-in-memory (CIM) matrix in the NAND devices that will be shipped to market. The training process is as described above for the general case with respect to FIG. 15A, with FIG. 41 being a more specific version for the predictive block health case.

Figure 41:
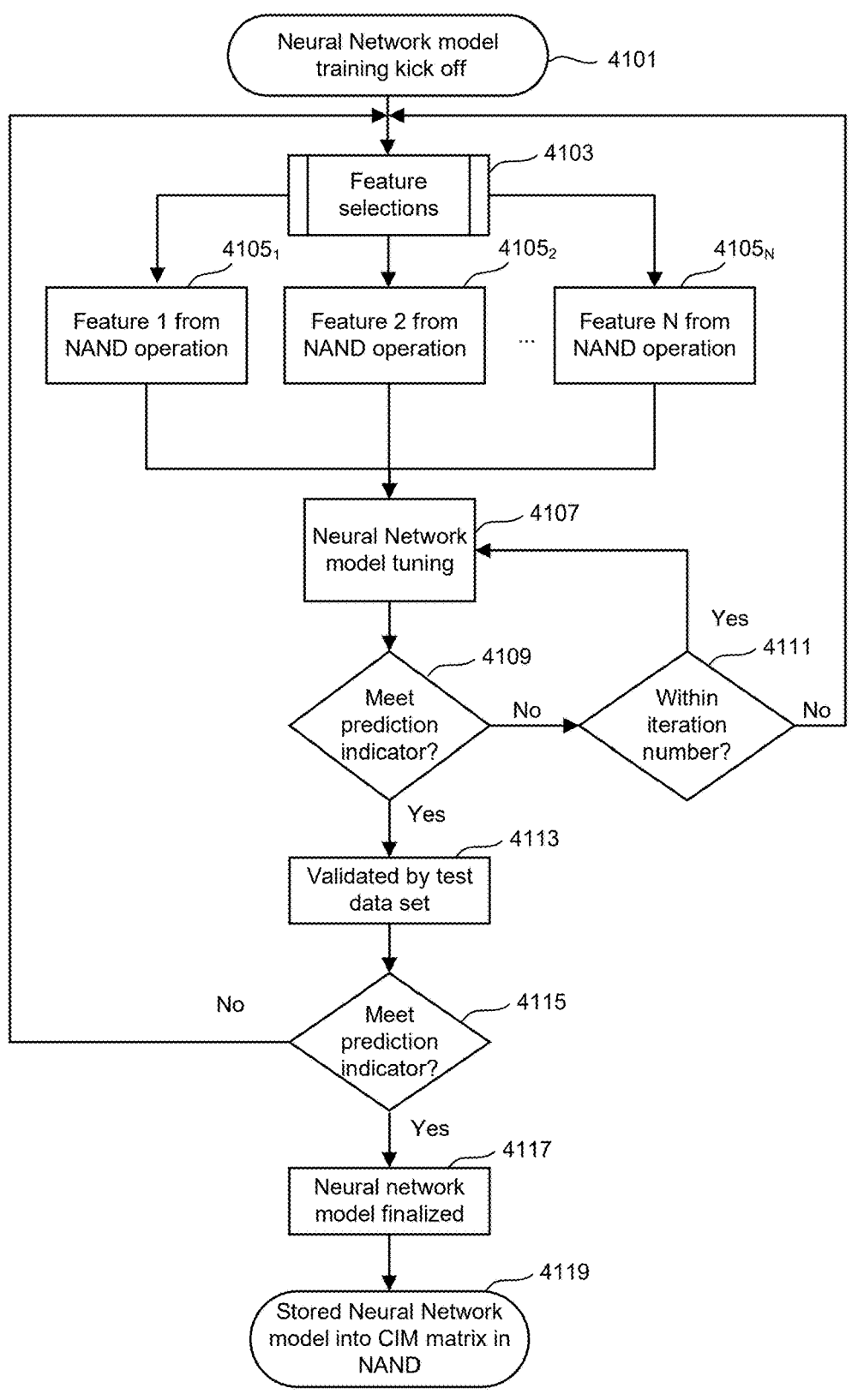
FIG. 41 is a flowchart of an embodiment for the training of a neural network for predictive block health assessment of a memory device.

FIG. 41 is a flowchart of an embodiment for the training of a neural network for predictive block health assessment of a memory device. As discussed above with respect to FIG. 15A, this training process can be an offline process that relies on an engine with high computing power. At the beginning 4101 of the training process, serval features are selected at step 4103 to do neural network model tuning. The feature set can include the different failure modes for the memory device, such as, for the 3D NAND examples given above, things such as word line to word line leakage, word line to memory hole leakage, word line to local interconnect leakage, select gate leakage, and other defects found to contribute to block failure. To make the model as precise as possible, training data set of features $4105_1$-$4105_N$ can benefit from all those product development learnings from various platforms from the whole of a company. During the neural network model tuning at step 4107, a confusion matrix (pass accuracy and fail accuracy) as illustrated in FIG. 42 can be used as indicators to judge if the model meets the specified criterion.

Figure 42:
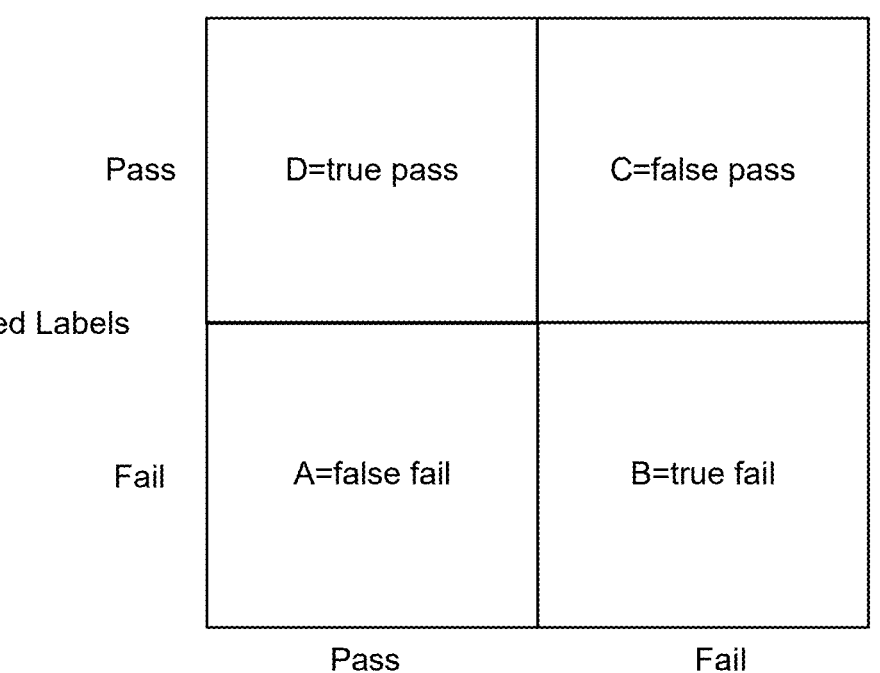
FIG. 42 is an example of a confusion matrix such as would be used for neural network model training.

FIG. 42 is an example of a confusion matrix such as would be used for neural network model training. In the matrix, predicted labels are what are generated by the model for an input, either a predicted "Pass" or a predicted "Fail", where "Pass" means a good block and "Fail" means a bad (defective) block. The actual labels are whether the actual, correct value should be "Pass" or "False". A true pass of block D is when the actual pass value is correctly predicted by the model and a true fail of block B is when the actual, correct value of fail is predicted by the model. False predictions occur when the model is incorrect, either returning a predicted pass that correctly should be a fail (block C=false pass) or returning a predicted fail that should correctly be a pass (block A=false fail). The pass accuracy is then D/(A+D) and the fail accuracy is B/(B+C).

Returning to FIG. 41, typically there will be multiple iterations until the model behavior meets the criteria. At step 4109, the results are check to whether they meet they meet the prediction indicator and, if not, at step 4111 it is determined where the number of allowed iterations have been meet: if more iterations are available, the flow loops base to step 4107, and if not, the flow returns to step 4103 for a revised feature selection. If predictions are met at step 4113, the model is checked against a test data set to test its accuracy at step 4115. If prediction indicator is not met, the flow loops base to step 4107; if met, the flow moves on to step 4117 and the neural network model is finalized and is downloaded at step 4119 to a CIM matrix in each NAND.

Returning to FIG. 40, once the pretrained neural network model is downloaded at 4005 and stored in a CIM array 4015, the memory device can be shipped to market, where the block health predication algorithm can be invoked during field usage. Depending on the embodiment, the storage of the CIM array can be done for each die or could be one CIM array for a multi-memory die device, such as a solid state drive. Once the device is operating in the field, the model stored in the memory device can be used for inferencing operations to determine device health. The input vector for the inferencing will be values for defect related features, where these can be same features as used for the training process features $4105_1$-$4105_N$, such as word line to word line leakage, word line to memory hole leakage, word line to local interconnect leakage, select gate leakage, and other defects. The feature values can include both feature values determined as part of the test process (legacy features 4013) and stored in the NAND memory array and also defect feature values 4011 collected during memory operations during customer use and stored in the NAND memory array. In either case, in the example embodiment the features will be stored in the same compute-in-memory array used for the neural network, but using word lines that are not stored with the neural network model's weight data. In alternate embodiment, some or all of the features values used for the input vectors for either of 4011 or 4013 can be stored in other arrays.

Figure 43:
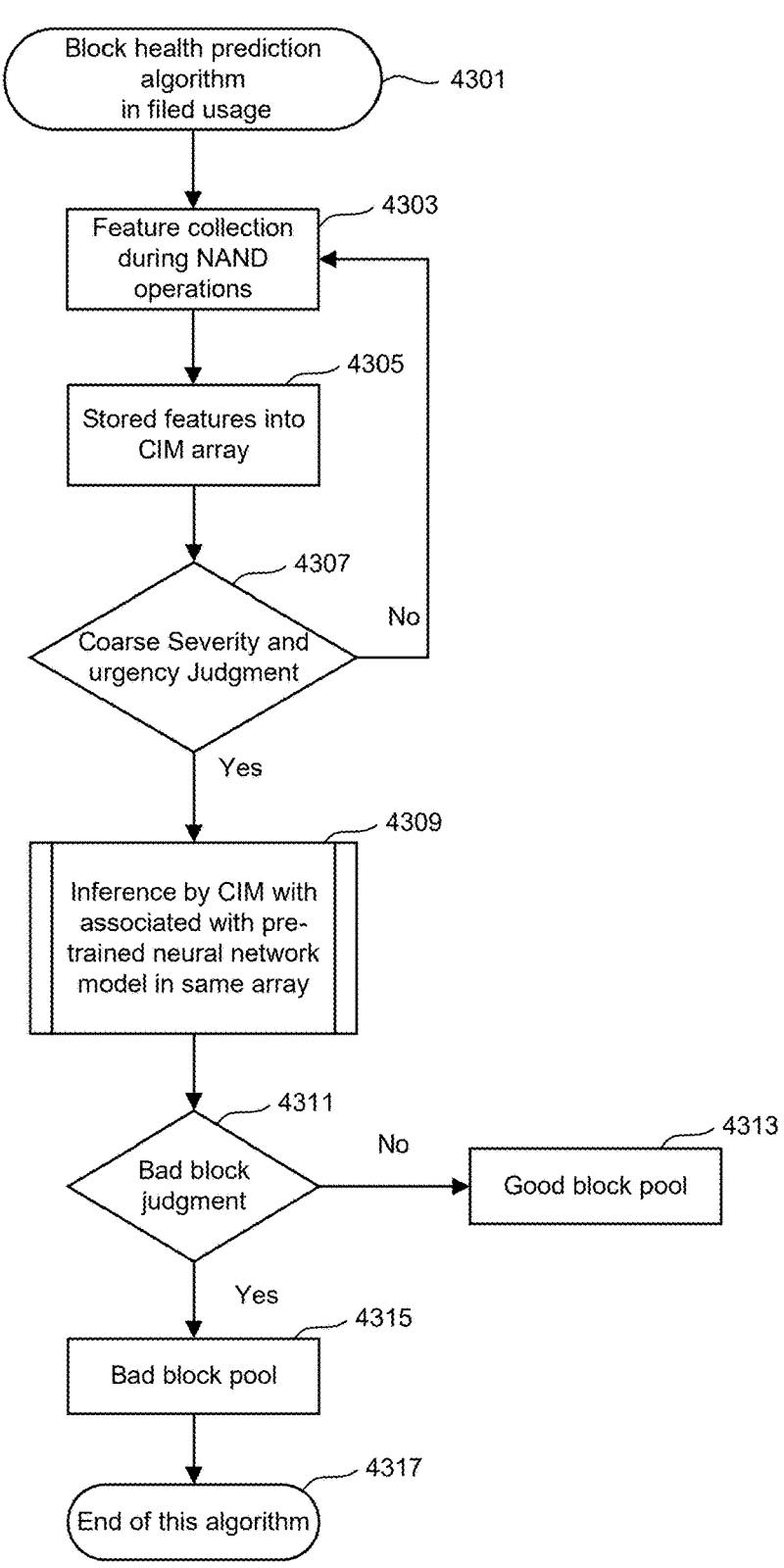
FIG. 43 is a flowchart of an embodiment for a block health algorithm for block health prediction using a compute-in-memory operation during field operation.

The block health inference operation can be triggered based on a coarse severity and urgency judgment based collected feature. If the severity or the urgency is very high, an inference with stored features will be executed in compute-in-memory array with the pretrained neural network model. If the severity or the urgency is not high, feature collection keeps working in subsequent NAND operations, until the coarse judgement indicates the need for inference. After the inference function by the compute-in-memory array, the block health level can be predicted at 4017. If a block is judged as a potential bad block, it will be sent into the bad block pool, while if it is judged as good block, it will go to good block pool for further usage. FIG. 43 provides more detail on an embodiment for block health prediction using a compute-in-memory operation during field operation.

FIG. 43 is a flowchart of an embodiment for a block health algorithm for block health prediction using a compute-in-memory operation during field operation, starting at 4301. In step 4303, features are collected during the course of operations for the memory system. The features come from monitoring operations such as failures during erase, read, or write operations and ECC results, similarly to normal error detection operations when in usage; however, in traditional approaches, these results are often graded on a simple pass/fail basis, such as if the number of cells of a block that fail to verify during program is above or below an allowable value or the amount of read error and rather it is correctable by ECC. In embodiments here, defects of lesser severity can also be monitored to be used in the inference process to predict blocks that may be bad or nearing being bad, even if they pass the coarser metrics. The collected features are then stored in the memory device in step 4305, where this can be in word lines of the same array that stores the pretrained model, but that are not storing weights for the model, although other embodiments can maintain this collected feature data elsewhere in the memory device. Step 4307 makes a determination on whether the set of collected feature errors have a severity or urgency that warrants an inference be performed. For example, if the amount of error detected in memory operations indicate that a block or blocks is high enough, such as over a certain number of memory cells fail to verify during erase or programming or the amount of read error is high, such as nearing the ECC capabilities of the memory control, the flow continues on to inferencing at step 4309; and, if not, the flow loops back to step 4303 to continue collecting features.

When triggered, inferencing is performed at step 4309 by applying the stored features, both those collected and stored at steps 4303 and 4305 and also any that were determined at device tests prior to being shipped and also stored in the memory device. The feature values are applied as input vectors to the weight array to perform a vector-matrix, compute-in-memory multiplication as described above for a number of embodiments. The output of the inference is then a bad block judgement at step 4311, with good blocks returned to the good block pool at step 4313 for subsequent usage and bad blocks retired and placed in the bad block pool at step 4315, with the algorithm concluding at 4317.

Depending on the embodiment, the weights and input vectors can be binary, multi-bit, or analog and embodiments can include those discussed above FIGS. 18-39 for more general compute-in-memory applications. Although discussed here in the NAND context, compute-in-memory vector-matrix implementations can also be implemented in other memory types, such as MRAM or PCM, and these techniques can also be applied to those technologies. Relative to many neural networks models that can be very large, the predictive health assessment is of relatively small size and can be imbedded in the memory arrays of a device, or can be a specific array for this purpose that could be smaller than a standard array of the device. For multi-die systems, such as a solid state drive, depending on the embodiment, each die could have the pre-trained model stored, or one die could store the model for use of the other dies of the system. With respect to rest of the memory system, this could also be used for neural network operations as described above or be a more general purpose system, such as a solid state drive that incorporates the pre-trained predictive block health assessment model weights.

Considering the inference of step 4309 further, this can be implemented according to any the different vertical or horizontal embodiments such as in FIG. 29-31 or 39. FIGS. 45A-C, 46A-C, and 47A-C illustrate several examples in more detail respectively when the hidden layer is from the word line direction structure, when the hidden layer is from the bit line direction structure, and when the hidden layer is from the block direction structure.

Figure 44:
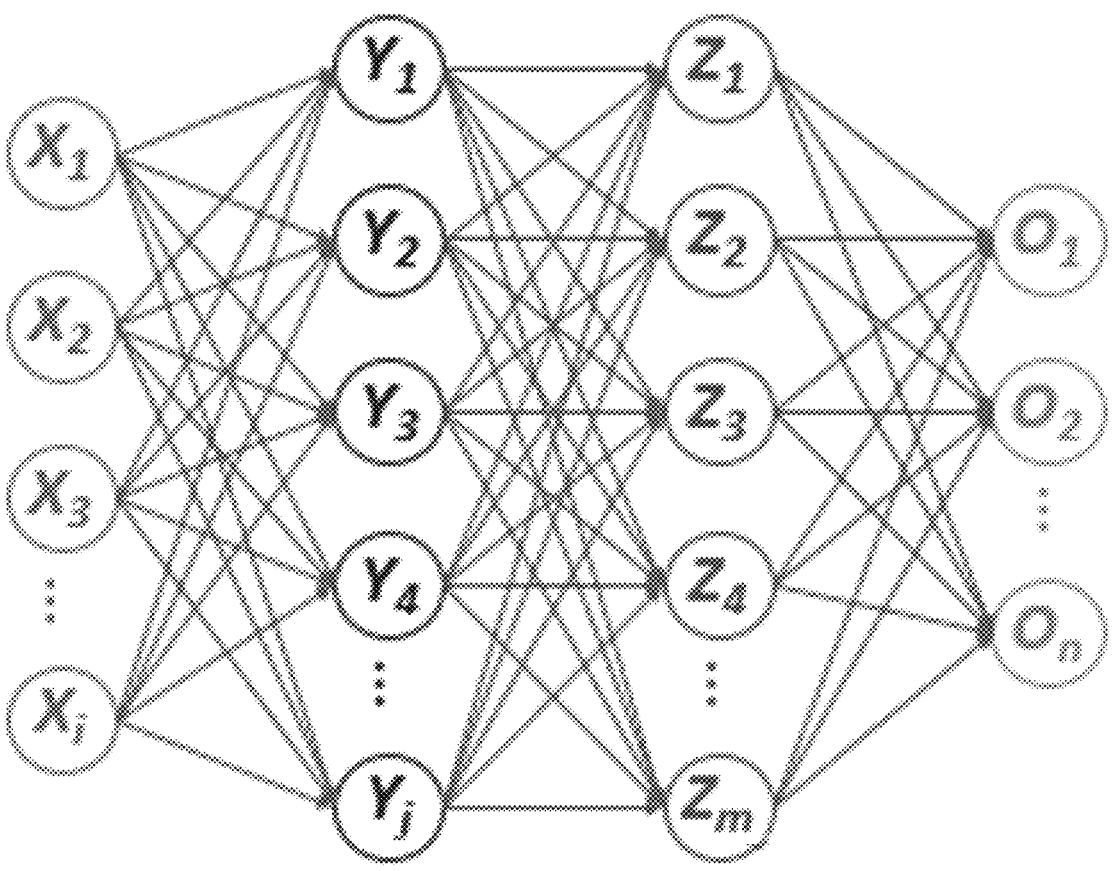
FIG. 44 is an example of a neural network example with four layers that will be used for the examples of FIGS. 45A-C, 46A-C, and 47A-C.

FIG. 44 is an example of a neural network example, similar to that described above with respect to FIG. 14, but with four layers (input layer X, first hidden layer Y, second hidden layer Z, and output layer O) that will be used for the examples of FIGS. 45A-C, 46A-C, and 47A-C.

Figure 45A:
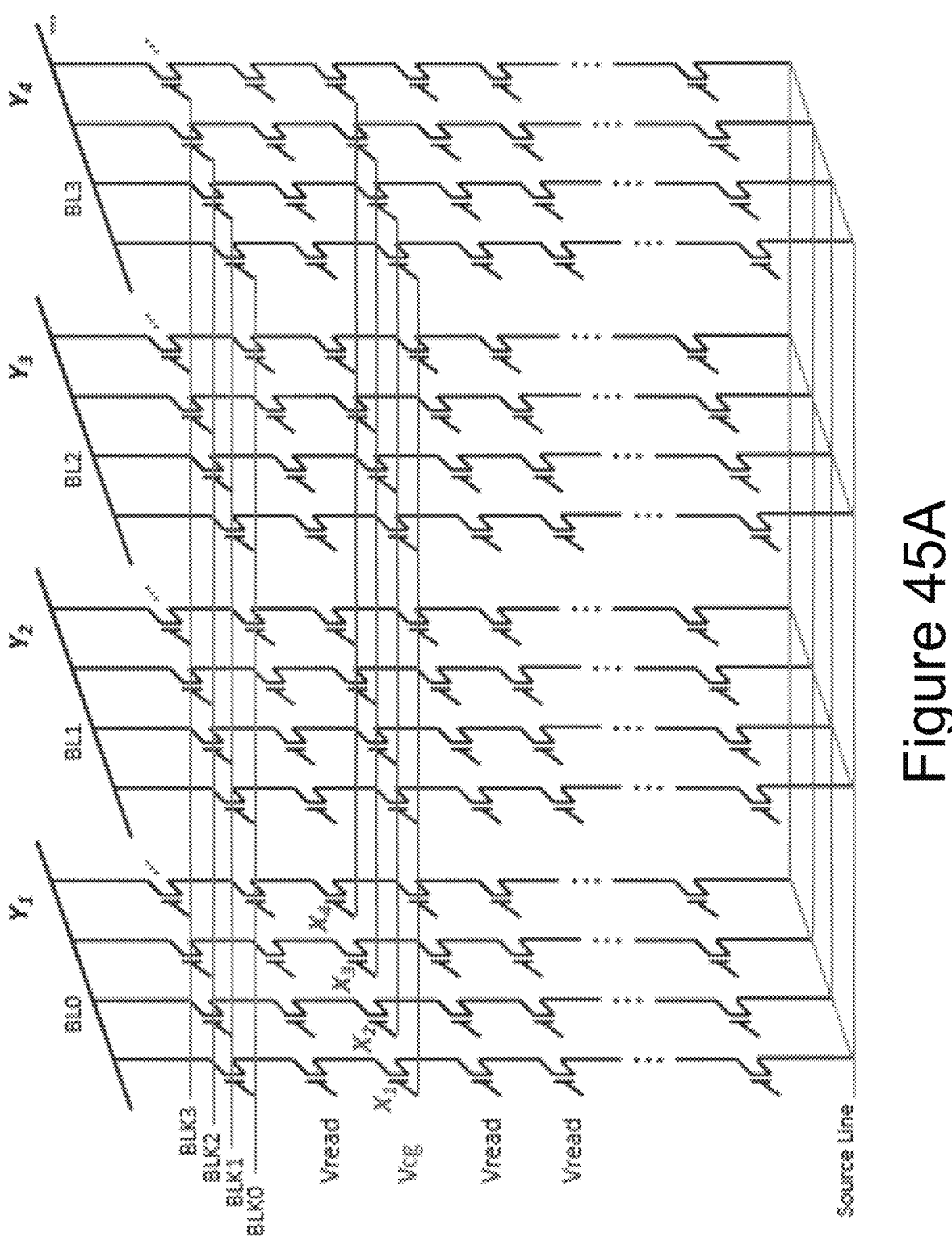
FIGS. 45A-C consider an embodiment in which the hidden layers of FIG. 44 are from the word line direction of the array structure.
Figure 45B:
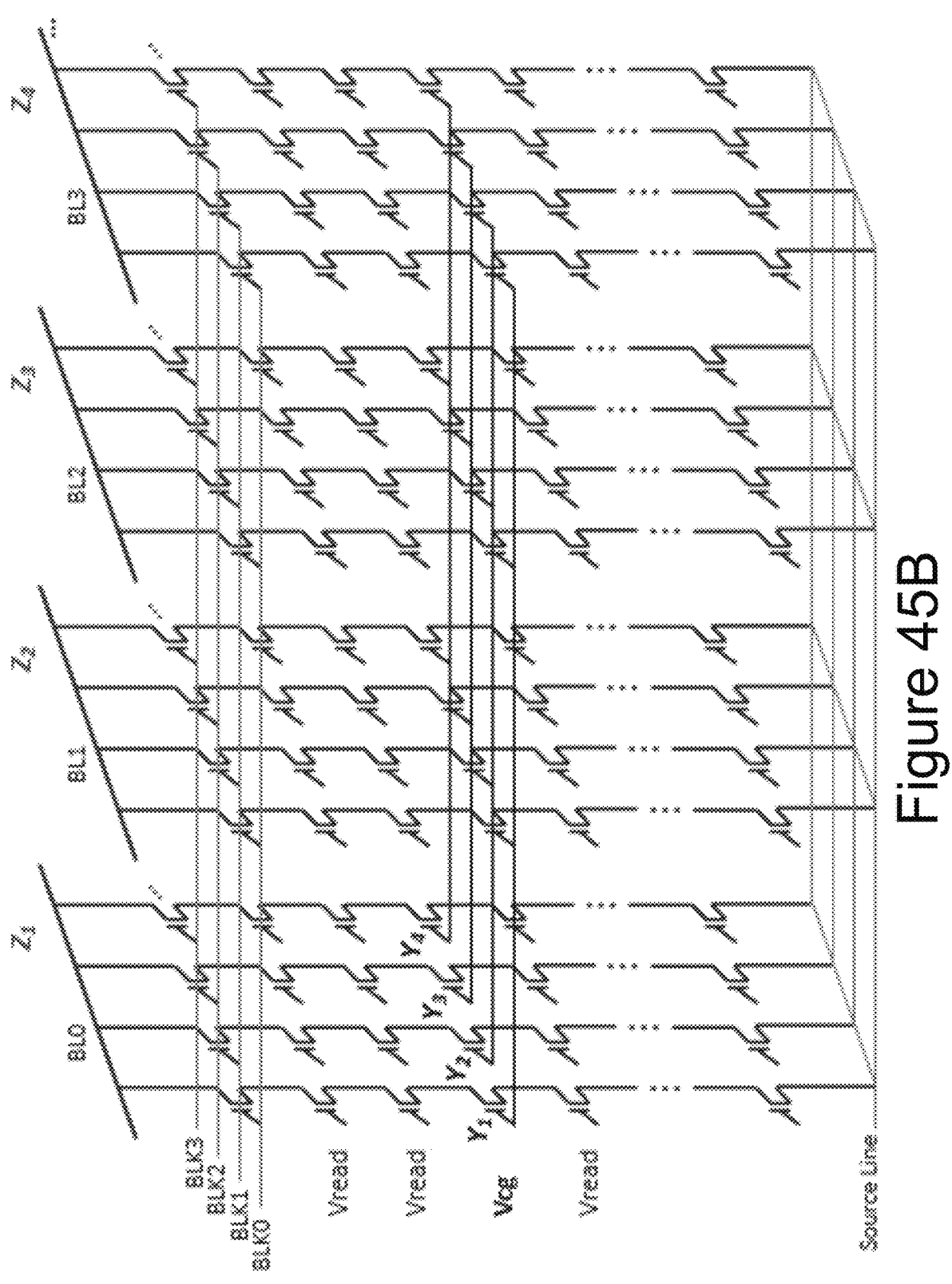
Figure 45C:
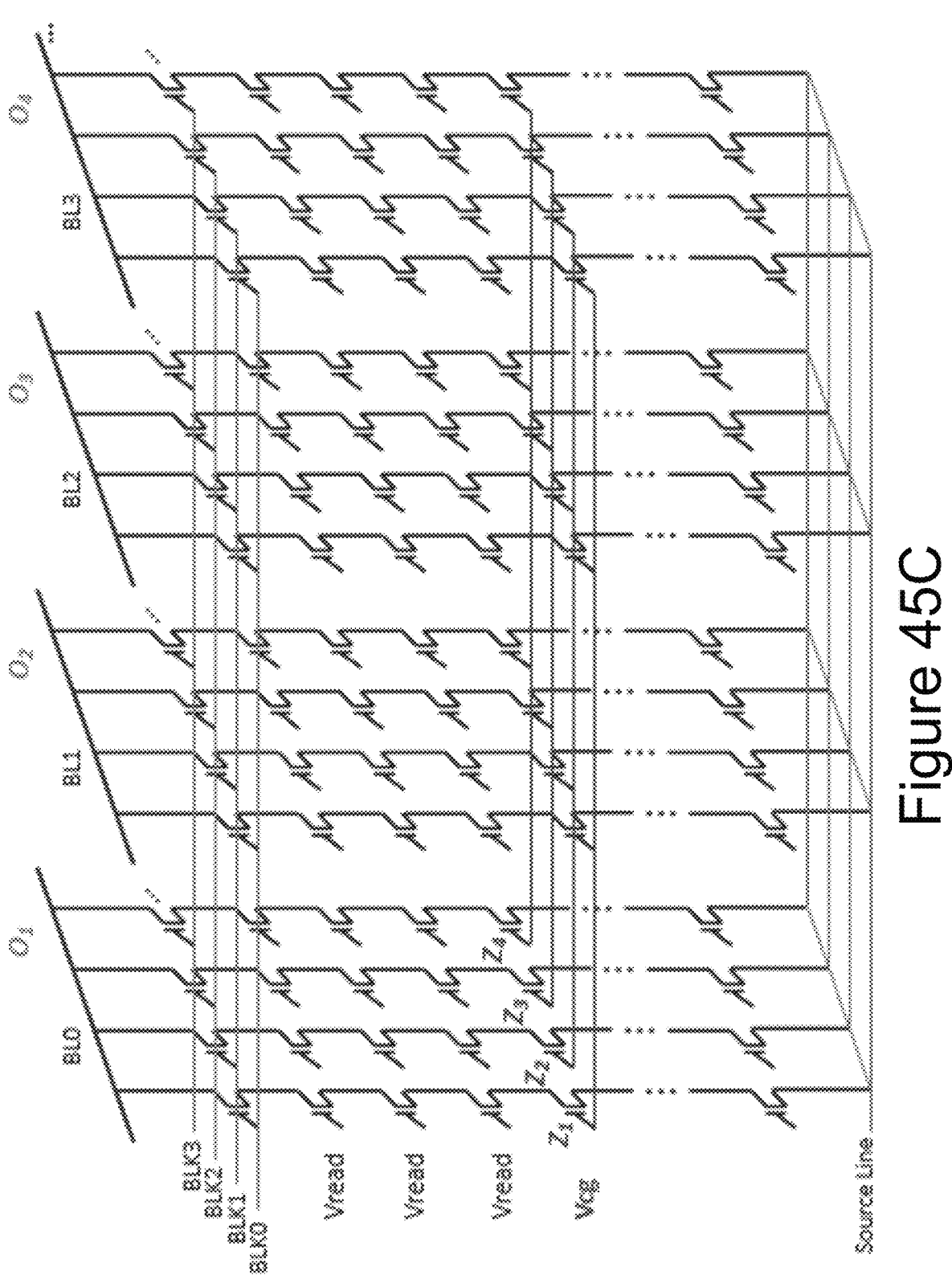

FIGS. 45A-C consider an embodiment in which the hidden layers of FIG. 44 are from the word line direction of the array structure. As illustrated in the sequence of FIGS. 45A-C, feature inputs (e.g. $X_1, X_2, \ldots, X_i$) will be fed from the word line side encoded as gate voltage and the NAND strings which are from different blocks but share the same bit line (e.g. $Y_1, Y_2, \ldots, Y_j$) are used to achieve the vector-matrix multiplication operation. In a given one of these NAND strings, only one word line is biased as a feature input voltage, where, as discussed above, the threshold voltages of the memory cells in this word line layer are encoded as the neural network's weights that were previously programmed at 4005. The other word lines in the NAND strings are biased with $V_{read}$ as pass transistors.

For example, taking $Y_1$ as an example and reviewing the process:

Bit line current of $Y_1=X_1$(gate voltage of cell 1)*weight 1(cell 1 $Vt$)+$X_2$(gate voltage of cell 2)*weight 2(cell 2 $Vt$)+ . . . +$X_i$(gate voltage of cell $i$)*weight$i$(Cell $i$ $Vt$).

The analog current of $Y_1$ can be sensed through analog-to-digital converters located at the terminus of the bit lines, as discussed above. After the currents of $Y_1, Y_2, \ldots, Y_j$ are calculated and converted to voltage levels, as first hidden layer's output, they will be used in the second hidden layer's calculation encoded as input voltages. The voltages encoded from $Y_1, Y_2, \ldots, Y_j$ will be biased to another word line in the same compute-in-memory array as the gate voltage. In this structure, the same set of bit lines are re-used, but the bit line number depends on neuron count of that layer. Another word line in the same compute-in-memory array is biased as an input voltage for a word line converted from first hidden layer, the threshold voltages of the memory cells in corresponding word line layer acting as the neural network's weight matrix of the second hidden layer that was previously programmed. As in first hidden layer calculation, the non-selected word lines are biased with $V_{read}$ as pass transistors. For example, taking $Z_1$ as another example:

Bit line current of $Z_1=Y_1$(gate voltage of cell 1')*weight 1'(cell 1'$Vt$)+$Y_2$(gate voltage of cell 2')*weight 2'(cell 2'$Vt$)+ . . . +$Y_j$(gate voltage of cell $j$)*weight$j$(Cell $j$ $Vt$).

As described in more detail above, the input continues to propagate through the layer until the produce of the vector-matrix multiplication is finished at the output layers.

Figure 46A:
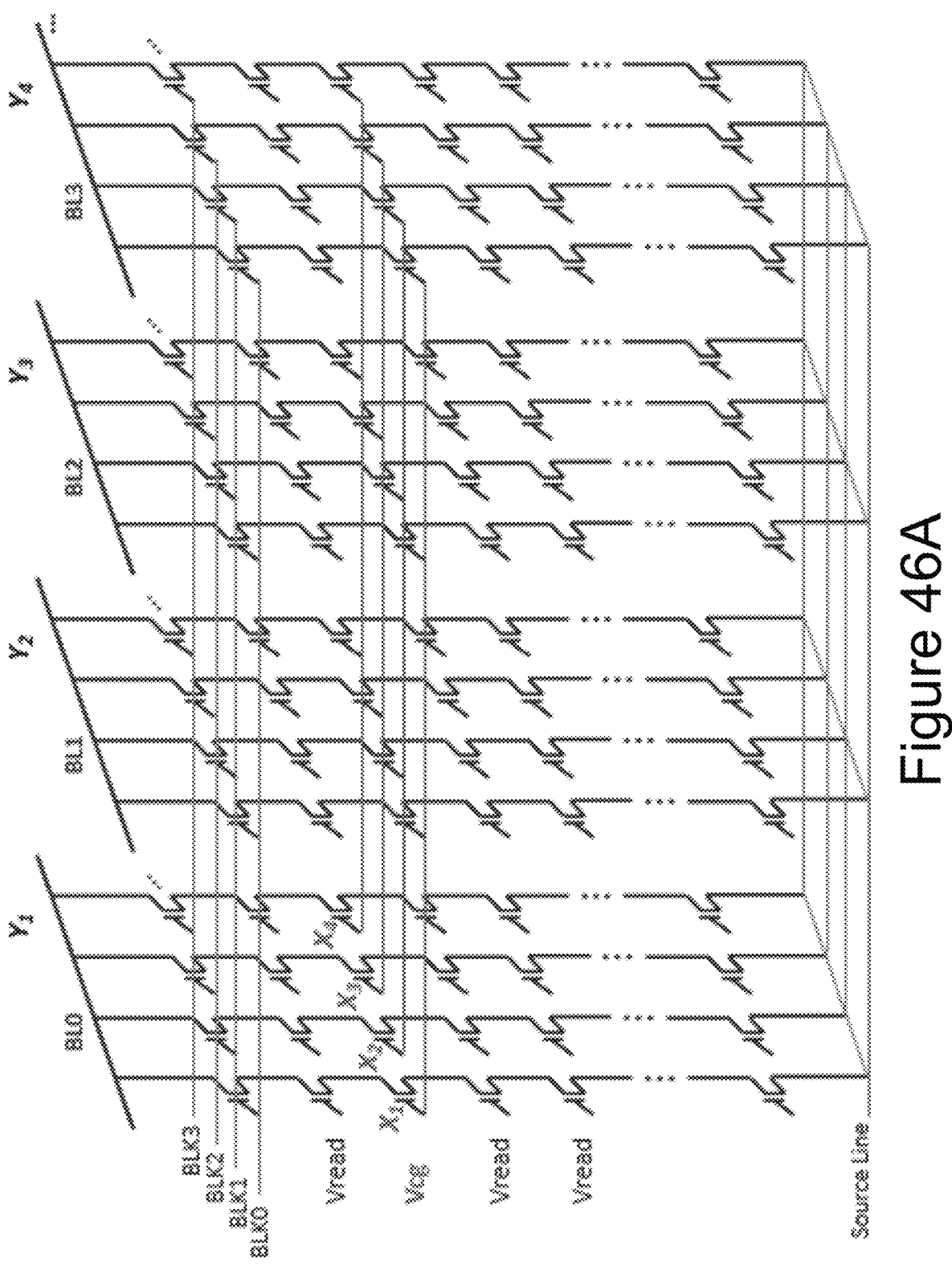
FIGS. 46A-C consider an embodiment in which the hidden layers of FIG. 44 are from the bit line direction of the array structure.
Figure 46B:
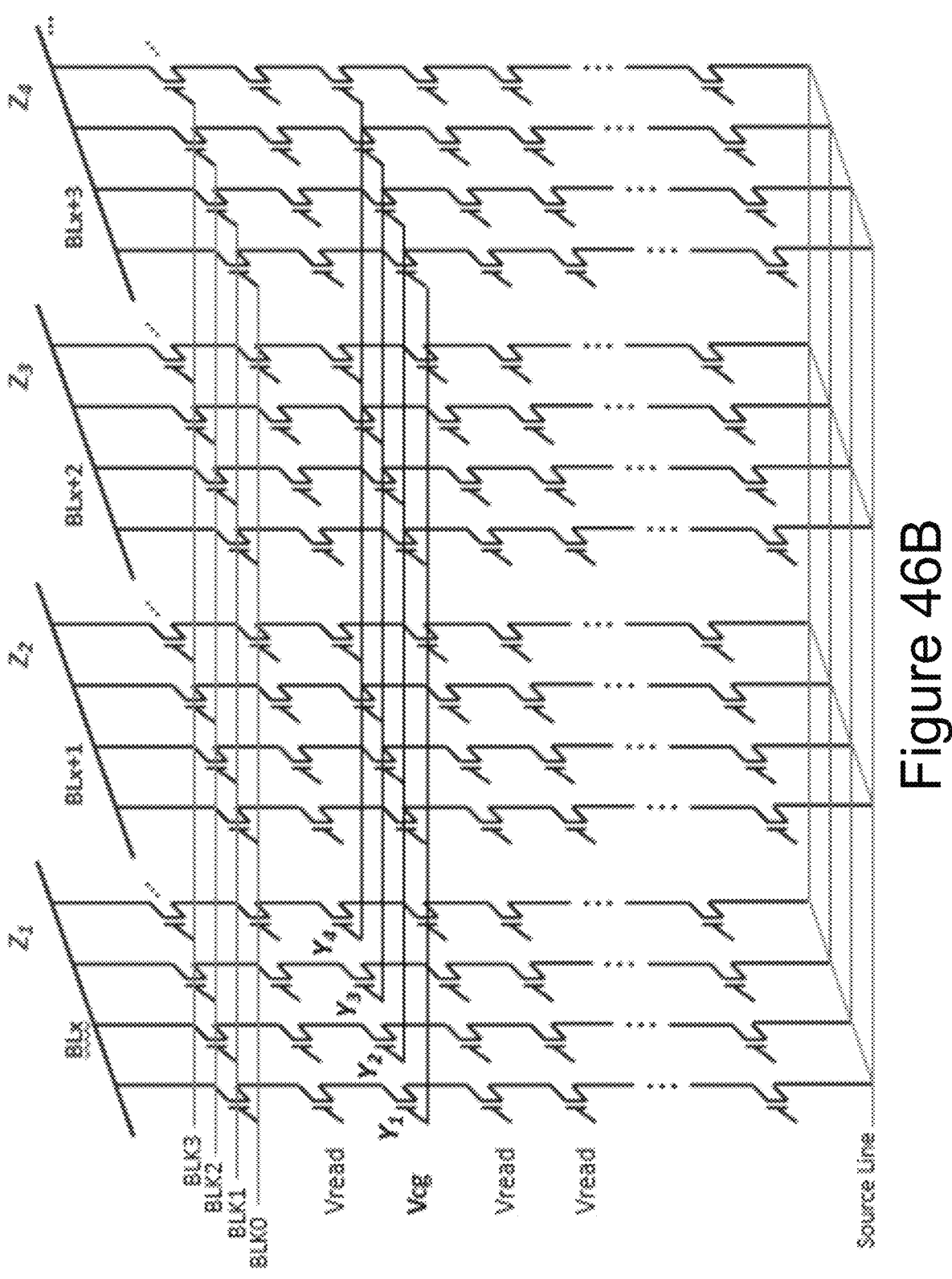
Figure 46C:
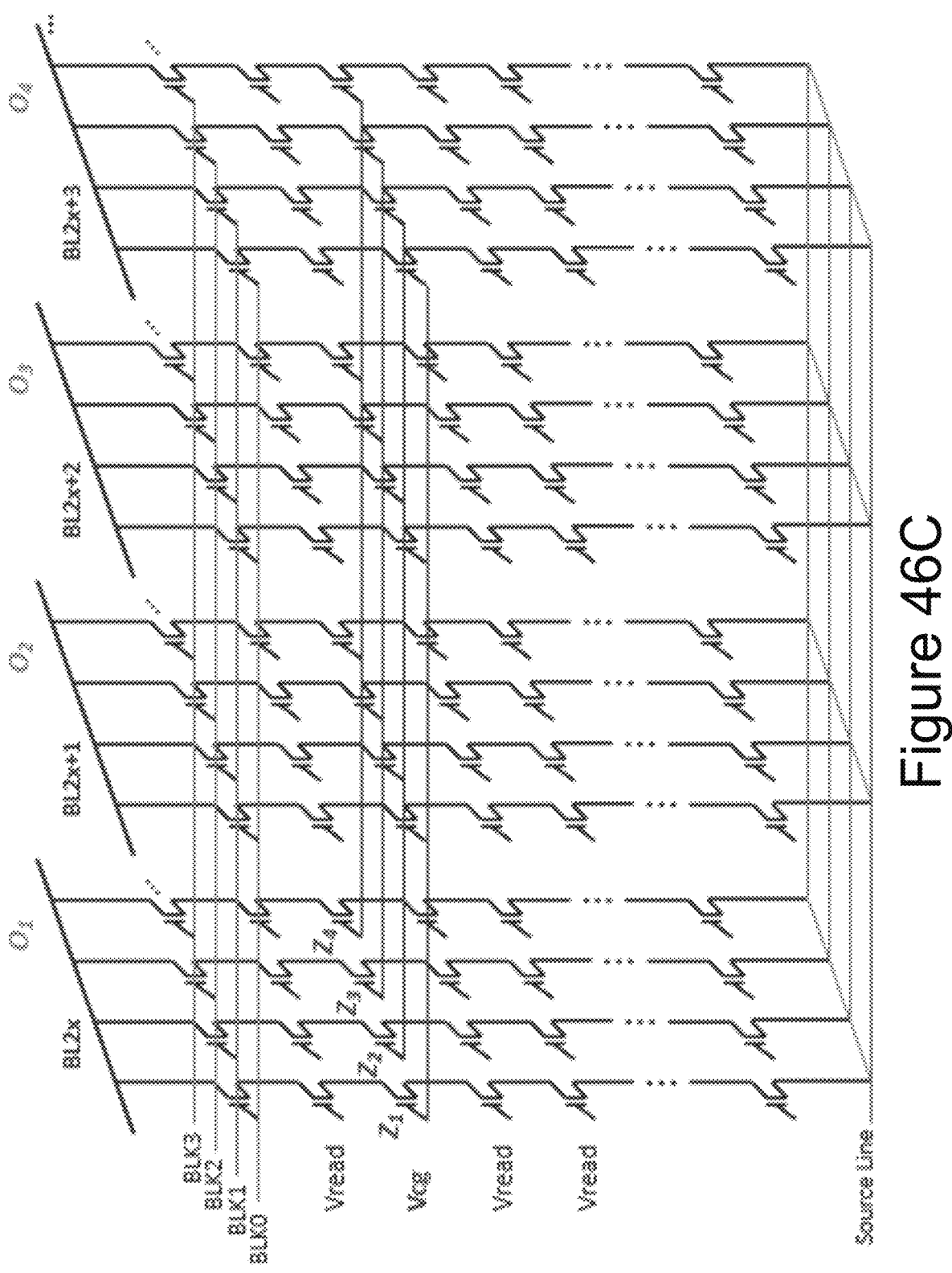

FIGS. 46A-C consider an embodiment in which the hidden layers of FIG. 44 are from the bit line direction of the array structure. As illustrated in the sequence of FIGS. 46A-C, the vector-matrix multiplication is carried out similarly to the word line direction implementation just discussed, but now the different hidden layers are arranged in the bit line direction. Under this arrangement, bit lines of the first hidden layer run from $BL_0$ to $BL_{(i-1)}$, bit lines of second hidden layer run from $BL_x$ to $BL_{(x+j-1)}$, and bit lines of output layer are $BL_{2x}$ to $BL_{(2x+n-1)}$. Input vector components $X_1, X_2, \ldots, X_i$ are fed from the word line side encoded as gate voltages, and the output analog current values $Y_1$, $Y_2, \ldots, Y_j$ from the first bit line group ($BL_0$ to $BL_{(i-1)}$) are converted to a digital gate bias, which becomes the input gate voltage of same word line in the next layer. The neural network's weights for the vector-matrix multiplication calculation from first hidden layer $(Y_j)$ to the second hidden layer $(Z_m)$ are stored in different NAND strings, comparing to the weights from input layer $(X_i)$ to first hidden layer $(Y_j)$. Then the output analog current $Z_1, Z_2, \ldots, Z_m$ from the second bit line group ($BL_x$ to $BL_{(x+j-1)}$) can be converted to digital gate bias and become the input gate voltage of same word lines for the next layer. Similarly, the neural network's weights for the vector-matrix calculation from second hidden layer $(Z_m)$ to output layer $(O_n)$ are stored in different NAND strings. Then the output analog currents $O_1$, $O_2, \ldots, O_n$ from final bit line group ($BL_{2x}$ to $BL_{(2x+n-1)}$) can be converted to final output results, such as the probability of block pass/fail category, block failure mode categories, and so on.

Figure 47A:
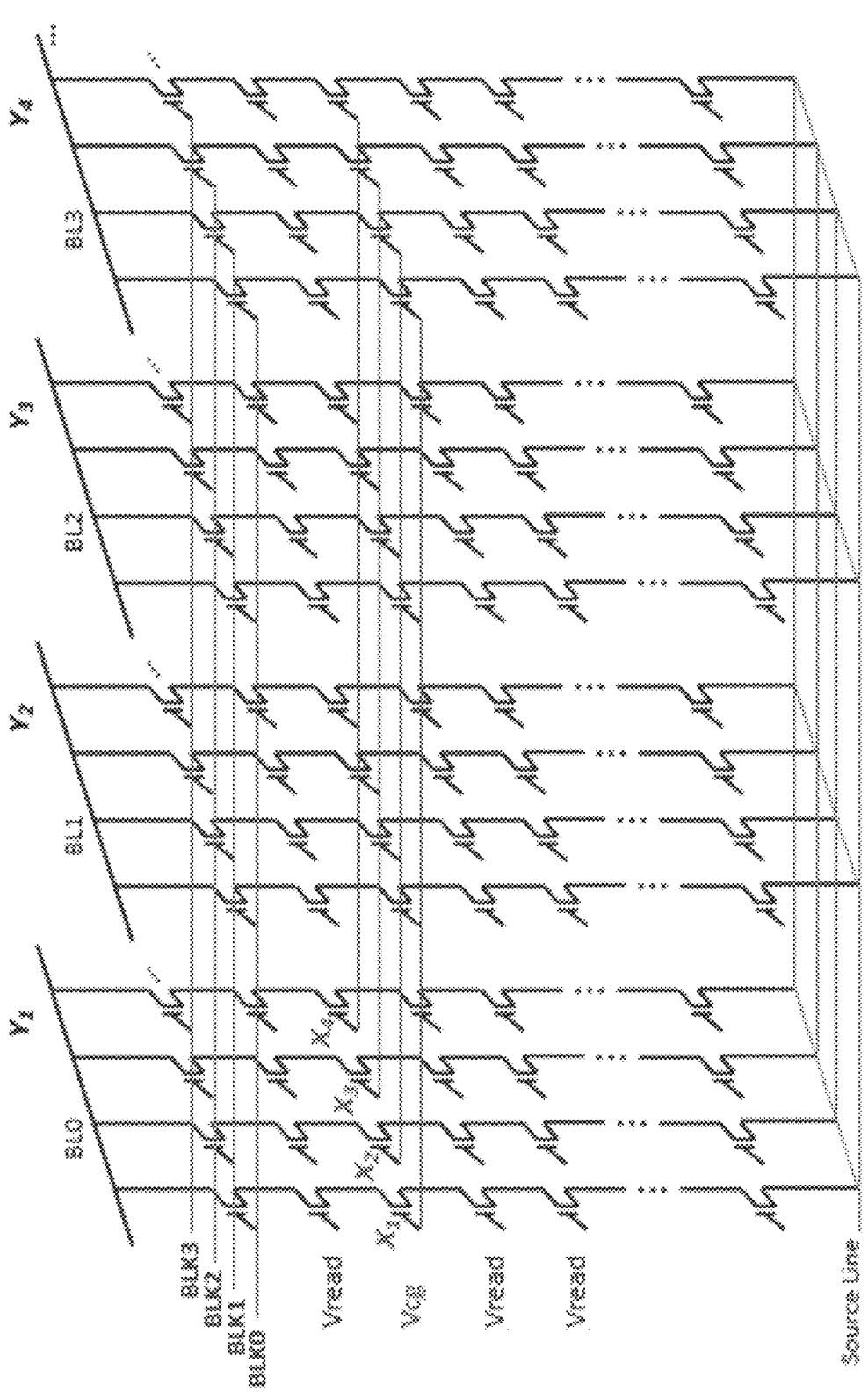
FIGS. 47A-C consider an embodiment in which the hidden layers of FIG. 44 are from the block direction of the array structure.
Figure 47B:
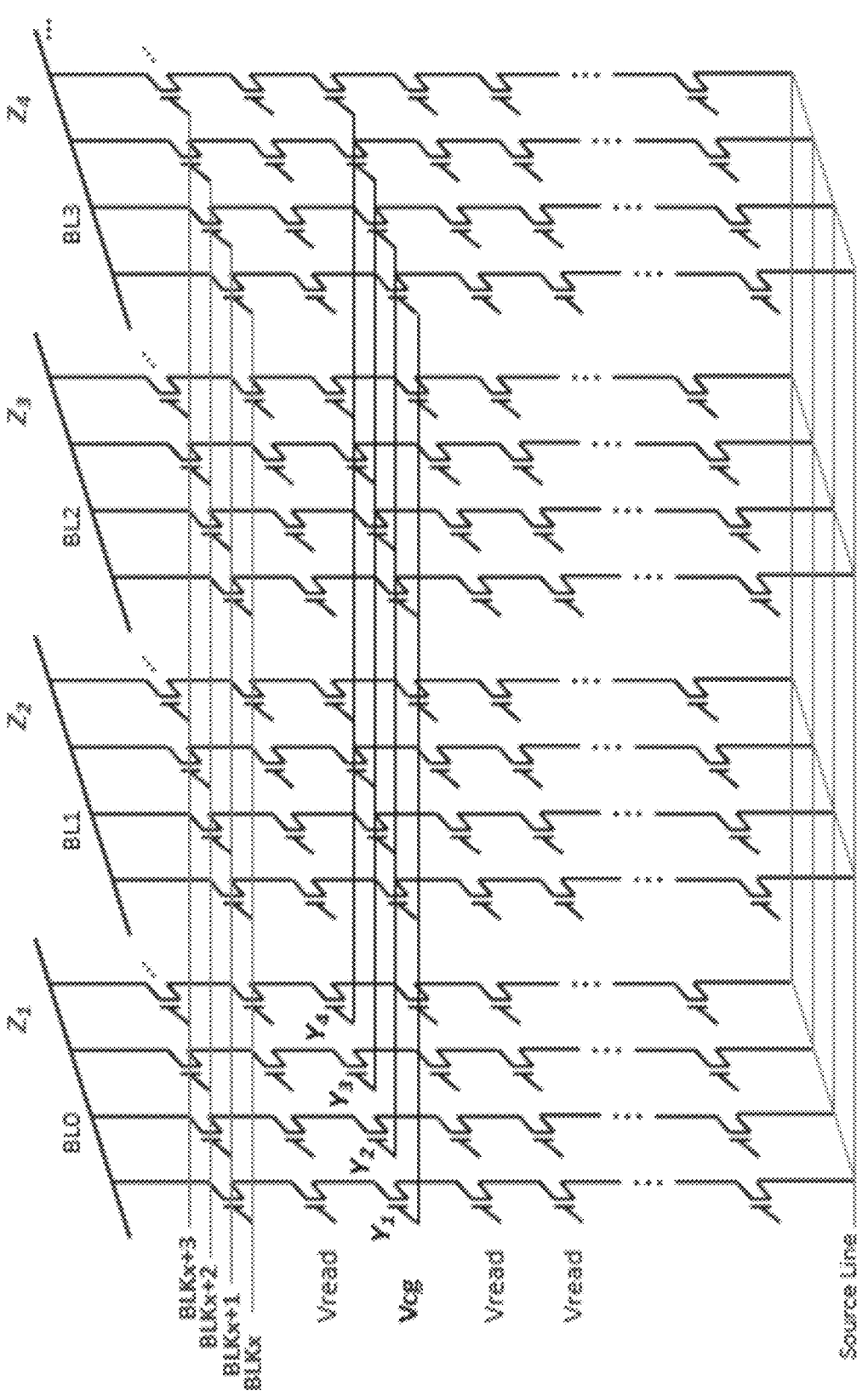
Figure 47C:
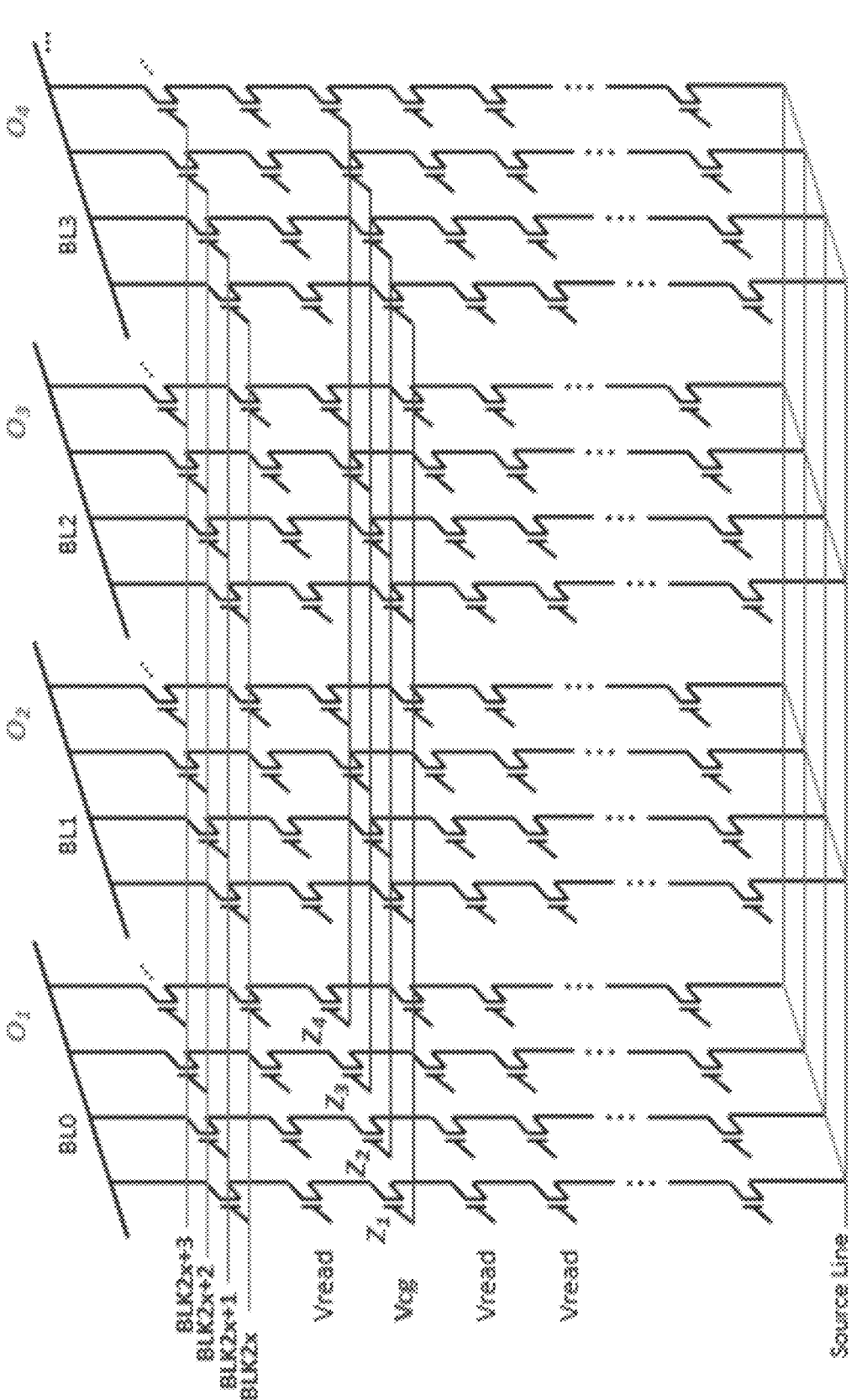

FIGS. 47A-C consider an embodiment in which the hidden layers of FIG. 44 are from the block direction of the array structure. As illustrated in the sequence of FIGS. 47A-C, the hidden layer structure is from different drain side select gates sub-sets, or fingers, of the 3D NAND structure. The vector-matrix multiplication is similarly implemented, but with the different hidden layers are arranged in select gate sub-set direction. The output analog currents $Y_1$, $Y_2, \ldots, Y_j$ from first select gate sub-set group will be converted to digital gate bias, which becomes the input gate voltage of same word line for the next layer. The neural network's weights for the vector-matrix multiplication calculation from first hidden layer $(Y_j)$ to second hidden layer $(Z_m)$ are stored in different NAND blocks, comparing to the weight from input layer $(X_i)$ to first hidden layer $(Y_j)$. Then the output analog current $Z_1, Z_2, \ldots, Z_m$ from second select gate sub-set group will be converted to digital gate bias and become the input gate voltage of same word lines for the next layer. Similarly, the neural network's weights for the vector-matrix calculation from the second hidden layer $(Z_m)$ to output layer $(O_n)$ are stored in different NAND blocks. The output analog current $O_1, O_2, \ldots, O_n$ from final select gate sub-set group will be converted to final output results, such as the probability of block pass/fail category, block failure mode categories, and so on.

FIG. 48 is a flowchart of an embodiment for preparing memory dies for compute-in-memory for predictive block health assessment using neural networks. Beginning at step 4801, a processing system receives test data on defects determined by testing multiple examples of a non-volatile memory die. This can include conducting the tests to determine the test data or manufacturing and then testing the memory dies by a manufacturer of the memory dies, or just receiving the test values determined elsewhere. These test data can then be used in the training of the neural network in step 4803, where this can be as described above with respect to FIG. 41, including the selecting of features at step 4103 from the test data of step 4801. Multiple ones of the non-volatile memory die for which the neural network has been trained can then be received at step 4805, where these can include the memory die used for the testing of step 4801 or other corresponding memory dies of the same type for which the test data would apply. At step 4807 the neural network can then be downloaded into an array or arrays by programming its weights of the neural network into the memory cells of the array or arrays. At step 4809 the memory dies with the pre-trained neural network stored on them can then be provided for incorporation into a memory system, where this can be by providing the dies to a customer for assembling a device using such a memory die or by assembling the dies into a system, such as an SSD, that is then supplied to customers. The test data of step 4801 is typically obtained from a test set of memory dies, which may or may not subsequently be used for the latter steps and eventually leading to their shipment to customers, but before these and other similar memory dies are shipped to customers, they typically undergo device characterization and testing at step 4811. The device characterization test can be used to determine things such as trim parameters and defect data on the individual memory dies, including mapping out bad blocks and determining defect data for the fresh die. Before shipping the individual memory die, whether assembled into a memory system such as an SSD or individually, this defect data for the fresh device can be stored as feature data at step 4813, where it can be used alongside defect related feature data once the device is in the field for inferencing operations using the pre-loaded neural network to determine defective portions of the memory die.

The embodiments for predictive block health assessment of a non-volatile memory by storing a pre-trained neural network for this purpose on the memory device itself can provide a number advantages. Through straightforward calculations, stress/screen-related items in the production testing flow can significantly reduce the need for these testing blocks. Simultaneously, the embodiments are highly efficient in minimizing development time. As long as the memory devices attains a health level with a sufficient block budget to accommodate potential bad blocks in the field, it can swiftly enter the market, leading to a significant reduction in the time required for final qualification. This solution does not compromise on quality and can provide a low error rate for our customers, as potential bad blocks in the field are precisely identified and retired before any data loss occurs.

One embodiment includes a non-volatile memory device, comprising a control circuit configured to connect to one or more arrays of non-volatile memory cells storing weights of a first neural network. The control circuit is configured to: perform memory operations, including reading and writing of data, on the one or more memory arrays; determine error indication data while performing a plurality of the memory operations; write the determined error indication data to the memory cells of the one or more arrays; perform a compute-in-memory inference operation with the first neural network using the written determined error indication data as input values; and determine defective portions of the one or more memory arrays based on the output of the inference operation.

One embodiment includes a method comprising: receiving test data on defects from a plurality of examples of a non-volatile memory die; training a neural network using the test data on defects; receiving a plurality of the non-volatile memory die; programming a set of weights of the trained neural network into the plurality of the non-volatile memory die; individually testing each of the received plurality of the non-volatile memory die to determine corresponding defect data; and programming the corresponding determined defect data into each of the non-volatile memory dies; and subsequent to programming a set of weights of the trained neural network into the plurality of the non-volatile memory die and programming the corresponding determined defect data into each of the non-volatile memory dies, providing the plurality of the non-volatile memory die for incorporation into a memory system.

One embodiment includes a non-volatile memory system, comprising: a plurality of non-volatile memory dies each comprising one or more arrays of non-volatile memory cells and a non-volatile memory controller connected to the plurality of memory dies. A first array of a first of the of non-volatile memory dies storing a set of weights of a neural network pre-trained for determining defective for portions of the memory dies. The non-volatile memory controller is configured to: perform memory operations on the plurality of memory dies, including reading and writing of data on the one or more arrays of each of the memory dies; collect error indication data for the plurality of memory dies while performing the memory operations; write the determined error indication data to the first array; perform a compute-in-memory inference operation with the neural network using the written determined error indication data as input values; and determine defective portions of the plurality of the memory dies based on the inference operation.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
a control circuit configured to connect to one or more arrays of non-volatile memory cells storing weights of a first neural network, the control circuit is configured to:
perform memory operations, including reading and writing of data, on the one or more arrays;
determine error indication data while performing a plurality of the memory operations;

write the determined error indication data to the memory cells of the one or more arrays;
perform a compute-in-memory inference operation with the first neural network using the written determined error indication data as input values; and
determine defective portions of the one or more arrays based on output of the inference operation.

2. The non-volatile memory device of claim 1, wherein the control circuit is formed on a control die, the non-volatile memory device further comprising:
a memory die including the one or more arrays of non-volatile memory cells, the memory die separate from and bonded to the control die.

3. The non-volatile memory device of claim 1, the one or more arrays of non-volatile memory cells further storing error indication data determined prior to performing the memory operations on the one or more arrays, and, wherein to perform the compute-in-memory inference operation the control circuit is further configured to:
perform the compute-in-memory inference operation with the first neural network using the written determine error indication data and the error indication data determined prior to performing the memory operations as input values.

4. The non-volatile memory device of claim 1, wherein the control circuit is further configured to:
perform error correction code (ECC) operations on data read the one or more arrays, wherein the error indication data determined while performing the memory operations includes ECC results.

5. The non-volatile memory device of claim 1, wherein the error indication data determined while performing the memory operations includes data writing errors.

6. The non-volatile memory device of claim 1, wherein the memory operations further include erasing of data and the error indication data determined while performing the memory operations includes data erasing errors.

7. The non-volatile memory device of claim 1, the one or more arrays of non-volatile memory cells further storing weights of a second neural network, the control circuit is further configured to:
receive input vectors for the second neural network; and
perform compute-in-memory vector-matrix multiplications between the input vectors for the second neural network and the weights of the second neural network.

8. The non-volatile memory device of claim 1, wherein the weights of the first neural network are stored in a first of one or more arrays of non-volatile memory cells and wherein to write the determined error indication data to the memory cells of the one or more arrays the control circuit is further configured to:
write the determined error indication data to the memory cells of the first array not storing weights of the first neural network.

9. The non-volatile memory device of claim 1, further comprising:
one or more memory dies each comprising one or more of the arrays, each of the arrays having a plurality of blocks of memory cell have a NAND architecture, wherein, to determine defective portions of the one or more memory, the memory control circuit is further configured to:
determine defective portions of the one or more arrays at an individual block level.

10. The non-volatile memory device of claim 9, wherein the memory control circuit is further configured to:

assign blocks determined to be bad to a bad block pool.

11. The non-volatile memory device of claim 9, wherein the weights of the first neural network are stored in a first of the one or more arrays and wherein to perform the compute-in-memory inference operation the control circuit is further configured to:

convert the written determined error indication data as input values into a first input vector; and apply the input vector to the first array, wherein values of the first input vector are analog values.

12. The non-volatile memory device of claim 11, wherein the analog values of the input vector are encoded as voltage level amplitudes.

13. The non-volatile memory device of claim 11, wherein non-zero values of the analog values of input vector have a non-zero voltage amplitude encoded as a time duration.

14. The non-volatile memory device of claim 9, wherein the weights of the first neural network are stored in a first of the one or more arrays, wherein each of the blocks of non-volatile memory cells has a NAND architecture in which the memory cells are connected along word lines, and wherein to perform the compute-in-memory inference operation the control circuit is further configured to:

convert the written determined error indication data as input values into an input vector encoded as a set of bias levels; and apply the input vector to the first array as the set of bias levels to word lines of a block of the first array.

15. The non-volatile memory device of claim 9, wherein the weights of the first neural network are stored in a first of the one or more arrays, wherein each of the blocks of non-volatile memory cells has a NAND architecture in which NAND strings of memory cells are connected along bit lines, and wherein to perform the compute-in-memory inference operation the control circuit is further configured to:

convert the written determined error indication data as input values into an input vector encoded as a set of bias levels; and apply the input vector to the first array as the set of bias levels to bit lines of a block of the first array.

16. The non-volatile memory device of claim 9, wherein the weights of the first neural network are stored in a first of the one or more arrays, wherein each of the blocks of non-volatile memory cells has a three dimensional NAND architecture in which NAND strings extend vertically above a substrate through a plurality of horizontal word line layers, along which memory cells of the NAND strings are connected, and through a select gate layer, along which a select gate of each of the NAND strings is connected, the select gate layer having multiple individually biasable sections corresponding to sub-sets of the NAND strings of the array, and wherein to perform the compute-in-memory inference operation the control circuit is further configured to:

convert the written determined error indication data as input values into an input vector encoded as a set of bias levels; and apply the input vector to the first array as the set of bias levels to a first plurality of the individually biasable sections of the select gate layer.

17. The non-volatile memory device of claim 1, further comprising:

a plurality of memory dies each comprising one or more of the arrays, wherein the weights of a first neural network are stored in an array of a first of the memory dies and the determined error indication data for all of the memory dies is written to the first of the memory dies.

18. A method, comprising:

receiving test data on defects from a plurality of examples of a non-volatile memory die;

training a neural network using the test data on defects;

receiving a plurality of the non-volatile memory die;

programming a set of weights of the trained neural network into the plurality of the non-volatile memory die;

individually testing each of the received plurality of the non-volatile memory die to determine corresponding defect data; and programming the corresponding determined defect data into each of the non-volatile memory dies; and subsequent to programming a set of weights of the trained neural network into the plurality of the non-volatile memory die and programming the corresponding determined defect data into each of the non-volatile memory dies, providing the plurality of the non-volatile memory die for incorporation into a memory system.

19. The method of claim 18, further comprising:

subsequent providing the plurality of the non-volatile memory die for incorporation into the memory system, for one or more of the non-volatile memory die, performing memory operations, including reading and writing of data, on the memory die;

determining error indication data while performing a plurality of the memory operations;

writing the determined error indication data to the memory die;

performing a compute-in-memory inference operation with the trained neural network using the written determined error indication data and the corresponding determined defect data as input values; and determining defective portions of the memory die based on output of the inference operation.

20. A non-volatile memory system, comprising:

a plurality of non-volatile memory dies each comprising one or more arrays of non-volatile memory cells, a first array of a first of the of non-volatile memory dies storing a set of weights of a neural network pre-trained for determining defective for portions of the memory dies; and a non-volatile memory controller connected to the plurality of memory dies and configured to:

perform memory operations on the plurality of memory dies, including reading and writing of data on the one or more arrays of each of the memory dies;

collect error indication data for the plurality of memory dies while performing the memory operations;

write the determined error indication data to the first array;

perform a compute-in-memory inference operation with the neural network using the written determined error indication data as input values; and determine defective portions of the plurality of the memory dies based on the inference operation.

* * * * *